(12) United States Patent
Bernard et al.

(10) Patent No.: US 8,856,228 B2
(45) Date of Patent: Oct. 7, 2014

(54) SYSTEM AND METHOD FOR COMPARISON OF PHYSICAL ENTITY ATTRIBUTE EFFECTS ON PHYSICAL ENVIRONMENTS THROUGH IN PART SOCIAL NETWORKING SERVICE INPUT

(75) Inventors: Rob Bernard, Redmond, WA (US);
Angel S. Calvo, Redmond, WA (US);
Larry Cochrane, Redmond, WA (US);
Jason Garms, Redmond, WA (US);
Roderick A. Hyde, Redmond, WA (US);
Royce A. Levien, Lexington, MA (US);
Richard T. Lord, Tacoma, WA (US);
Robert W. Lord, Seattle, WA (US);
Mark A. Malamud, Seattle, WA (US);
Jennifer Mame Pollard, Redmond, WA (US); John D. Rinaldo, Jr., Bellevue, WA (US); Clarence T. Tegreene, Bellevue, WA (US); Rene A. Vega, Redmond, WA (US); Lowell L. Wood, Jr., Bellevue, WA (US); Feng Zhao, Redmond, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 253 days.

(21) Appl. No.: 12/592,718

(22) Filed: Nov. 30, 2009

(65) Prior Publication Data

US 2011/0125841 A1 May 26, 2011

Related U.S. Application Data

(63) Continuation-in-part of application No. 12/592,547, filed on Nov. 24, 2009, and a continuation-in-part of (Continued)

(51) Int. Cl.
*G06F 15/16* (2006.01)

(52) U.S. Cl.
USPC .................. 709/204; 705/7; 705/34; 705/413; 705/319; 701/123; 701/33; 701/29; 340/439; 706/28

(58) Field of Classification Search
CPC ....... G06Q 50/01; G06Q 50/06; G06Q 50/14; B60W 2050/146; B60W 2560/00; B60W 2560/02; B60W 2750/00
USPC ......... 709/204; 707/102; 705/319, 7, 34, 413; 706/3, 28; 701/123, 33
See application file for complete search history.

(56) References Cited

U.S. PATENT DOCUMENTS

| 4,050,295 A | 9/1977 | Harvey |
| 6,518,878 B1 | 2/2003 | Skoff |

(Continued)

OTHER PUBLICATIONS

Aldhous, Peter; "How Psychology Can Help the Planet Stay Cool"; NewScientist, Environment; bearing a date of Aug. 19, 2009; pp. 1-5; located at: http://www.newscientist.com/article/mg20327222.100-how-psychology-can-help-the-planet-stay-cool.html.

(Continued)

*Primary Examiner* — Thuong Nguyen

(57) ABSTRACT

A method includes, but is not limited to: obtaining status information about one or more physical attributes associated with one or more first physical entities and one or more second physical entities, the one or more physical attributes each being perceived by one or more humans as being capable of having one or more effects upon one or more physical environments, obtaining input information from at least one of the one or more humans through at least in part one or more social networking services, the input information associated with at least one of the one or more physical attributes, and determining assessment information comparing the one or more first physical entities with the one or more second physical entities based at least in part upon the status information and based at least in part upon the input information. In addition to the foregoing, other related method/system aspects are described in the claims, drawings, and text forming a part of the present disclosure.

20 Claims, 44 Drawing Sheets

Related U.S. Application Data application No. 12/592,543, filed on Nov. 24, 2009, and a continuation-in-part of application No. 12/592,545, filed on Nov. 25, 2009, and a continuation-in-part of application No. 12/592,542, filed on Nov. 25, 2009.

(56) References Cited

U.S. PATENT DOCUMENTS

| | | | |
|---|---|---|---|
| 6,774,769 | B2 | 8/2004 | Okada |
| 6,862,540 | B1* | 3/2005 | Welch et al. ............ 702/44 |
| 7,057,583 | B2 | 6/2006 | Koll et al. |
| 7,454,962 | B2 | 11/2008 | Nishiyama et al. |
| 8,088,044 | B2 | 1/2012 | Tchao et al. |
| 8,144,027 | B2 | 3/2012 | Goldberg et al. |
| 8,170,886 | B2 | 5/2012 | Luff |
| 8,219,126 | B2 | 7/2012 | Marlow et al. |
| 2006/0136291 | A1 | 6/2006 | Morita et al. |
| 2006/0148496 | A1 | 7/2006 | Zhu et al. |
| 2007/0083294 | A1* | 4/2007 | Bruno ............ 700/295 |
| 2007/0113181 | A1 | 5/2007 | Blattner et al. |
| 2007/0174004 | A1* | 7/2007 | Tenzer et al. ............ 701/123 |
| 2007/0262855 | A1 | 11/2007 | Zuta et al. |
| 2008/0255899 | A1 | 10/2008 | McConnell et al. |
| 2008/0306985 | A1* | 12/2008 | Murray et al. ............ 707/102 |
| 2009/0144095 | A1 | 6/2009 | Shahi et al. |
| 2009/0171722 | A1 | 7/2009 | Roberts |
| 2009/0216747 | A1* | 8/2009 | Li et al. ............ 707/5 |
| 2009/0228405 | A1* | 9/2009 | Lopez et al. ............ 705/412 |
| 2009/0228448 | A1 | 9/2009 | Ivanov et al. |
| 2009/0281677 | A1 | 11/2009 | Botich et al. |
| 2009/0319295 | A1 | 12/2009 | Kass-Hout et al. |
| 2010/0049669 | A1* | 2/2010 | Mazzarolo ............ 705/413 |
| 2010/0077020 | A1 | 3/2010 | Paloheimo et al. |
| 2010/0174643 | A1* | 7/2010 | Schaefer et al. ............ 705/40 |
| 2010/0186066 | A1* | 7/2010 | Pollard ............ 726/3 |
| 2010/0225473 | A1 | 9/2010 | Leuthardt et al. |
| 2010/0324962 | A1* | 12/2010 | Nesler et al. ............ 705/8 |
| 2011/0029341 | A1* | 2/2011 | Muse et al. ............ 705/7 |
| 2011/0112717 | A1* | 5/2011 | Resner ............ 701/33 |
| 2011/0125659 | A1* | 5/2011 | Bernard et al. ............ 705/319 |
| 2011/0125660 | A1* | 5/2011 | Bernard et al. ............ 705/319 |
| 2011/0125688 | A1* | 5/2011 | Bernard et al. ............ 706/28 |
| 2011/0125689 | A1 | 5/2011 | Bernard et al. |
| 2011/0125690 | A1 | 5/2011 | Bernard et al. |
| 2011/0125691 | A1 | 5/2011 | Bernard et al. |
| 2011/0125692 | A1 | 5/2011 | Bernard et al. |
| 2011/0125693 | A1 | 5/2011 | Bernard et al. |
| 2011/0125840 | A1* | 5/2011 | Bernard et al. ............ 709/204 |
| 2011/0125842 | A1* | 5/2011 | Bernard et al. ............ 709/204 |
| 2011/0126124 | A1 | 5/2011 | Bernard et al. |
| 2011/0126125 | A1 | 5/2011 | Bernard et al. |
| 2011/0191257 | A1 | 8/2011 | Bernard et al. |

OTHER PUBLICATIONS

"New 'Smart' Electrical Meters Raise Privacy Issues"; Physorg.com; bearing a date of Nov. 6, 2009; pp. 1-2; 2009; AFP; located at: http://www.physorg.com/news176703307.html.

Business Wire; "Lucid Design Group Announces First Social Network for Building Resource Use"; Business Services Industry; bearing a date of Apr. 27, 2010 and 2010; pp. 1-3; Business Wire.

Fehrenbacher, Katie; "Startup: Lucid Design Group, Network Effect on Energy Use"; bearing a date of Aug. 13, 2007; pp. 1-9; The GigaOM Network.

Lucid Design Group; "Lucid Design Group announces Building Dashboard® Network ™, the first social network for buildings"; bearing a date of Apr. 27, 2010 and 2004-2010; pp. 1-2; Lucid Design Group, Inc.

Lucid Design Group- Building Dashboard® Network- Apps; "Apps for every building"; bearing dates of 2004-2010; pp. 1-4; Lucid Design Group, Inc.; printed on Oct. 12, 2010.

U.S. Appl. No. 12/592,725, filed Nov. 30, 2009, Bernard et al.
U.S. Appl. No. 12/804,514, filed Jul. 21, 2010, Bernard et al.
U.S. Appl. No. 12/804,569, filed Jul. 22, 2010, Bernard et al.
U.S. Appl. No. 12/804,576, filed Jul. 23, 2010, Bernard et al.
U.S. Appl. No. 12/804,713, filed Jul. 26, 2010, Bernard et al.
U.S. Appl. No. 12/804,766, filed Jul. 27, 2010, Bernard et al.
U.S. Appl. No. 12/804,831, filed Jul. 28, 2010, Bernard et al.
U.S. Appl. No. 12/804,829, filed Jul. 29, 2010, Bernard et al.
U.S. Appl. No. 12/804,951, filed Jul. 30, 2010, Bernard et al.

Lucid Design Group—Building Dashboard® Network—Features; "A social network for the buildings in which we live and work"; bearing dates of 2004-2010; pp. 1-5; Lucid Design Group, Inc.; printed on Oct. 12, 2010.

Lucid Design Group—Products Overview; "Building Dashboard® Network, Building Dashboard® Kiosk"; bearing dates of 2004-2010; pp. 1-2; Lucid Design Group, Inc.; printed on Oct. 12, 2010.

Lucid Design Group—Building Dashboard® Network—Tech Specs; "Technical specifications"; bearing dates of 2004-2010; pp. 1-2; Lucid Design Group, Inc.; printed on Oct. 12, 2010.

Tweed, Katherine; "Lucid Unveils Social Networking for Buildings"; Greentech Media; bearing a date of Apr. 27, 2010 and 2010; pp. 1-2; Greentech Media, Inc.

* cited by examiner

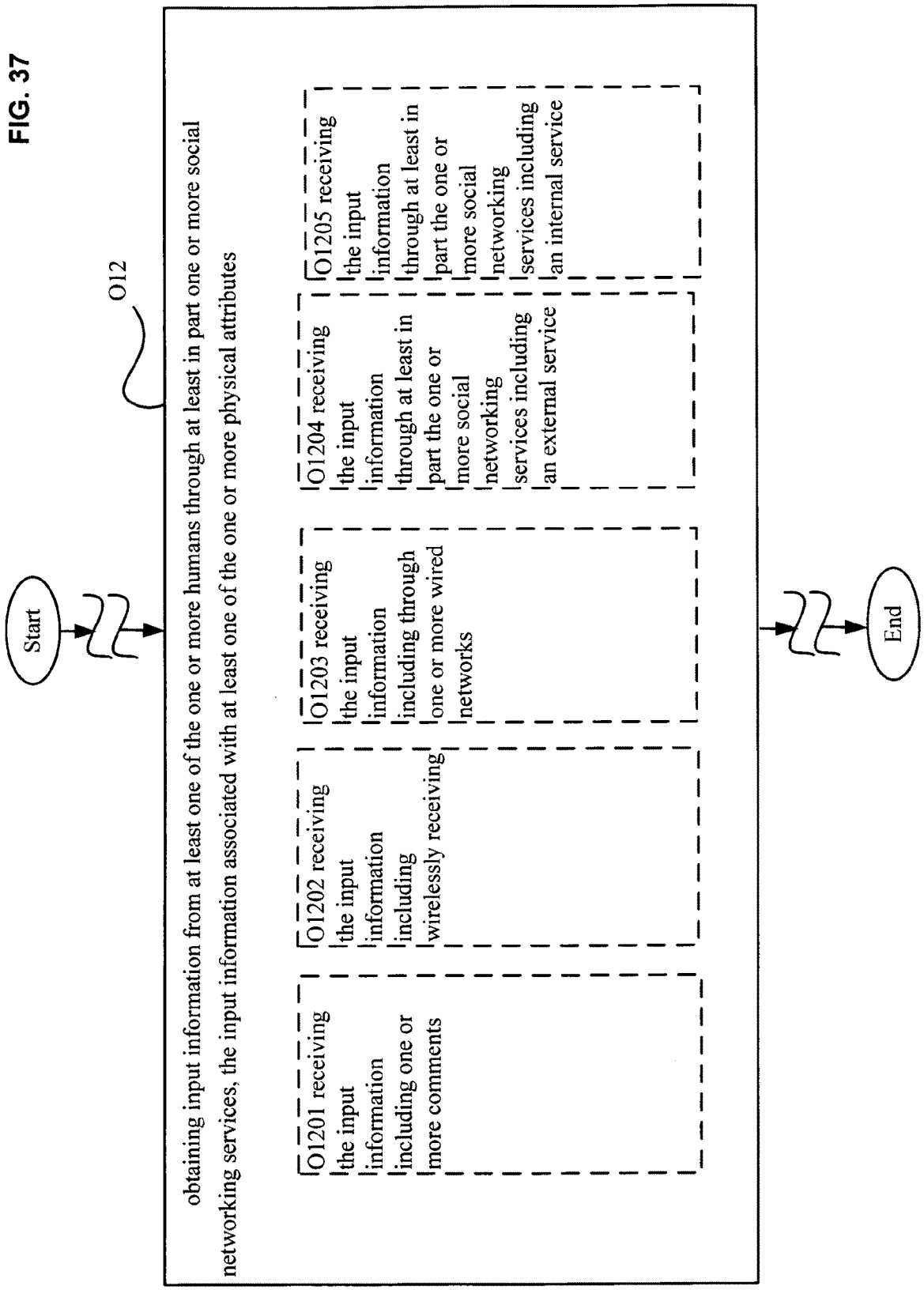

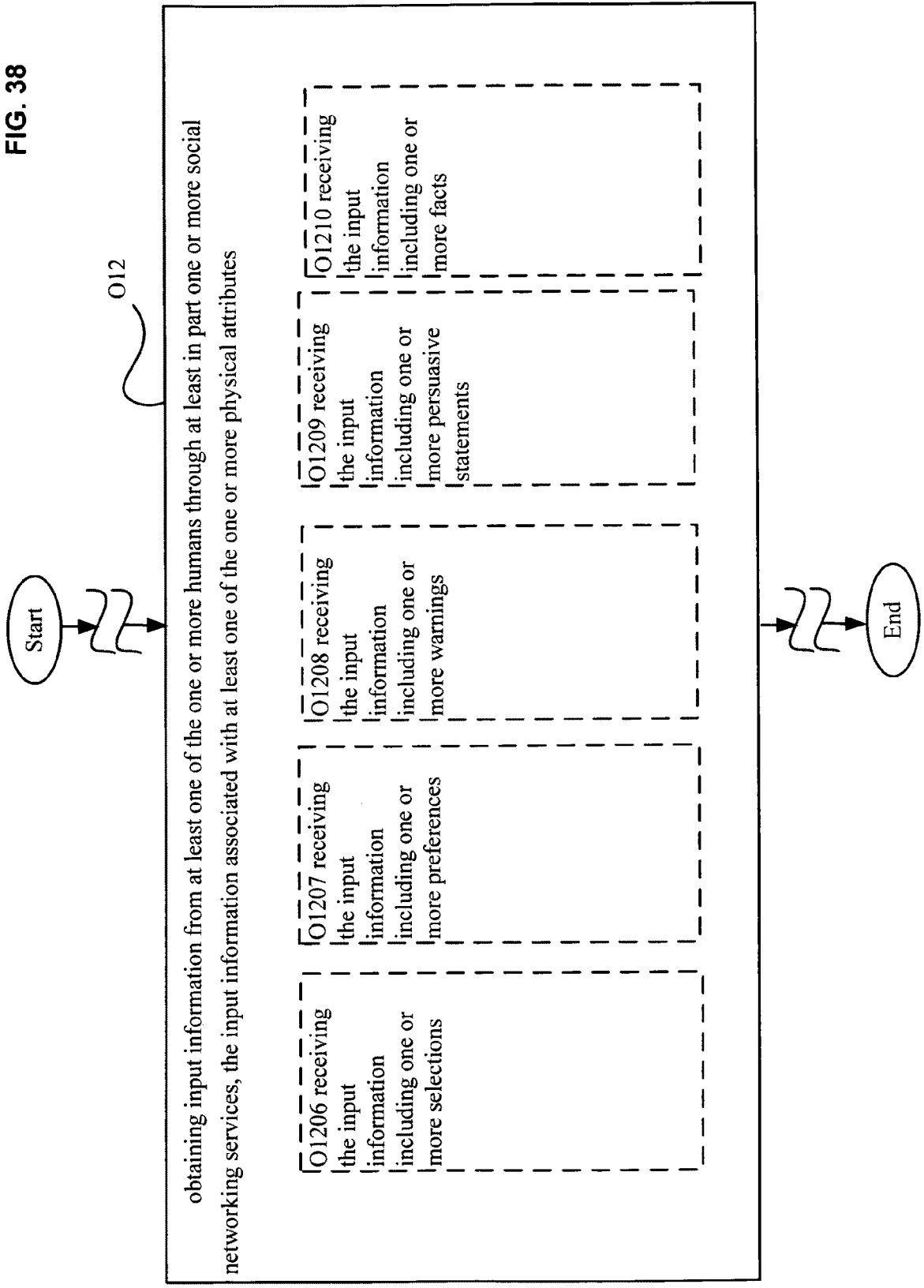

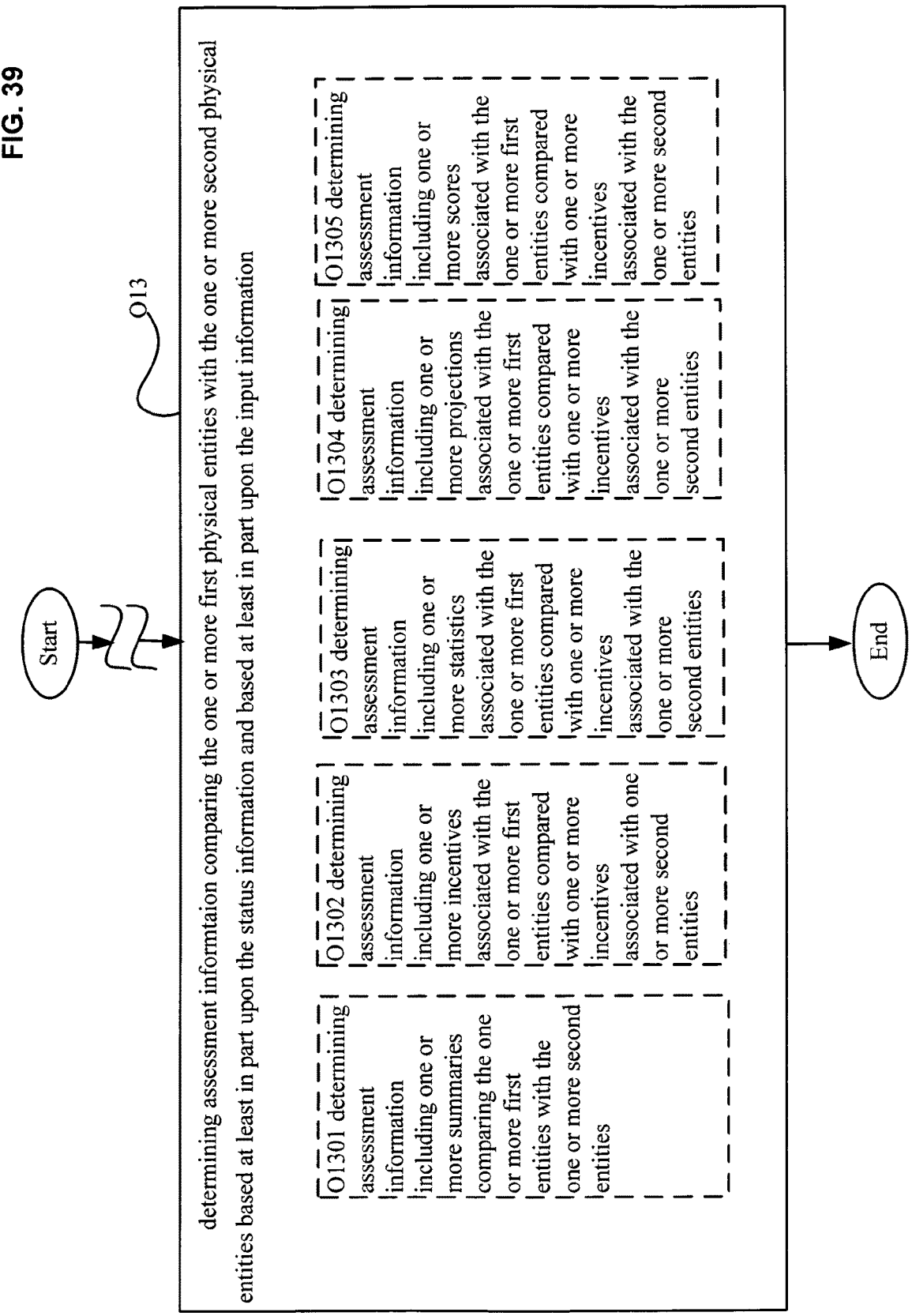

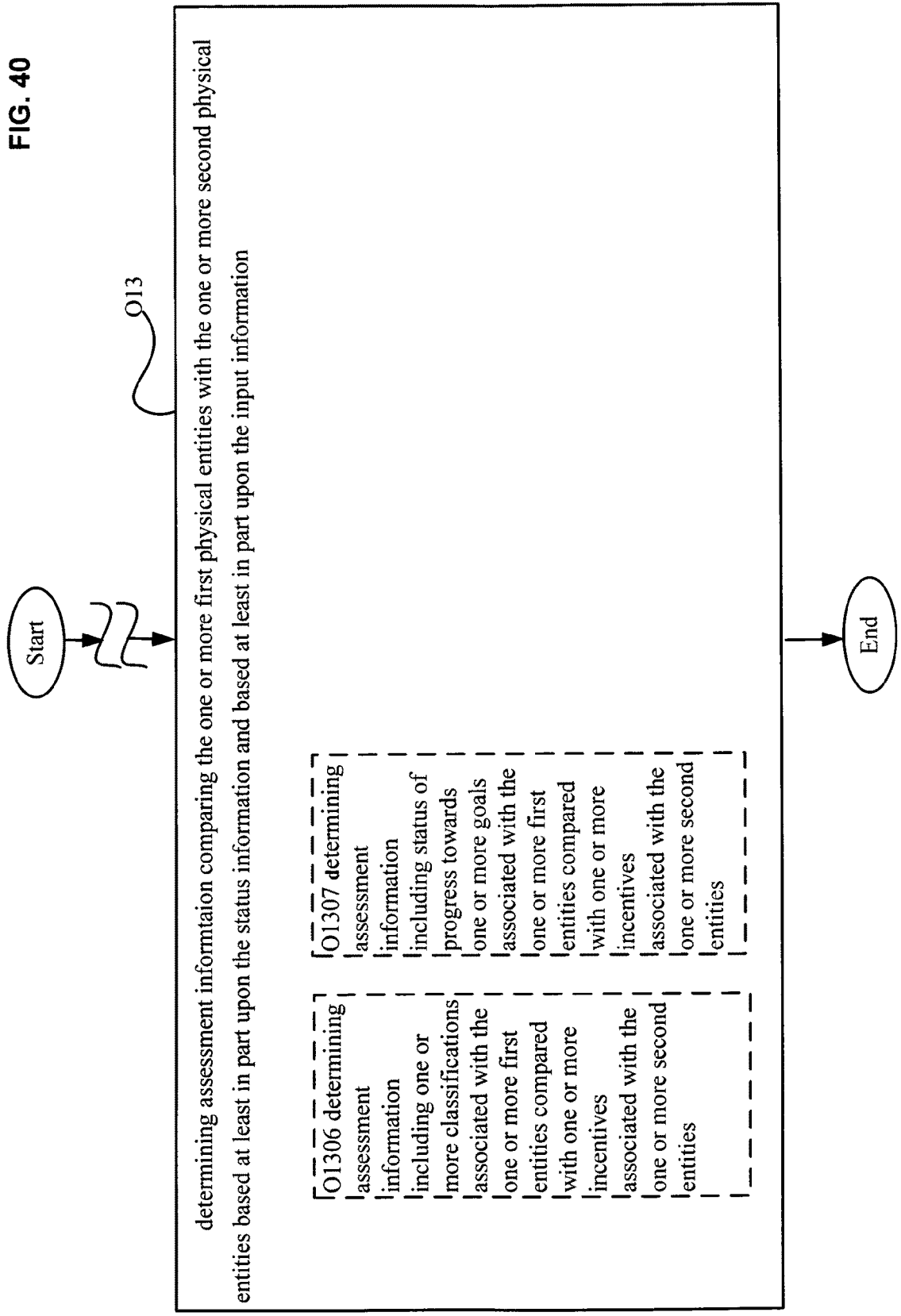

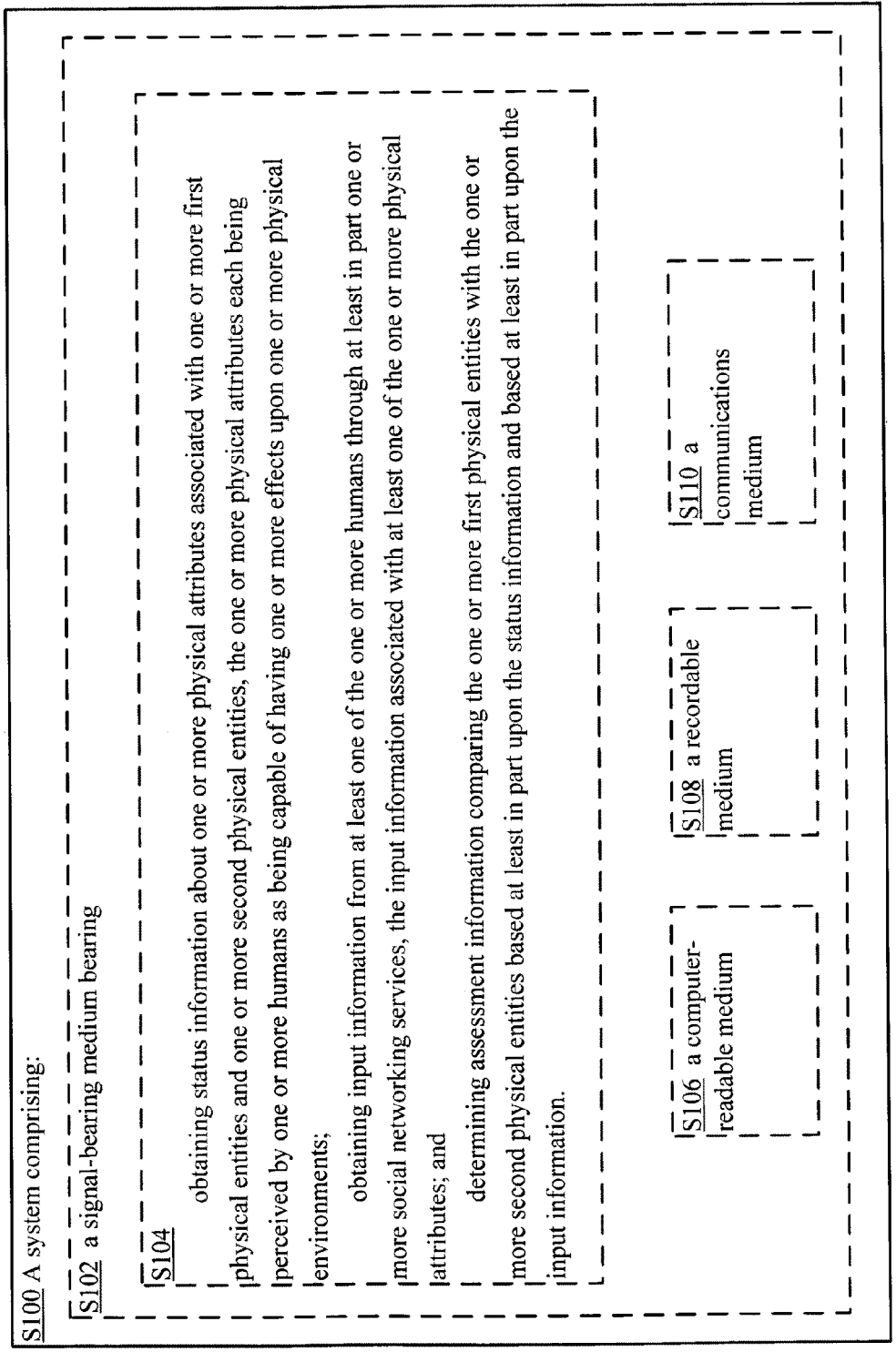

SYSTEM AND METHOD FOR COMPARISON OF PHYSICAL ENTITY ATTRIBUTE EFFECTS ON PHYSICAL ENVIRONMENTS THROUGH IN PART SOCIAL NETWORKING SERVICE INPUT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/592,547, entitled SYSTEM AND METHOD FOR ASSESSMENT OF PHYSICAL ENTITY ATTRIBUTE EFFECTS ON PHYSICAL ENVIRONMENTS THROUGH IN PART SOCIAL NETWORKING SERVICE INPUT, naming Rob Bernard, Angel Sarmento Calvo, Larry Cochrane, Jason Garms, Roderick A. Hyde, Royce A. Levien, Robert W. Lord, Richard T. Lord, Mark A. Malamud, Jennifer Mame Pollard, John D. Rinaldo, Jr., Clarence T. Tegreene, Rene A. Vega, Lowell L. Wood, Jr., Feng Zhao as inventors, filed 24, Nov., 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,543, entitled SYSTEM AND METHOD FOR OUTPUT OF ASSESSMENT OF PHYSICAL ENTITY ATTRIBUTE EFFECTS ON PHYSICAL ENVIRONMENTS THROUGH IN PART SOCIAL NETWORKING SERVICE INPUT, naming Rob Bernard, Angel Sarmento Calvo, Larry Cochrane, Jason Garms, Roderick A. Hyde, Royce A. Levien, Robert W. Lord, Richard T. Lord, Mark A. Malamud, Jennifer Mame Pollard, John D. Rinaldo, Jr., Clarence T. Tegreene, Rene A. Vega, Lowell L. Wood, Jr., Feng Zhao as inventors, filed 24, Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,545, entitled SYSTEM AND METHOD FOR ASSESSMENT OF PHYSICAL ENTITY ATTRIBUTE EFFECTS ON PHYSICAL ENVIRONMENTS THROUGH IN PART SOCIAL NETWORKING SERVICE INPUT, naming Rob Bernard, Angel Sarmento Calvo, Larry Cochrane, Jason Garms, Roderick A. Hyde, Royce A. Levien, Robert W. Lord, Richard T. Lord, Mark A. Malamud, Jennifer Mame Pollard, John D. Rinaldo, Jr., Clarence T. Tegreene, Rene A. Vega, Lowell L. Wood, Jr., Feng Zhao as inventors, filed 25, Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,542, entitled SYSTEM AND METHOD FOR OUTPUT OF ASSESSMENT OF PHYSICAL ENTITY ATTRIBUTE EFFECTS ON PHYSICAL ENVIRONMENTS THROUGH IN PART SOCIAL NETWORKING SERVICE INPUT, naming Rob Bernard, Angel Sarmento Calvo, Larry Cochrane, Jason Garms, Roderick A. Hyde, Royce A. Levien, Robert W. Lord, Richard T. Lord, Mark A. Malamud, Jennifer Mame Pollard, John D. Rinaldo, Jr., Clarence T. Tegreene, Rene A. Vega, Lowell L. Wood, Jr., Feng Zhao as inventors, filed 25, Nov. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.qov/web/offices/com/sol/oq/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A method includes, but is not limited to: obtaining status information about one or more physical attributes associated with one or more first physical entities and one or more second physical entities, the one or more physical attributes each being perceived by one or more humans as being capable of having one or more effects upon one or more physical environments, obtaining input information from at least one of the one or more humans through at least in part one or more social networking services, the input information associated with at least one of the one or more physical attributes, and determining assessment information comparing the one or more first physical entities with the one or more second physical entities based at least in part upon the status information and based at least in part upon the input information. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A system includes, but is not limited to: circuitry for obtaining status information about one or more physical attributes associated with one or more first physical entities and one or more second physical entities, the one or more physical attributes each being perceived by one or more humans as being capable of having one or more effects upon one or more physical environments, circuitry for obtaining input information from at least one of the one or more humans through at least in part one or more social networking services, the input information associated with at least one of the one or more physical attributes, and circuitry for determining assessment information comparing the one or more first physical entities with the one or more second physical entities based at least in part upon the status information and based at least in part upon the input information. In addition to the foregoing, other method aspects are described in the claims, drawings, and text forming a part of the present disclosure.

A system includes, but is not limited to: means for obtaining status information about one or more physical attributes associated with one or more first physical entities and one or more second physical entities, the one or more physical attributes each being perceived by one or more humans as being capable of having one or more effects upon one or more physical environments, means for obtaining input information from at least one of the one or more humans through at least in part one or more social networking services, the input information associated with at least one of the one or more physical attributes, and means for determining assessment information comparing the one or more first physical entities with the one or more second physical entities based at least in part upon the status information and based at least in part upon the input information. In addition to the foregoing, other method aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 37 is a high-level flowchart including exemplary implementations of operation O12 of FIG. 22.

FIG. 38 is a high-level flowchart including exemplary implementations of operation O12 of FIG. 22.

FIG. 39 is a high-level flowchart including exemplary implementations of operation O13 of FIG. 22.

FIG. 40 is a high-level flowchart including exemplary implementations of operation O13 of FIG. 22.

FIG. 41 illustrates a partial view of a system S100 that includes a computer program for executing a computer process on a computing device.

DETAILED DESCRIPTION

Figure 1:
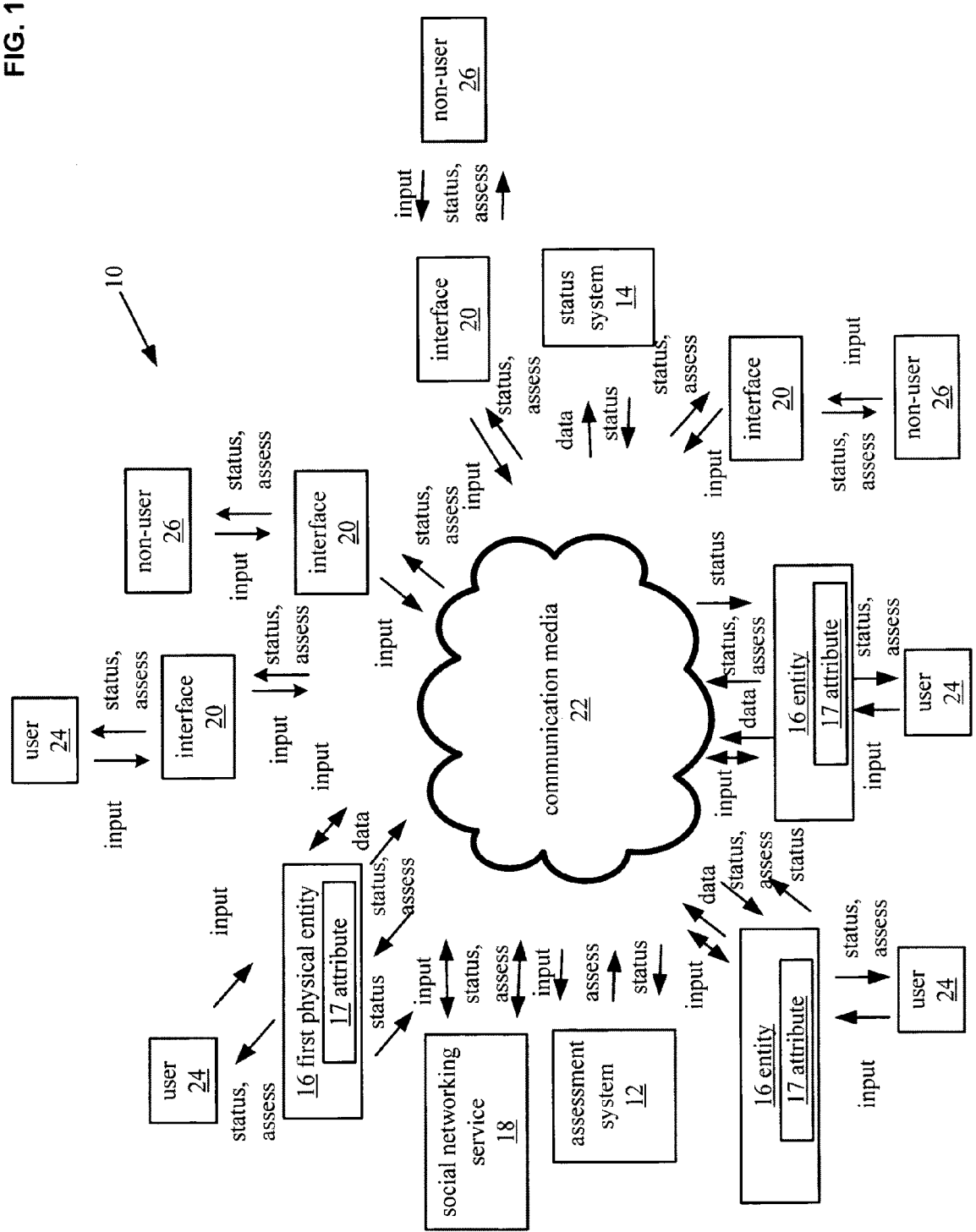
FIG. 1 is a block diagram of a general exemplary implementation of an information system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Physical entities, such as devices, etc including further description below, can have physical attributes that can be perceived to have one or more effects upon physical environments such as natural environments, built environments, etc including further description below. Assessment of such perceptions can be used to better disseminate, operate, and otherwise manage the physical entities.

An exemplary environment is depicted in FIG. 1 in which one or more aspects of various embodiments may be implemented. In the illustrated environment, a general exemplary implementation of a system 10 can include one or more assessment systems 12, one or more status systems 14, one or more physical entities 16 with one or more physical attributes 17, one or more social networking services 18, one or more interfaces 20, amongst which communication occurs over one or more communication media 22.

One or more users 24, typically humans, of the one or more physical entities 16 can communicate through the one or more communication media 22 through the one or more interfaces 20 and/or through the one or more physical entities 16. One or more non-users 26, typically humans that are not users of the one or more physical entities 16 can communicate through the one or more communication media 22 through the one or more interfaces 26. In general the one or more users 24 and/or the one or more non-users 26 can send through the one or more communication media 22 input information regarding their one or more perceptions as to one or more effects that can be imposed on one or more physical environments by the one or more attributes 17 of the one or more physical entities 16. This input information is typically sent from the one or more users 24 and/or the one or more non-users 26 to the one or more social networking services 18 to be managed.

Data regarding the one or more physical attributes 17 of the one or more physical entities 16 generally is sent from one or more sensors and/or one or more other data collectors to be received by the one or more status systems 24, either through the one or more communication media 22, such as shown in FIG. 1, or otherwise as found, for example, when the one or more status systems 24 and the one or more sensors are collocated as exemplified further below. The one or more status systems 14 then determine status information (for instance, status shown in FIG. 1) regarding the physical information and sends the status information to the one or more assessment systems 12 through the one or more communication media 22, as shown for example in FIG. 1, or otherwise such as when the one or more status systems 14 and the one or more assessment systems 12 are collocated including exemplifications below.

The one or more assessment systems 12 further receive the input information from the one or more users 24 and/or the one or more non-users 26 associated with the one or more physical attributes 17 of the one or more physical entities 17 through the one or more communication media 22 via the one or more social networking services 18. Input information is typically furnished by the one or more users 24 and/or the one or more non-users 26 via the one or more physical entities 16 and/or the one or more interfaces 20 with and/or without status information and/or prior generated assessment information being received thereby beforehand. Consequently, in some implementations the input information furnished by the one or more users 24 and/or the one or more non-users 26 can be based at least in part upon consideration thereby of status information received in addition to or exclusive of consideration of the one or more physical attributes apart from the status information.

The one or more assessment systems 12 can then determine assessment information for at least one of the one or more physical entities based at least in part upon the status information and based at least in part upon the input information received.

As a representative sampling of some of the possibilities by way of example without intention for limitation, implementations of the one or more assessment systems 12 can determine assessment information to include one or more summaries, incentives, statistics, projections, trends, present versus past values, actual values versus preferences or goals, scores, classifications, appraisals, judgments, measurements, baseline reflections, perspectives with respect to informal or formal standards, individual opinions, polls, group opinions, indicator modifications, avatar modifications, etc. Determining assessment information performed by the one or more assessment systems 12 can include use of computer-based programs, algorithms, databases, etc and/or receiving feedback from one or more the users 24 and/or one or more of the non-users 26 through the one or more social networking services 18.

As a representative sampling of some of the possibilities by way of example without intention for limitation, implementations of the one or more status systems 14 can determine status information to include use of one or more sensors in one or more physical entities, use of one or more sensors external to one or more physical entities, use of one or more remote sensors, receipt of one or more user input, use of one or more power line sensors, use of one or more power plug adapters, use of one or more breaker junction boxes, and/or receipt of one or more human observations. Obtaining status information can also involve use of sample storage found on one or more physical entities and/or centrally located such as on one or more servers. Obtaining status information can also include sampling per location (political geography, coordinate geography, neighborhood), sampling based on business class, based on profession, based on government affiliation, based on educational institution, based on social class. Obtaining status information can also include one or more sampling styles such as sampling on a single instance basis, sampling spanning a period: periodic, sporadic sampling, sampling on demand, sampling initiated by one or more individuals, sampling at will, automatic sampling per use, sampling initiated by an authority, sampling as calibration checking, sampling spanning a period of time such as lifetime, a year, month, week, day, hour, minute, second, per load, per a predefined action or event.

As a representative sampling of some of the possibilities by way of example without intention for limitation, implementations of the one or more physical entities 16 can include vehicles such as land vehicles, for instance, trucks, automobiles, buses, motorcycles, go-peds, all terrain vehicles, ambulances, garbage trucks, construction vehicles, such as air vehicles, for instance, airplanes, helicopters, drones, such as water vehicles, for instance, boats, jet skis, submarines, hydrofoils, can include habitations such as houses, apartments, hotels, schools, factories, offices, hospitals, service centers, shopping centers, stores, warehouses, military structures, entertainment centers, can include appliances such as kitchen appliances, for instance, dishwashers, stoves, ovens, blenders, grills, such as laundry appliances, for instance, washers, dryers, irons, such as landscape care appliances, for instance, lawn mowers, yard blowers, such as building environmental control, for instance, heating furnaces, air conditioning, lighting, sound emitters, thermostats, such as hand-held devices, for instance, cell phones, iPods, laptops, such as clothing, for instance, shoes, pants, shirts, dresses, eyewear, such as containers, for instance, dumpsters, trash cans, such as used items, for instance containers, garbage, paper products, newspapers, cans, bottles, furniture, household items, such as sound emitters, for instance, stereo speakers, audio devices, engines, boom boxes, humans, animals, dogs, vehicle traffic, such as gas emitters, for instance, smokestacks, chimneys, tailpipes, such as liquid emitters, for instance, noxious liquid emitters, fragrant liquid emitters, etc.

As a representative sampling of some of the possibilities by way of example without intention for limitation, implementations of the one or more physical attributes 17 can include use history, can include energy related factors such energy usage such as gas mileage, annual fuel consumption, cumulative fuel use over a specified period of time, miles per gallon, miles per passenger, indoor temperature, average difference between indoor and outdoor temperature, average indoor temperature, can include emissions such as substance emissions, for instance, gas emissions like carbon dioxide emissions, noxious gas emissions, odoriferous gas emissions, for instance liquid emissions like toxic liquid emissions, water emissions, oil emissions, for instance solid emissions like non-biodegradable solid emissions, biodegradable solid emissions, noxious solid emissions, can include sound emissions such as constant sound emissions, intermittent sound emissions, low frequency sound emissions, high frequency sound emissions, can include seismic emissions such as road vibration, explosion based emissions, can include light emissions such as intermittent light emissions, constant light emissions, visible light emissions, ultraviolet emissions, infrared light emissions, can include thermal emissions such as gas based thermal emissions, liquid based thermal emissions, or solid based thermal emissions, etc.

As a representative sampling of some of the possibilities by way of example without intention of limitation, implementations of the one or more social networking services 18 can include one or more online groups or communities of people who typically share something such as one or more interests, activities, goals, uses, ownership, etc. Implementations of the one or more social networking services 18 can include one or more web based services such as Facebook, Twitter, LinkedIn, MySpace, Nexopia, Friendster, Multiply, etc. Implementations of the one or more social networking services 18 can provide facilities for users to create profiles for themselves. Implementations of the one or more social networking services 18 can have various classifications such as for internal social networking or for external social networking. Implementations of the one or more social networking services 18 as internal social networking services can be closed, private groups of people within associations, companies, educational institutions, societies, or organizations such as those formed through invitation only arrangements. Implementations of the one or more social networking services 18 as external social networking services can include those open to the public such as most or all users of the internet and includes an advertising model to help support operations. The one or more social networking services 18 can include members and others with one or more interests such as environmental issues, for instance, climate change, preservation of species, forests, wildernesses, pollution control, waste management, recycling, energy conservation, sustainable energy sources, sustainable agriculture, and/or can specialize in one or more particular interests, etc.

As a representative sampling of some of the possibilities by way of example without intention of limitation, implementations of the one or more interfaces 20 can include one or more display screens, display monitors, personal data assistants (PDAs), laptop computers, desktop computers, cell phones, hand-held devices, keyboards, mice, trackballs, voice recognition systems, handwriting recognition systems, gesture recognition systems, projected displays, etc.

As a representative sampling of some of the possibilities by way of example without intention of limitation, implementations of the one or more communication media 22 can include one or more wired communication networks such as one or more fiber optic network, one or more cable network, one or more twisted pair network, etc, can include one or more wireless communication networks such as RF, cellular, Wi-Fi, Bluetooth, 3G, etc. or other communication media.

As a representative sampling of some of the possibilities by way of example without intention of limitation, associated with can include one or more various ways that two or more concepts, things, constructs, etc. are brought into relationship such as through physical interaction, and/or memory and/or imagination of a perceiver thereof, etc.

As a representative sampling of some of the possibilities by way of example without intention of limitation, input information can include one or more positive and/or negative comments, instructions, descriptions, opinions, selections, demands, preferences, warnings, persuasions, facts, data, etc.

As a representative sampling of some of the possibilities by way of example without intention of limitation, obtaining input information can include receiving wirelessly, and/or receiving through one or more wired connections, etc. such as through the one or more communication media 22 and/or through other means such as direct input into the one or more assessment systems 12, such as through the one or more interfaces 20 being directly connected to the one or more assessment systems 12, for example as a keyboard, touch screen, voice recognition, other input means, etc.

As a representative sampling of some of the possibilities by way of example without intention of limitation, components of natural and/or built environments can include animals, vegetation, microorganisms, rocks, soil, atmosphere, bodies of water, and other natural phenomena that occur with one or more boundaries thereof. Components of built environments can further include man-made items such as architectural, civil, transportation structures, and/or other structures.

As a representative sampling of some of the possibilities by way of example without intention of limitation, effects can include factors that may modify, harm, change, impact, and/or benefit the effected. For instance, one or more effects can include increasing or decreasing such as increasing or decreasing temperature, sound level, level of a chemical constituent, energy use, species population, aesthetic quality, etc.

As a representative sampling of some of the possibilities by way of example without intention of limitation, obtaining status information can include use of one or more sensors in one or more physical entities, use of one or more sensors external to one or more physical entities, use of one or more remote sensors, receipt of one or more user input, use of one or more power line sensors, use of one or more power plug adapters, use of one or more breaker junction boxes, and/or receipt of one or more human observations. Obtaining status information can also involve use of sample storage found on one or more physical entities and/or centrally located such as on one or more servers. Obtaining status information can also include sampling per location (political geography, coordinate geography, neighborhood), sampling based on business class, based on profession, based on government affiliation, based on educational institution, based on social class. Obtaining status information can also include one or more sampling styles such as sampling on a single instance basis, sampling spanning a period: periodic, sporadic sampling, sampling on demand, sampling initiated by one or more individuals, sampling at will, automatic sampling per use, sampling initiated by an authority, sampling as calibration checking, sampling spanning a period of time such as lifetime, a year, month, week, day, hour, minute, second, per load, per a predefined action or event.

As a representative sampling of some of the possibilities by way of example without intention of limitation, perceived by one or more humans can include proper and/or improper understandings by the one or more humans. Perception can be based upon scientific understanding, religious biases, philosophical preferences, and/or any other sort of belief, opinion, thought, etc. whether correctly or incorrectly held.

As a representative sampling of some of the possibilities by way of example without intention of limitation, physical environments can include one or more natural environments having living and/or non-livings things naturally occurring on Earth or one or more regions thereof without significant human intervention such as including land based environments, or water based environments, and/or combinations thereof. Physical environments can include built environments having significant human intervention such as farmland, townships, cities, industrial parks, office parks, military installations, governmental projects, etc.

As a representative sampling of some of the possibilities by way of example without intention of limitation, status information of a subject can include information regarding one or more states of the subject, information that is cumulative over one or more previous periods, information that includes one or more past states of the subject, information that includes one or more present states of the subject, information that includes one or more projected states of the subject, or one or more combinations thereof.

Figure 2:
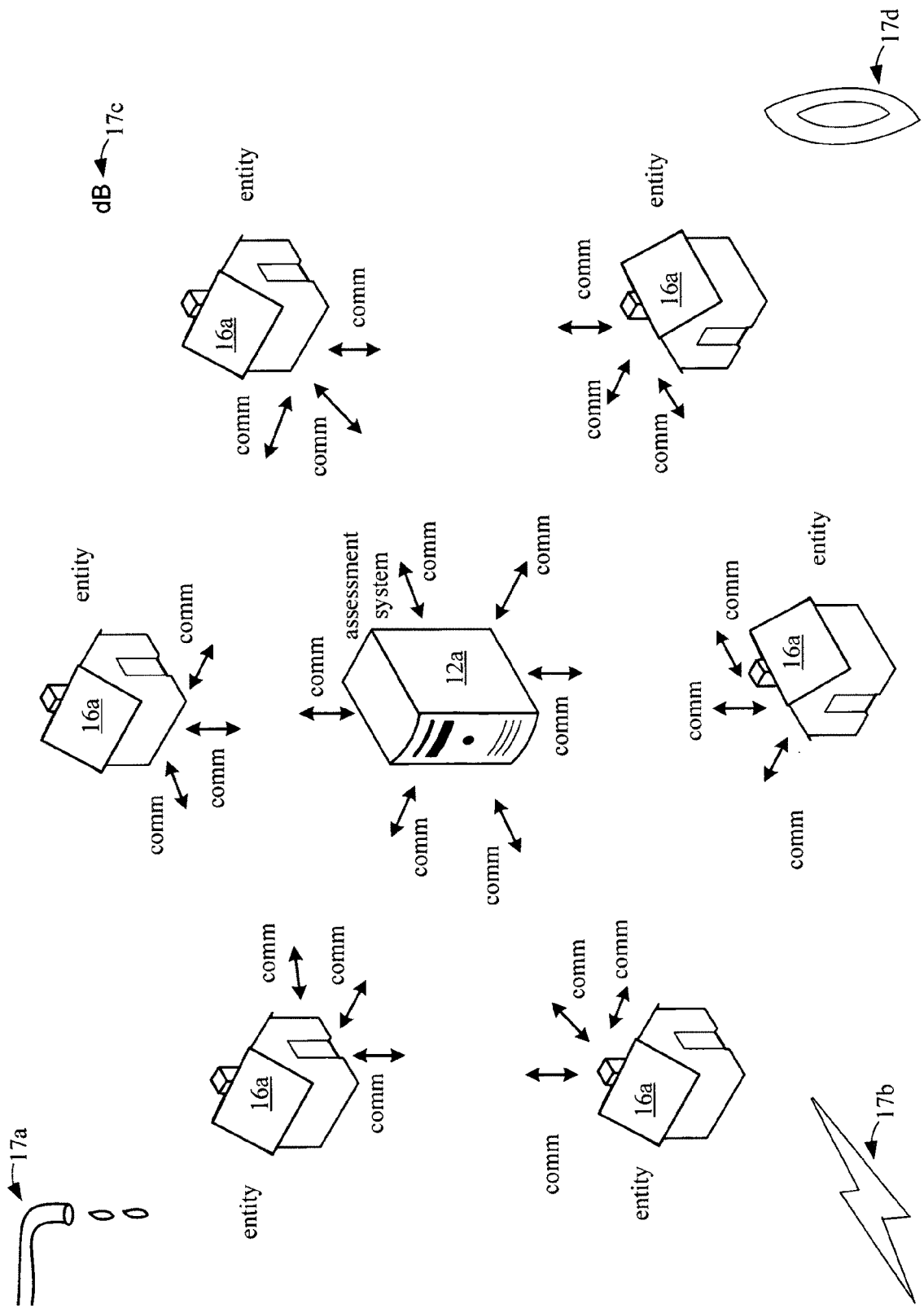
FIG. 2 is a schematic diagram depicting an exemplary environment suitable for application of a first exemplary implementation of the general exemplary implementation of the information system of FIG. 1.

As shown in FIG. 2, an exemplary implementation of the system 10 is applied to an environment in which the one or more physical entities 16 are at least portions of one or more architectural structures 16a such as houses, office buildings, etc with the one or more physical attributes 17 depicted as including water usage 17a, electricity usage 17b, sound emission 17c, and/or thermal conditioning 17d such as heating, ventilation, and/or air conditioning.

Figure 3:
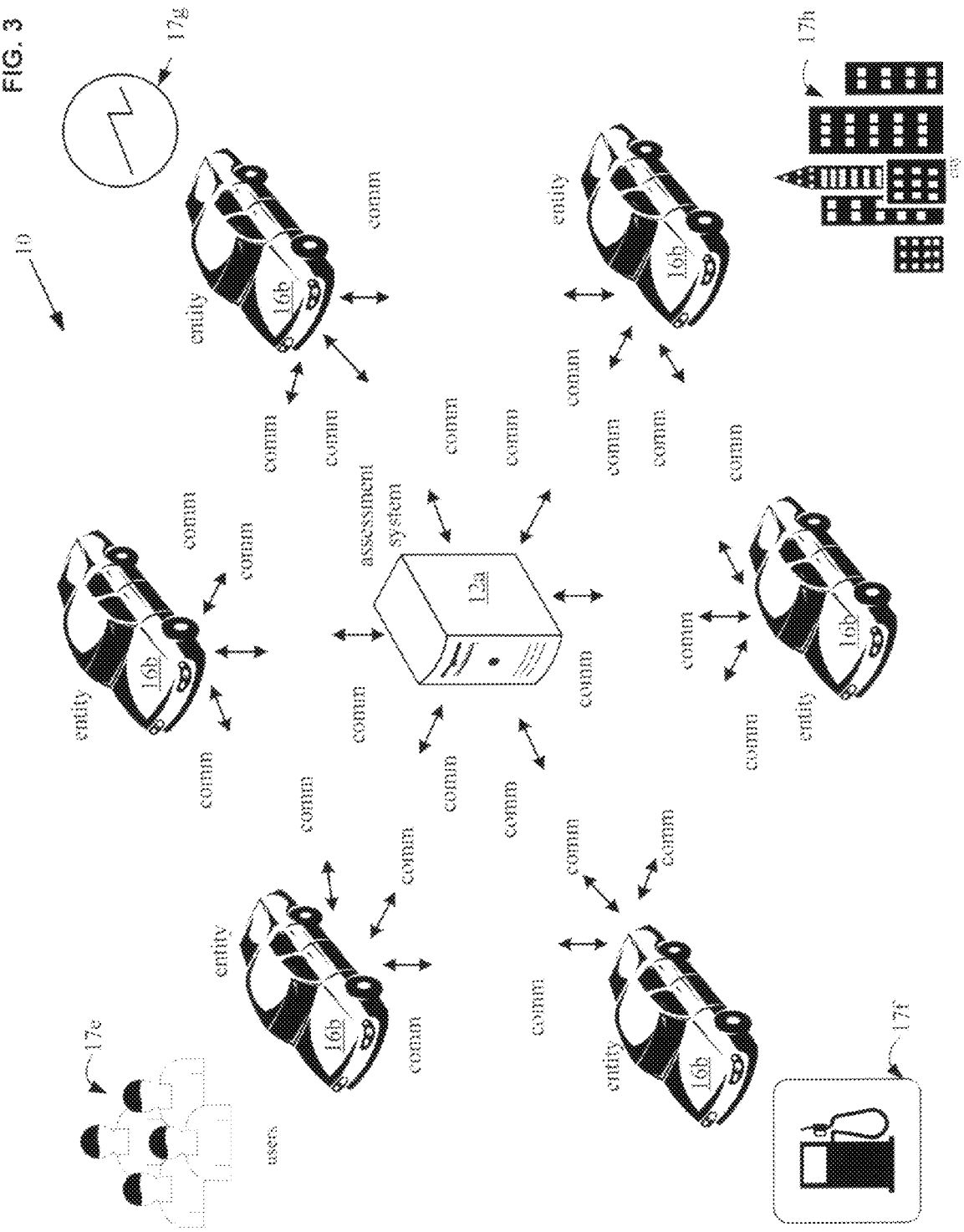
FIG. 3 is a schematic diagram depicting an exemplary environment suitable for application of a second exemplary implementation of the general exemplary implementation of the information system of FIG. 1.

As shown in FIG. 3, an exemplary implementation of the system 10 is applied to an environment in which the one or more physical entities 16 are at least portions of one or more vehicles 16b such as automobiles, trucks, buses, etc with the one or more physical attributes 17 depicted as including passenger count 17e, fuel usage 17f, recorded operational parameters 17g, such as speed, or distance, and/or route information 17h such as regarding restricted access areas of various designations such as only certain one or more classes of vehicles are permitted at certain times.

Figure 4:
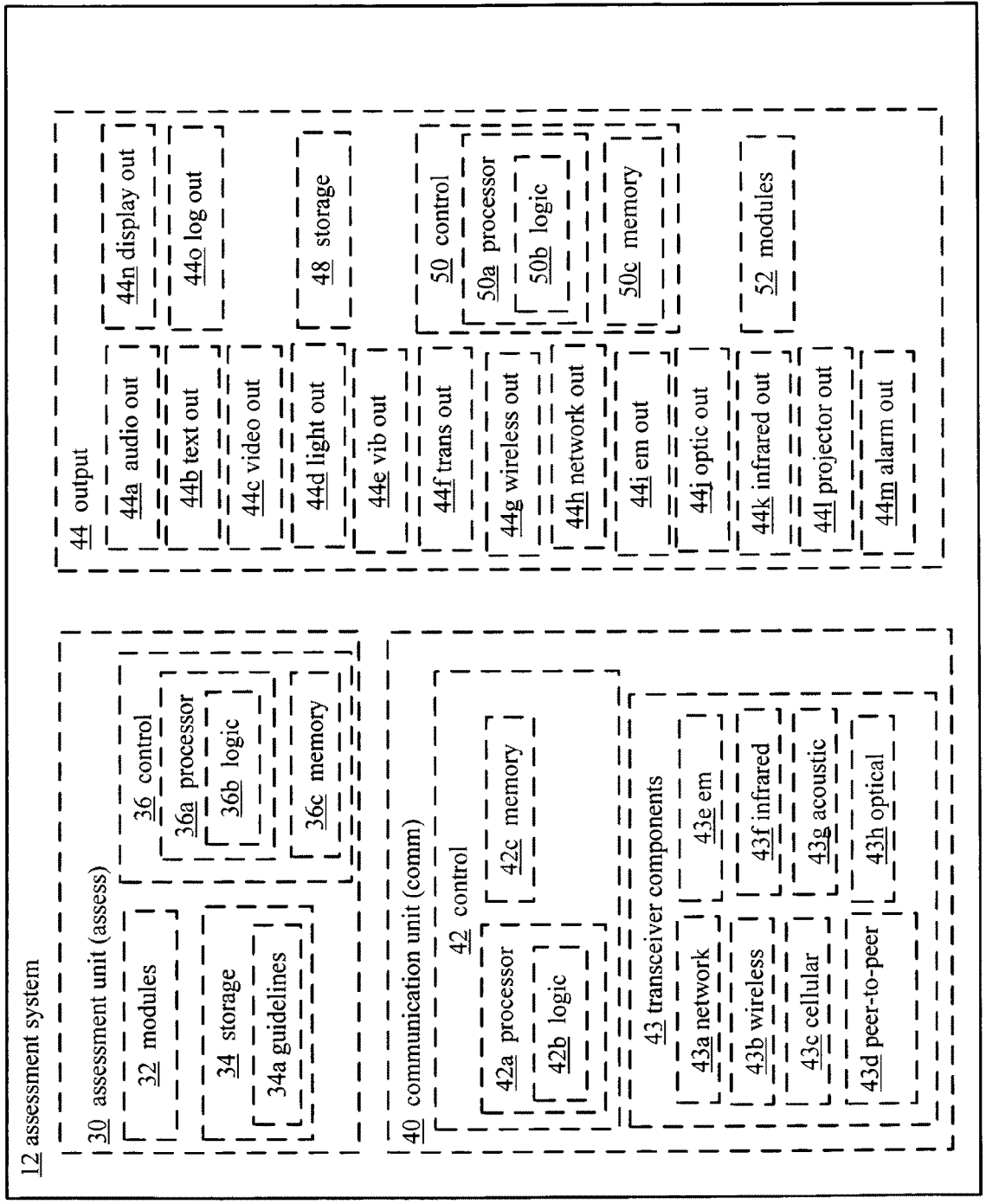
FIG. 4 is a block diagram of an exemplary implementation of an assessment system forming a portion of an implementation of the general exemplary implementation of the information system of FIG. 1.

An assessment system 12 is shown in FIG. 4 to optionally one or more assessment units 30, one or more communication units 40, and one or more outputs 44.

The one or more assessment units 30 can have one or more modules 32, can have one or more storage units 34 with one or more guidelines 34a, and can have one or more controls 36 having one or more processors 36a, with one or more logics 36b and having one or more memories 36c.

The one or more communication units 40 can have one or more controls 42 having one or more processors 42a with one or more logic 42b and having one or more memories 42c. The one or more communication units 40 can have one or more transceiver components 43 having one or more network components 43a, wireless components 43b, cellular components 43c, peer-to-peer components 43d, electromagnetic components 43e, infrared components 43f, acoustic components 43g, and optical components 43h.

The one or more outputs 44 can have one or more audio outputs 44a, text outputs 44b, video outputs 44c, light outputs 44d, vibration outputs 44e, transmitter outputs 44f, wireless outputs 44g, network outputs 44h, electromagnetic outputs 44i, optic outputs 44j, infrared outputs 44k, projector outputs 44l, alarm outputs 44m, display outputs 44n, and/or log outputs 44o. The one or more outputs 44 can further include one or more storage 48 to store data, etc., controls 50 having processors 50a with logic 50b and memory 50c, and can include modules 52.

Figure 4A:
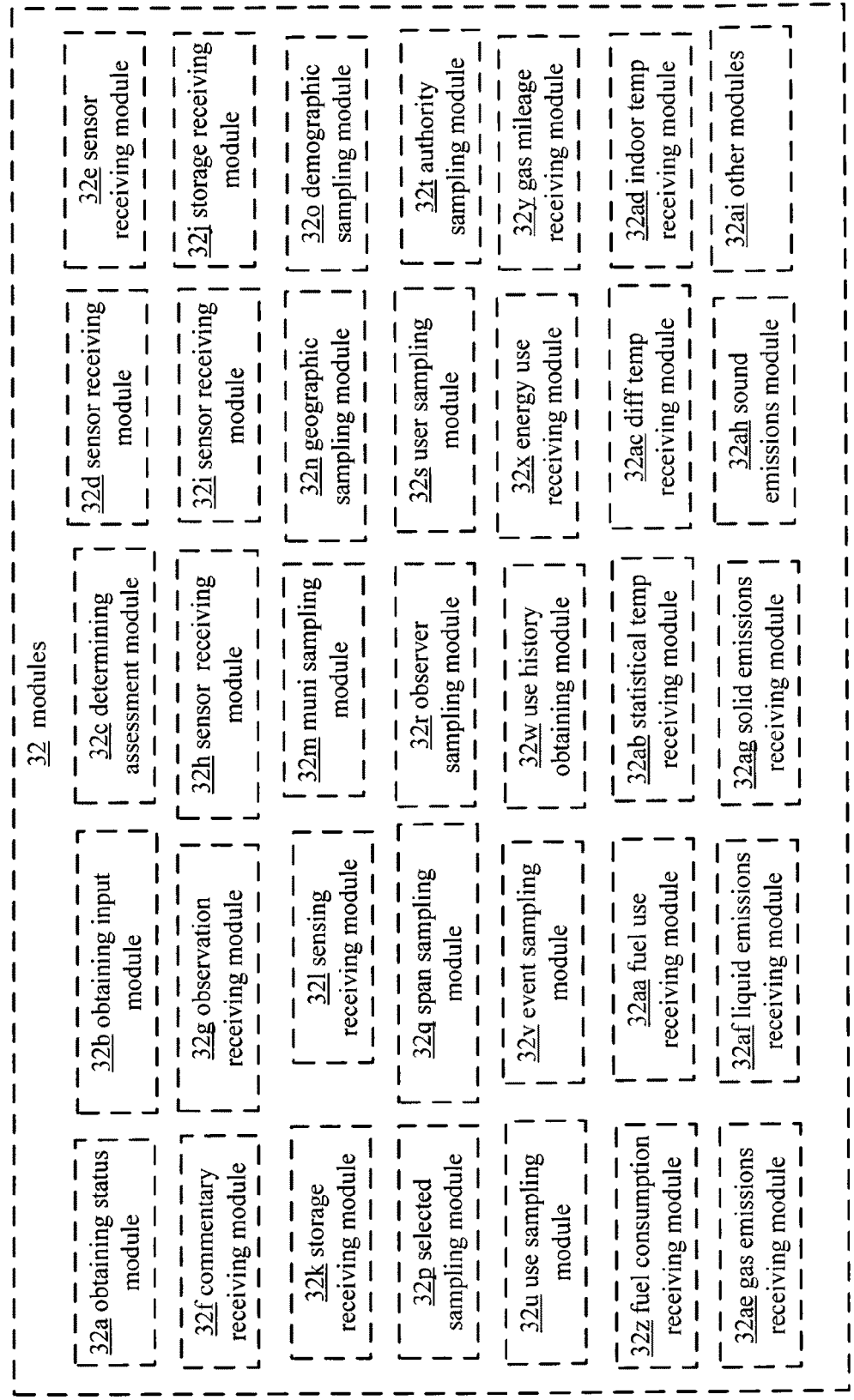
FIG. 4A is a block diagram of a first plurality of modules for the exemplary implementation of an assessment system of FIG. 4.

The one or more modules 32 are depicted in FIG. 4A to include an obtaining status module 32*a*, an obtaining input module 32*b*, a determining assessment module 32*c*, a sensor receiving module 32*d*, a sensor receiving module 32*e*, a commentary receiving module 32*f*, an observation receiving module 32*g*, a sensor receiving module 32*h*, a sensor receiving module 32*i*, a storage receiving module 32*j*, a storage receiving module 32*k*, a sensing receiving module 32*l*, a muni sampling module 32*m*, a geographic sampling module 32*n*, a demographic sampling module 32*o*, a selected sampling module 32*p*, a span sampling module 32*q*, an observer sampling module 32*r*, a user sampling module 32*s*, an authority sampling module 32*t*, a use sampling module 32*u*, an event sampling module 32*v*, a use history obtaining module 32*w*, an energy use receiving module 32*x*, a gas mileage receiving module 32*y*, a fuel consumption receiving module 32*z*, a fuel use receiving module 32*aa*, a statistical temperature receiving module 32*ab*, a differential temperature receiving module 32*ac*, an indoor temperature receiving module 32*ad*, a gas emissions receiving module 32*ae*, a liquid emissions receiving module 32*af*, a solid emissions receiving module 32*ag*, a sound emissions module 32*ah*, and an other modules 32*ai*.

Figure 4B:
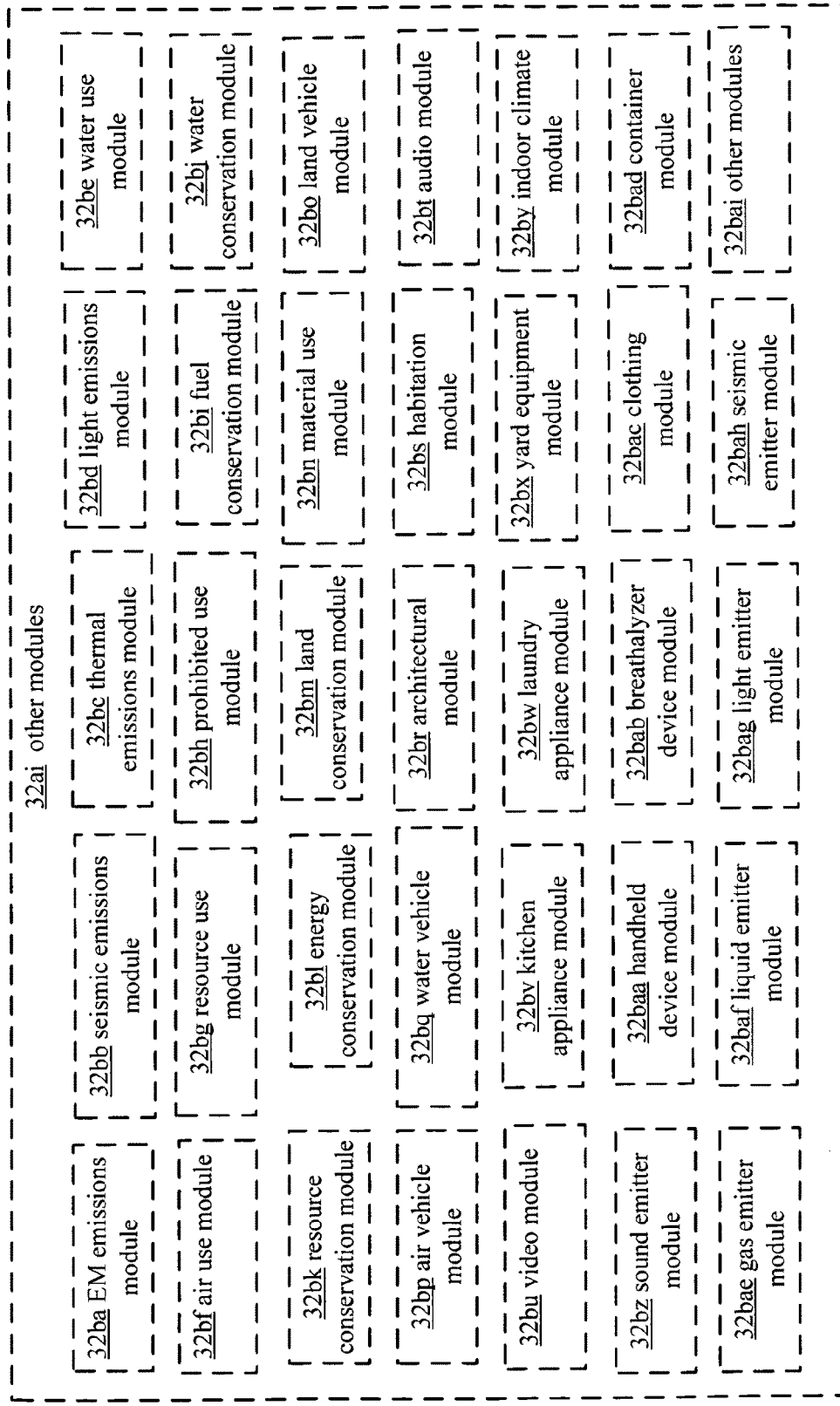
FIG. 4B is a block diagram of a second plurality of modules for the exemplary implementation of an assessment system of FIG. 4.

The other modules 32*ai* are depicted in FIG. 4B as including an electromagnetic emissions module 32*ba*, a seismic emissions module 32*bb*, a thermal emissions module 32*bc*, a light emissions module 32*bd*, a water use module 32*be*, an air use module 32*bf*, a resource use module 32*bg*, a prohibited use module 32*bh*, a fuel conservation module 32*bi*, a water conservation module 32*bj*, a resource conservation module 32*bk*, an energy conservation module 32*bl*, a land conservation module 32*bm*, a material use module 32*bn*, a land vehicle module 32*bo*, an air vehicle module 32*bp*, a water vehicle module 32*bq*, an architectural module 32*br*, a habitation module 32*bs*, an audio module 32*bt*, a video module 32*bu*, a kitchen appliance module 32*bv*, a laundry appliance module 32*bw*, a yard equipment module 32*bx*, an indoor climate module 32*by*, a sound emitter module 32*bz*, a handheld device module 32*baa*, a breathalyzer device module 32*bab*, a clothing module 32*bac*, a container module 32*bad*, a gas emitter module 32*bae*, a liquid emitter module 32*baf*, a light emitter module 32*bag*, a seismic emitter module 32*bah*, and an other modules 32*bai*.

Figure 4C:
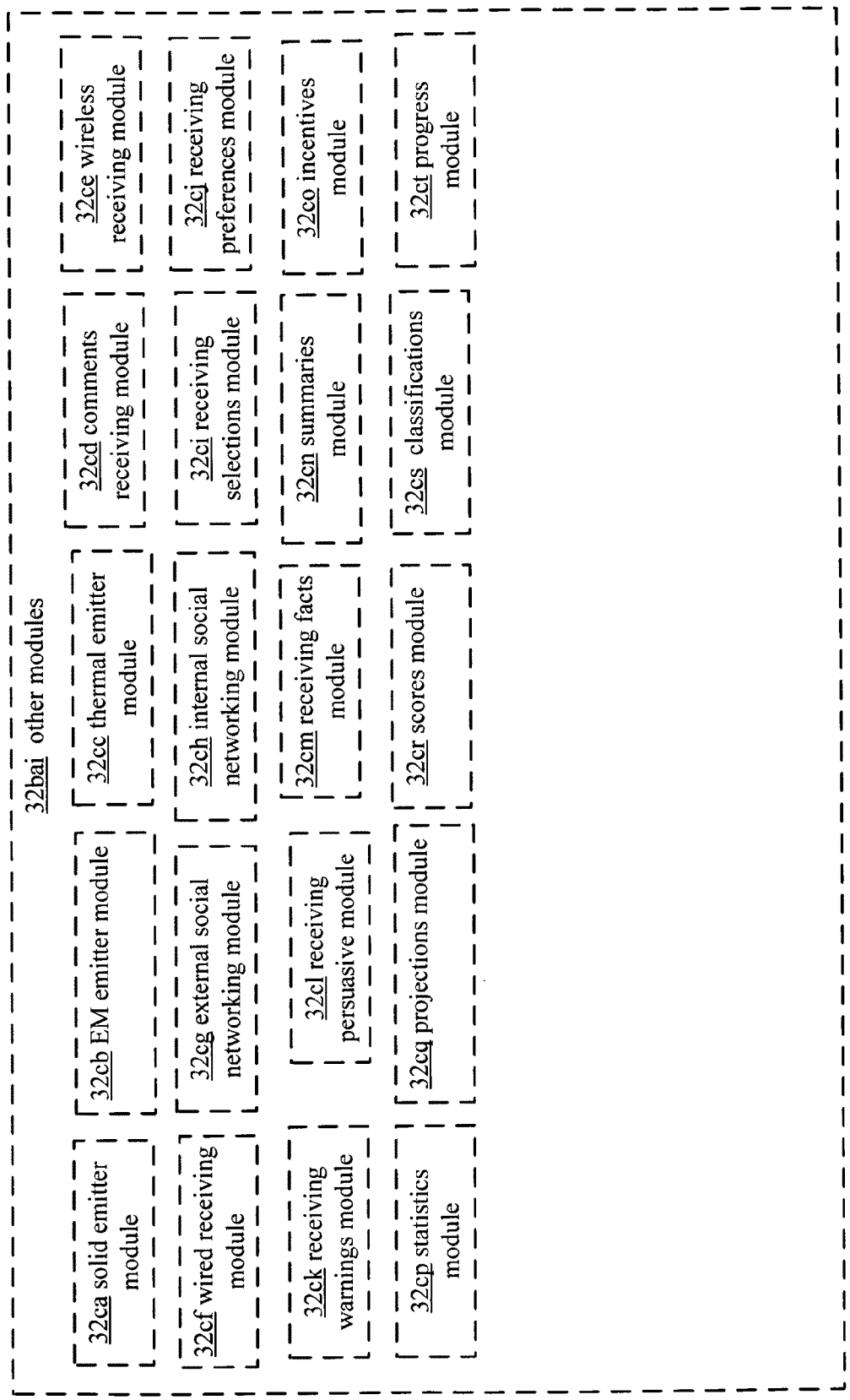
FIG. 4C is a block diagram of a third plurality of modules for the exemplary implementation of an assessment system of FIG. 4.

The other modules 32*bai* is depicted in FIG. 4C as including a solid emitter module 32*ca*, an electromagnetic emitter module 32*cb*, a thermal emitter module 32*cc*, a comments receiving module 32*cd*, a wireless receiving module 32*ce*, a wired receiving module 32*cf*, an external social networking module 32*cg*, an internal social networking module 32*ch*, a receiving selections module 32*ci*, a receiving preferences module 32*cj*, a receiving warnings module 32*ck*, a receiving persuasive module 32*cl*, a receiving facts module 32*cm*, a summaries module 32*cn*, an incentives module 32*co*, a statistics module 32*cp*, a projections module 32*cq*, a scores module 32*cr*, a classifications module 32*cs*, a progress module 32*ct* and an.

In general, similar or corresponding systems, units, components, or other parts are designated with the same reference number throughout, but each with the same reference number can be internally composed differently. For instance, the communication unit 40 is depicted in various Figures as being used by various components, systems, or other items such as by examples of the assessment system in FIG. 3 and the status system of FIG. 5, but is not intended that the same instance or copy of the communication unit 40 is used in all of these cases, but rather various versions of the communication unit having different internal composition can be used to satisfy the requirements of each specific instance.

Figure 5:
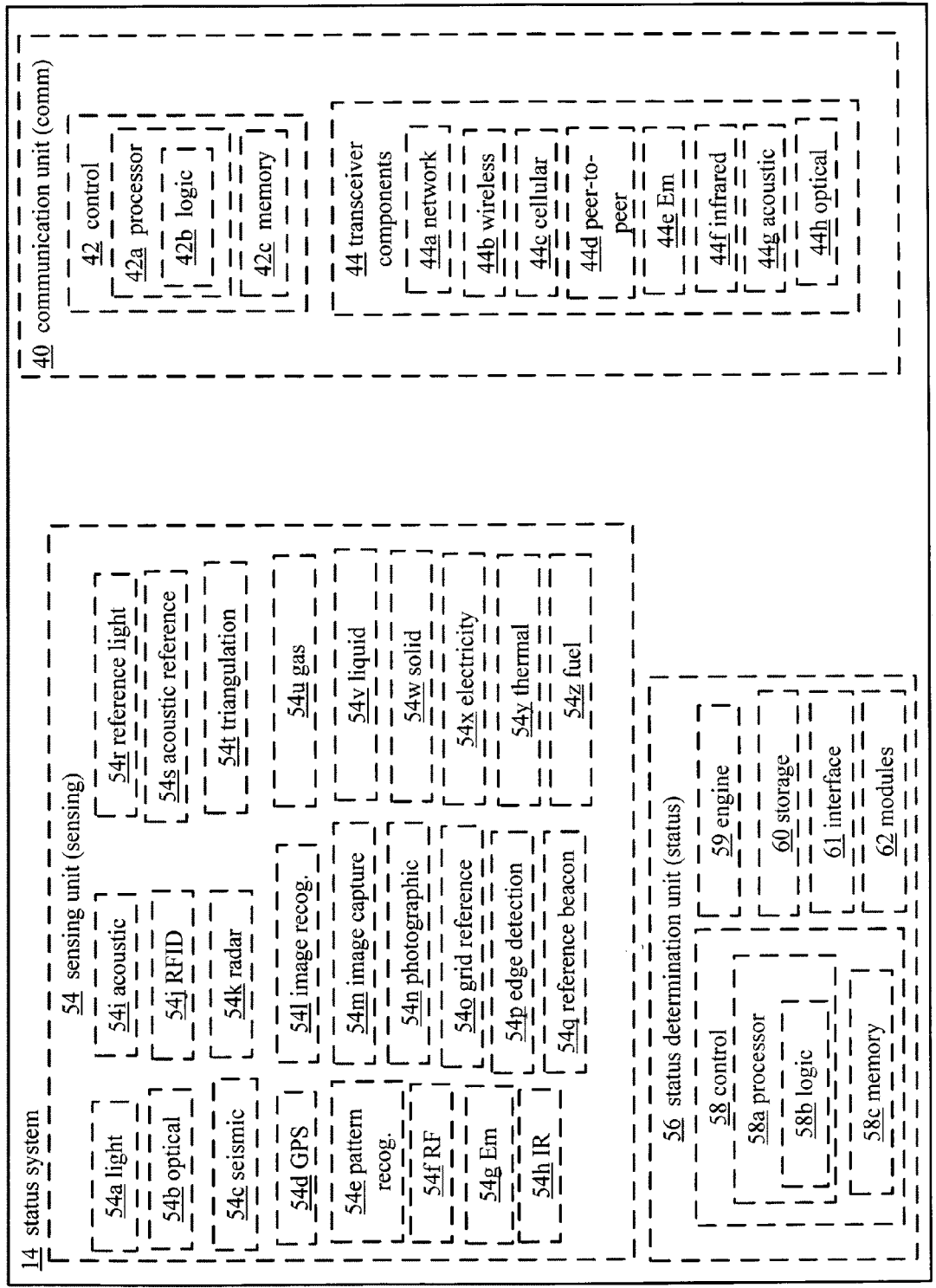
FIG. 5 is a block diagram of an exemplary implementation of a status system forming a portion of an implementation of the general exemplary implementation of the information system of FIG. 1.

A status system 14 is shown in FIG. 5 to optionally include the communication unit 40, the sensing unit 54, and the status determination unit 56. The sensing unit 54 is further shown to optionally include a light based sensing component 54*a*, an optical based sensing component 54*b*, a seismic based sensing component 54*c*, a global positioning system (GPS) based sensing component 54*d*, a pattern recognition based sensing component 54*e*, a radio frequency based sensing component 54*f*, an electromagnetic (EM) based sensing component 54*g*, an infrared (IRO sensing component 54*h*, an acoustic based sensing component 54*i*, a radio frequency identification (RFID) based sensing component 54*j*, a radar based sensing component 54*k*, an image recognition based sensing component 54*l*, an image capture based sensing component 54*m*, a photographic based sensing component 54*n*, a grid reference based sensing component 54*o*, an edge detection based sensing component 54*p*, a reference beacon based sensing component 54*q*, a reference light based sensing component 54*r*, an acoustic reference based sensing component 54*s*, a triangulation based sensing component 54*t*, a gas based sensing component 54*u*, a liquid based sensing component 54*v*, a solid based sensing component 54*w*, an electricity based sensing component 54*x*, a thermal based sensing component 54*y*, and a fuel based sensing component 54*z*.

The sensing unit 54 can include use of one or more of its various based sensing components to acquire information regarding the one or more physical attributes 17 of the physical entities 16. For instance, the light based sensing component 54*a* can include light receivers to collect light from the one or more physical entities 16 and/or other emitters or ambient light that was reflected off or otherwise have interacted with the physical entities to acquire information regarding the one or more physical attributes 17 such as regarding color, position, motion, etc. of the physical entities 16. The optical based sensing component 54*b* can include optical based receivers to collect light from the one or more physical entities 16 and/or other optical emitters that have interacted with the one or more physical entities to acquire information regarding the one or more physical attributes 17 of the physical entities 16.

For instance, the seismic based sensing component 54*c* can include seismic receivers to collect seismic waves from the one or more physical entities 16 and/or other seismic emitters or ambient seismic waves that have interacted with the one or more physical entities to acquire information regarding the one or more physical attributes 17 of the physical entities 16. The global positioning system (GPS) based sensing component 54*d* can include GPS receivers to collect GPS information associated with the one or more physical entities 16 to acquire information regarding the one or more physical attributes 17 of the physical entities 16. The pattern recognition based sensing component 54*e* can include pattern recognition algorithms to operate with the determination engine 59 of the status determination unit 56 to recognize patterns in information received by the sensing unit 54 to acquire information regarding the one or more physical attributes 17 of the physical entities 16.

For instance, the radio frequency based sensing component 54*f* can include radio frequency receivers to collect radio frequency waves from the one or more physical entities 16 and/or other radio frequency emitters or ambient radio frequency waves that have interacted with the one or more physical entities to acquire information regarding the one or more physical attributes 17 of the physical entities 16. The electromagnetic (EM) based sensing component 54*g*, can include electromagnetic frequency receivers to collect electromagnetic frequency waves from the one or more physical entities 16 and/or other electromagnetic frequency emitters or ambient electromagnetic frequency waves that have interacted with the one or more physical entities 16 to acquire information regarding the one or more physical attributes 17 of the physical entities 16. The infrared sensing component 54$h$ can include infrared receivers to collect infrared frequency waves from the one or more physical entities 16 and/or other infrared frequency emitters or ambient infrared frequency waves that have interacted with the one or more physical entities to acquire information regarding the one or more physical attributes 17 of the physical entities.

For instance, the acoustic based sensing component 54$i$ can include acoustic frequency receivers to collect acoustic frequency waves from the one or more physical entities 16 and/or other acoustic frequency emitters or ambient acoustic frequency waves that have interacted with the one or more physical entities to acquire information regarding the one or more physical attributes 17 of the physical entities 16. The radio frequency identification (RFID) based sensing component 54$j$ can include radio frequency receivers to collect radio frequency identification signals from the one or more physical entities 16 and/or other RFID emitters associated with the one or more physical entities 16 to acquire information regarding the one or more physical attributes 17 of the physical entities 16. The radar based sensing component 54$k$ can include radar frequency receivers to collect radar frequency waves from the one or more physical entities 16 and/or other radar frequency emitters or ambient radar frequency waves that have interacted with the one or more physical entities 16 to acquire information regarding the one or more physical attributes 17 of the physical entities 16.

The image recognition based sensing component 54$l$ can include image receivers to collect images of the one or more physical entities 16 and one or more image recognition algorithms to recognition aspects of the collected images optionally in conjunction with use of the determination engine 59 of the status determination unit 56 to acquire information regarding the one or more physical attributes 17 of the physical entities 16.

The image capture based sensing component 54$m$ can include image receivers to collect images of the one or more physical entities 16 to acquire information regarding the one or more physical attributes 17 of the physical entities 16. The photographic based sensing component 54$n$ can include photographic cameras to collect photographs of the one or more physical entities 16 to acquire information regarding the one or more physical attributes 17 of the physical entities 16.

The grid reference based sensing component 54$o$ can include a grid of sensors (such as contact sensors, photo-detectors, optical sensors, acoustic sensors, infrared sensors, or other sensors) adjacent to, in close proximity to, or otherwise located to sense one or more spatial aspects of the one or more physical entities 16 such as location, position, orientation, visual placement, visual appearance, and/or conformation. The grid reference based sensing component 54$o$ can also include processing aspects to prepare sensed information for the status determination unit 56.

The edge detection based sensing component 54$p$ can include one or more edge detection sensors (such as contact sensors, photo-detectors, optical sensors, acoustic sensors, infrared sensors, or other sensors) adjacent to, in close proximity to, or otherwise located to sense one or more spatial aspects of the physical entities 16 such as location, position, orientation, visual placement, visual appearance, and/or conformation. The edge detection based sensing component 54$p$ can also include processing aspects to prepare sensed information for the status determination unit 56.

The reference beacon based sensing component 54$q$ can include one or more reference beacon emitters and receivers (such as acoustic, light, optical, infrared, or other) located to send and receive a reference beacon to calibrate and/or otherwise detect one or more spatial aspects of the physical entities 16 such as location, position, orientation, visual placement, visual appearance, and/or conformation. The reference beacon based sensing component 54$q$ can also include processing aspects to prepare sensed information for the status determination unit 56.

The reference light based sensing component 54$r$ can include one or more reference light emitters and receivers located to send and receive a reference light to calibrate and/or otherwise detect one or more spatial aspects of the physical entities 16 such as location, position, orientation, visual placement, visual appearance, and/or conformation. The reference light based sensing component 54$r$ can also include processing aspects to prepare sensed information for the status determination unit 56.

The acoustic reference based sensing component 54$s$ can include one or more acoustic reference emitters and receivers located to send and receive an acoustic reference signal to calibrate and/or otherwise detect one or more spatial aspects of the physical entities 16 such as location, position, orientation, visual placement, visual appearance, and/or conformation. The acoustic reference based sensing component 54$s$ can also include processing aspects to prepare sensed information for the status determination unit 56.

The triangulation based sensing component 54$t$ can include one or more emitters and receivers located to send and receive signals to calibrate and/or otherwise detect using triangulation methods one or more spatial aspects of the objects 12 such as location, position, orientation, visual placement, visual appearance, and/or conformation. The triangulation based sensing component 54$t$ can also include processing aspects to prepare sensed information for the status determination unit 56.

The gas based sensing component 54$u$ can include one or more sensors to detect gas emissions or related gas conditions associated with the one or more physical entities 16. The gas based sensing component 54$u$ can also include processing aspects to prepare sensed information for the status determination unit 56.

The liquid based sensing component 54$v$ can include one or more sensors to detect liquid emissions or related liquid conditions associated with the one or more physical entities 16. The liquid based sensing component 54$v$ can also include processing aspects to prepare sensed information for the status determination unit 56.

The solid based sensing component 54$w$ can include one or more sensors to detect solid emissions or related solid conditions associated with the one or more physical entities 16. The solid based sensing component 54$w$ can also include processing aspects to prepare sensed information for the status determination unit 56.

The electricity based sensing component 54$x$ can include one or more sensors to detect electricity usage or related electricity conditions associated with the one or more physical entities 16. The electricity based sensing component 54$x$ can also include processing aspects to prepare sensed information for the status determination unit 56.

The thermal based sensing component 54$y$ can include one or more sensors to detect thermal emissions or related thermal conditions associated with the one or more physical entities 16. The thermal based sensing component 54$y$ can also include processing aspects to prepare sensed information for the status determination unit 56.

The fuel based sensing component 54z can include one or more sensors to detect fuel usage or related fuel conditions associated with the one or more physical entities 16. The fuel based sensing component 54u can also include processing aspects to prepare sensed information for the status determination unit 56.

The status determination unit 56 is further shown in FIG. 5 to optionally include one or more control units 58 having one or more processors 58a with one or more logic units 58b, and with one or more memories 58c, and having one or more status determination engines 59, one or more storage units 60, one or more interfaces 61 and one or more modules 62.

Figure 6:
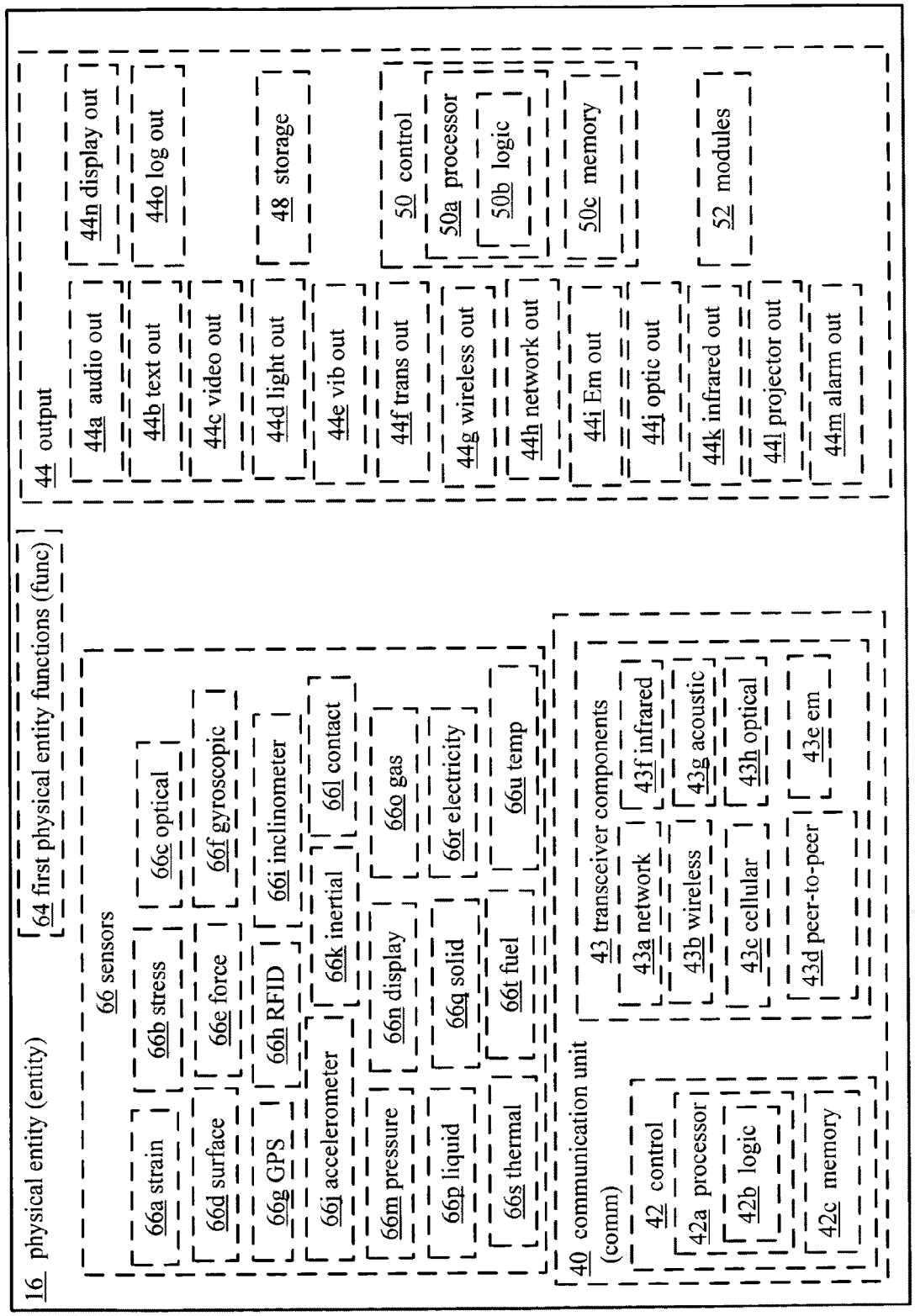
FIG. 6 is a block diagram of an exemplary implementation of a physical entity forming a portion of an implementation of the general exemplary implementation of the information system of FIG. 1.

An exemplary version of the physical entity 16 is shown in FIG. 6 to optionally include the communication unit 40, the output 44, functions associated with the one or more physical entities 64 such as power production, heating, cooling, sound production, production of motion and control thereof, etc, and to include collectors of information related to the physical attributes 17, such as one or more sensors 66, and object functions 172. The one or more sensors 66 optionally include a strain sensor 66a, a stress sensor 66b, an optical sensor 66c, a surface sensor 66d, a force sensor 66e, a gyroscopic sensor 66f, a GPS sensor 66g, an RFID sensor 66h, a inclinometer sensor 66i, an accelerometer sensor 66j, an inertial sensor 1108k, a contact sensor 66l, a pressure sensor 66m, a display sensor 66n, a gas sensor 66o, a liquid sensor 66p, a solid sensor 66q, an electricity sensor 66r, a thermal sensor 66s, a fuel sensor 66t, and a temperature sensor 66u.

Figure 7:
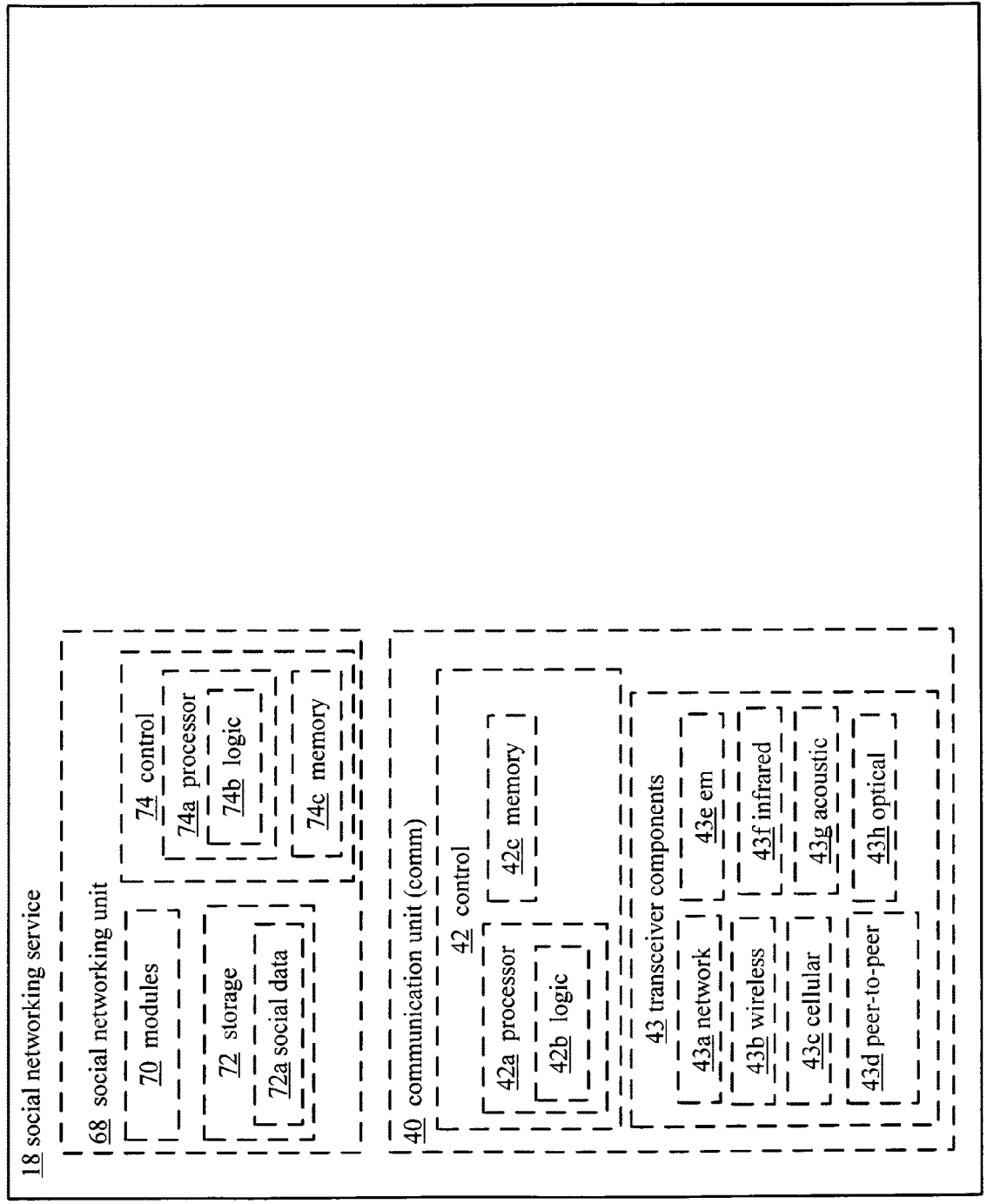
FIG. 7 is a block diagram of an exemplary implementation of a social networking service forming a portion of an implementation of the general exemplary implementation of the information system of FIG. 1.

An exemplary version of the social networking service 18 is shown in FIG. 7 to optionally include one or more of the communication units 40 and one or more social networking units 68 including one or more modules 70, one or more storage units 72 with social data 72a, and including one or more control units 74 having one or more processors 74a with one or more logic units 74b, and one or more memory units 74c.

Figure 8:
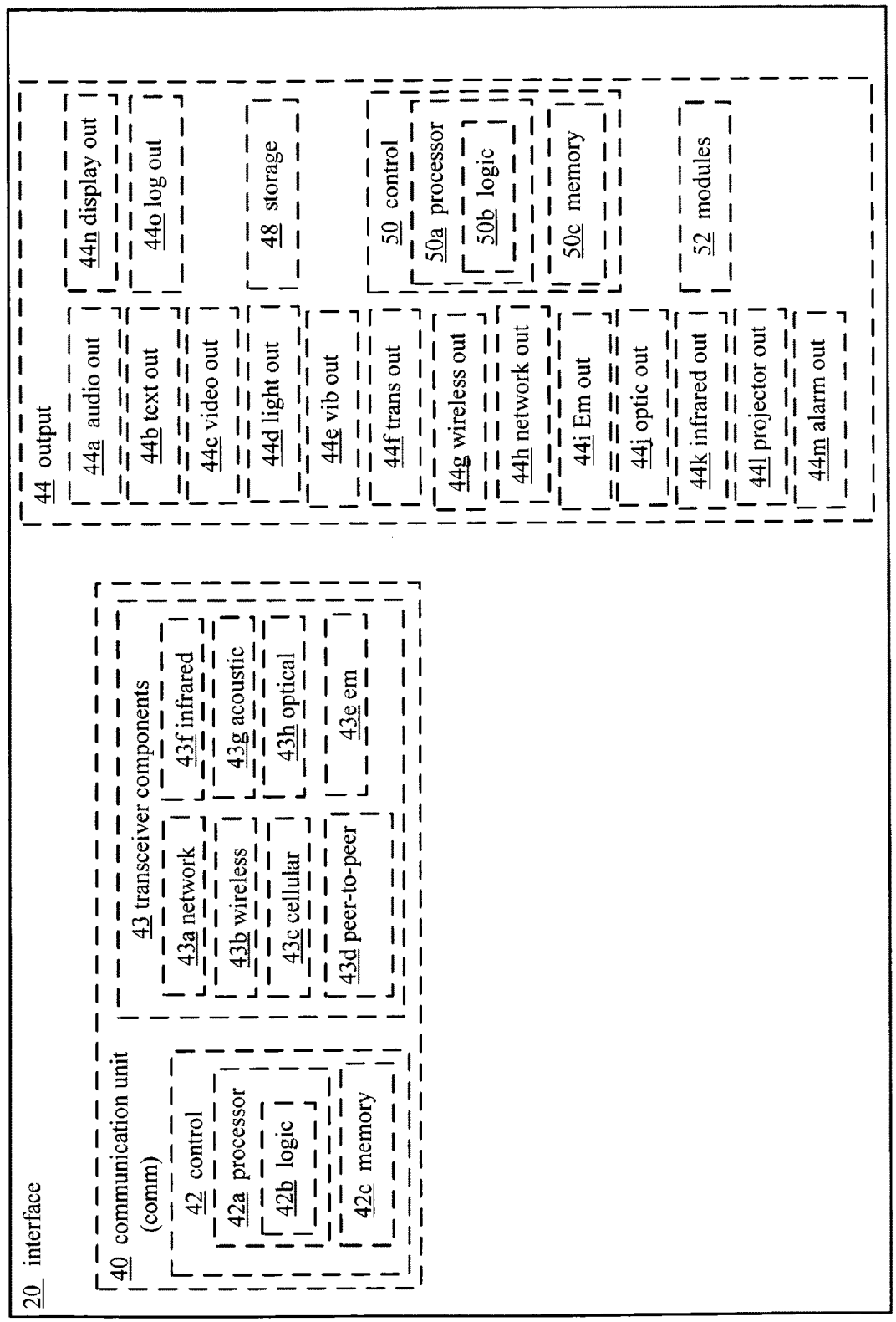
FIG. 8 is a block diagram of an exemplary implementation of an interface forming a portion of an implementation of the general exemplary implementation of the information system of FIG. 1.

An exemplary version of the interface 20 is shown in FIG. 8 to optionally include one or more of the communication units 40 and one or more of the output units 44.

Figure 9:
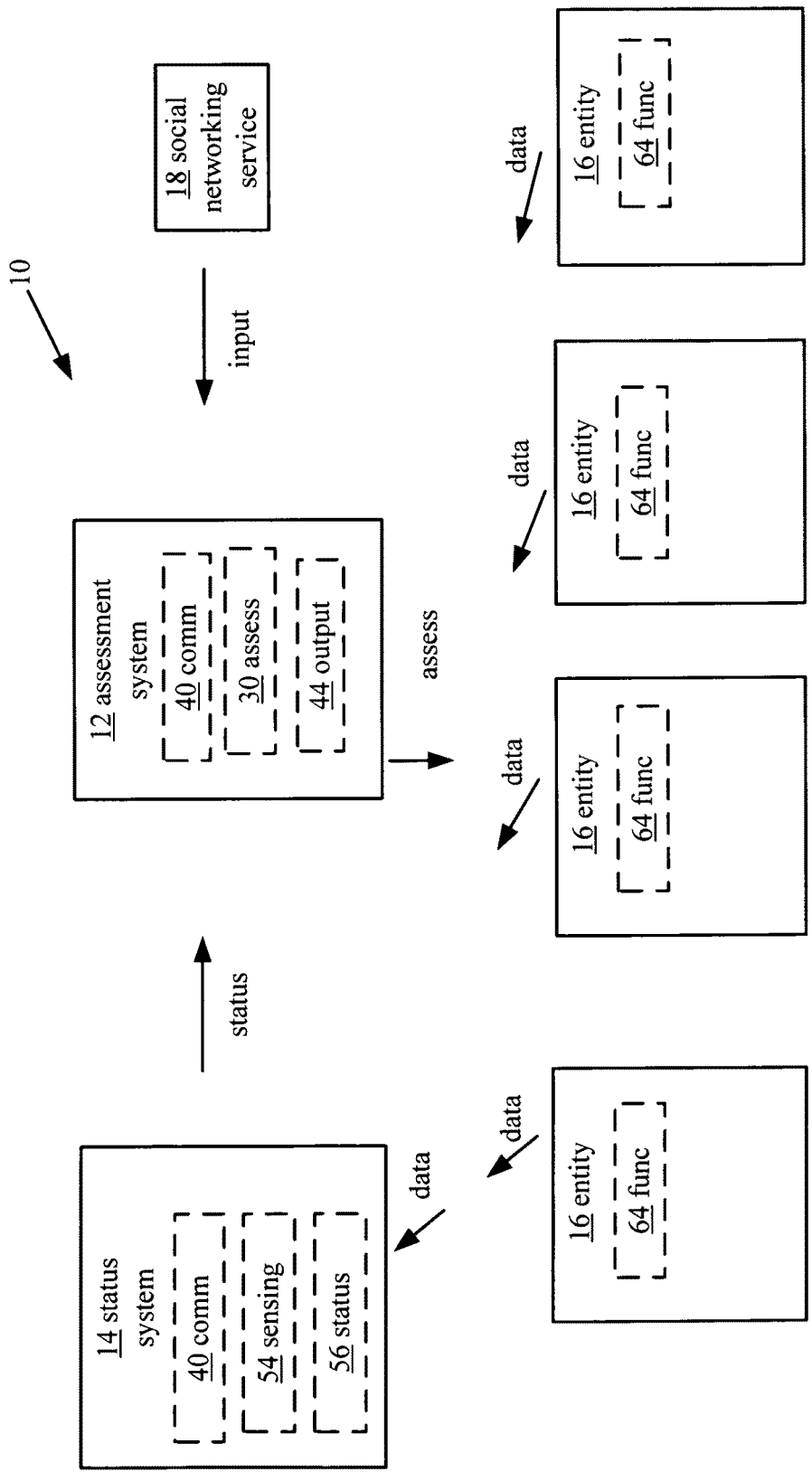
FIG. 9 is a block diagram of an exemplary implementation of the general exemplary implementation of the information system of FIG. 1.

An exemplary configuration of a portion of the system 10 is shown in FIG. 9 to include exemplary versions of the one or more status systems 14, the one or more assessment systems 12, the one or more physical entities 16, and the one or more social networking services 18. The ore or more sensing units 54 of the one or more status systems 14 are depicted as obtaining with the one or more sensing units 54 data from the one or more physical entities 16 and then processing with the one or more status determination units 56 to send status information to the one or more assessment systems 12. The one or more assessment systems 12 then process the status information received from the one or more status systems 14 and the input information received from the one or more social networking services 18 to output the assessment information from the one or more outputs 44 of the one or more assessment systems 12.

Figure 10:
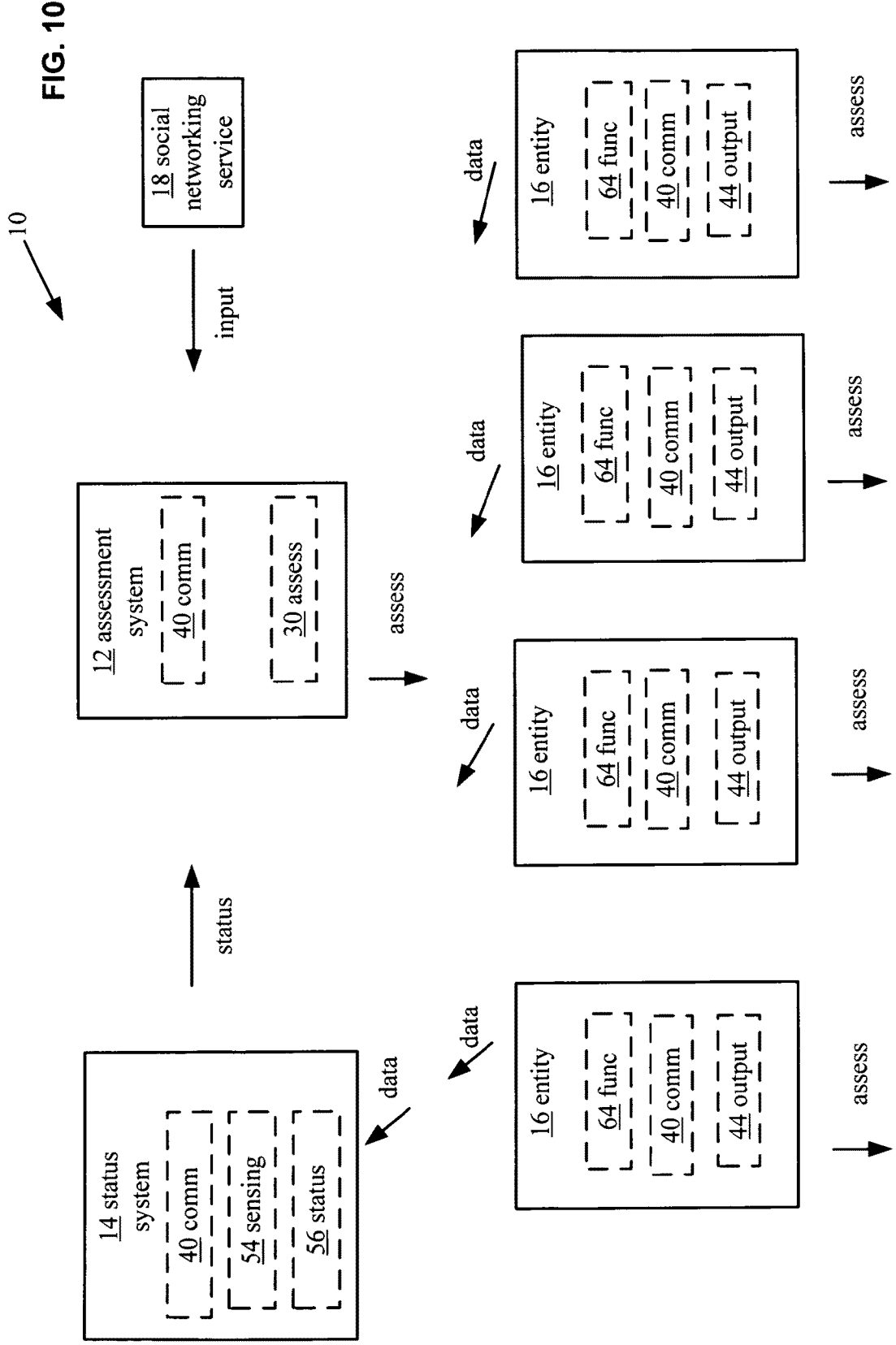
FIG. 10 is a block diagram of an exemplary implementation of the general exemplary implementation of the information system of FIG. 1.

An exemplary configuration of a portion of the system 10 is shown in FIG. 10 to include exemplary versions of the one or more status systems 14, the one or more assessment systems 12, the one or more physical entities 16, and the one or more social networking services 18. The ore or more sensing units 54 of the one or more status systems 14 are depicted as obtaining with the one or more sensing units 54 data from the one or more physical entities 16 and then processing with the one or more status determination units 56 to send status information to the one or more assessment systems 12. The one or more assessment systems 12 then process the status information received from the one or more status systems 14 and the input information received from the one or more social networking services 18 to output the assessment information from the one or more communication units 40 of the one or more assessment systems 12. The one or more outputs 44 of the one or more physical entities 16 then output the assessment information received from the one or more assessment systems 12.

Figure 11:
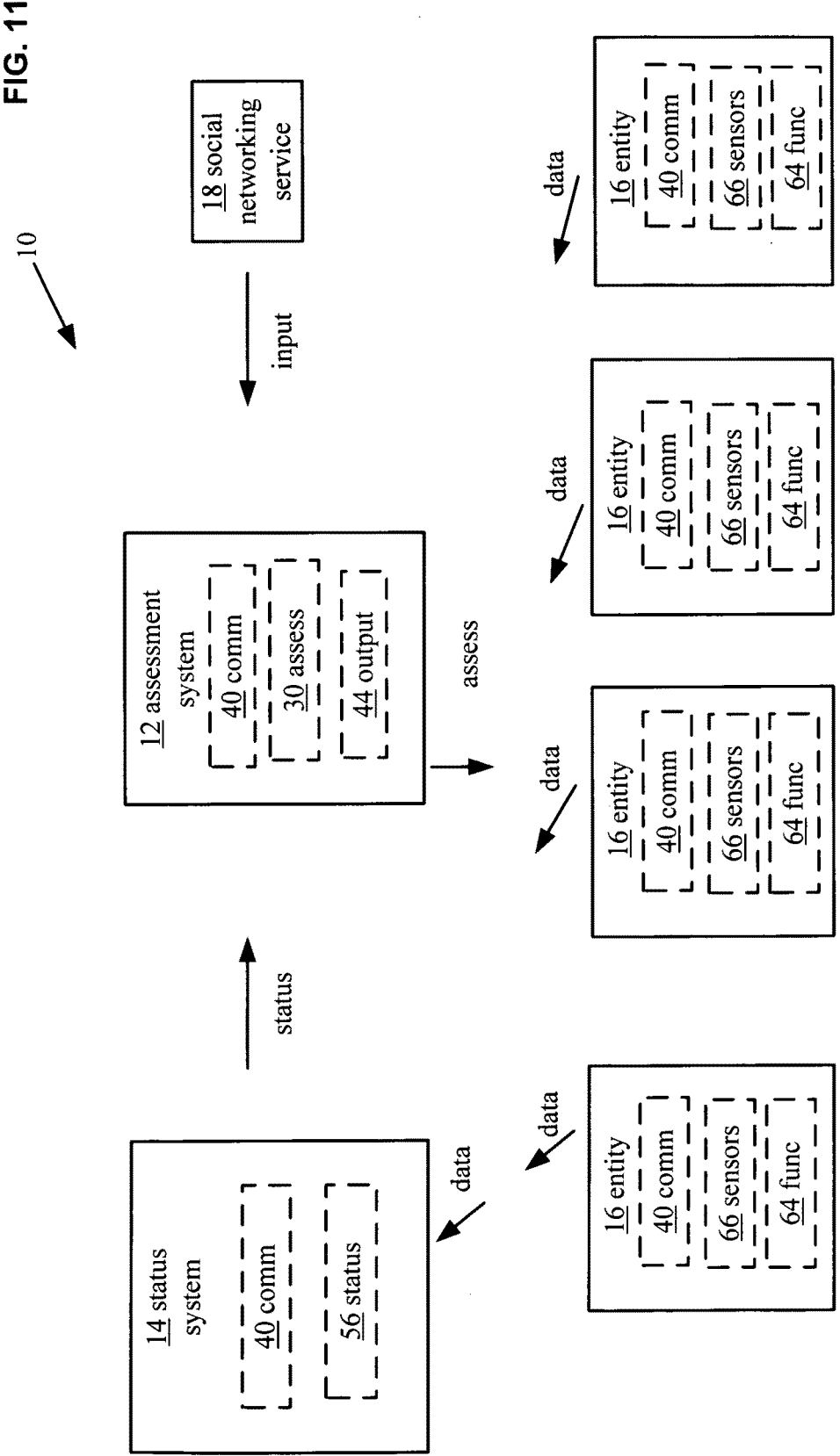
FIG. 11 is a block diagram of an exemplary implementation of the general exemplary implementation of the information system of FIG. 1.

An exemplary configuration of a portion of the system 10 is shown in FIG. 11 to include exemplary versions of the one or more status systems 14, the one or more assessment systems 12, the one or more physical entities 16, and the one or more social networking services 18. The one or more physical entities 16 are depicted as collecting data with the one or more sensors 66 and sending to the one or more status systems 14 to be processed with the one or more status determination units 56 to send status information to the one or more assessment systems 12. The one or more assessment systems 12 then process the status information received from the one or more status systems 14 and the input information received from the one or more social networking services 18 to output the assessment information from the one or more outputs 44 of the one or more assessment systems 12.

Figure 12:
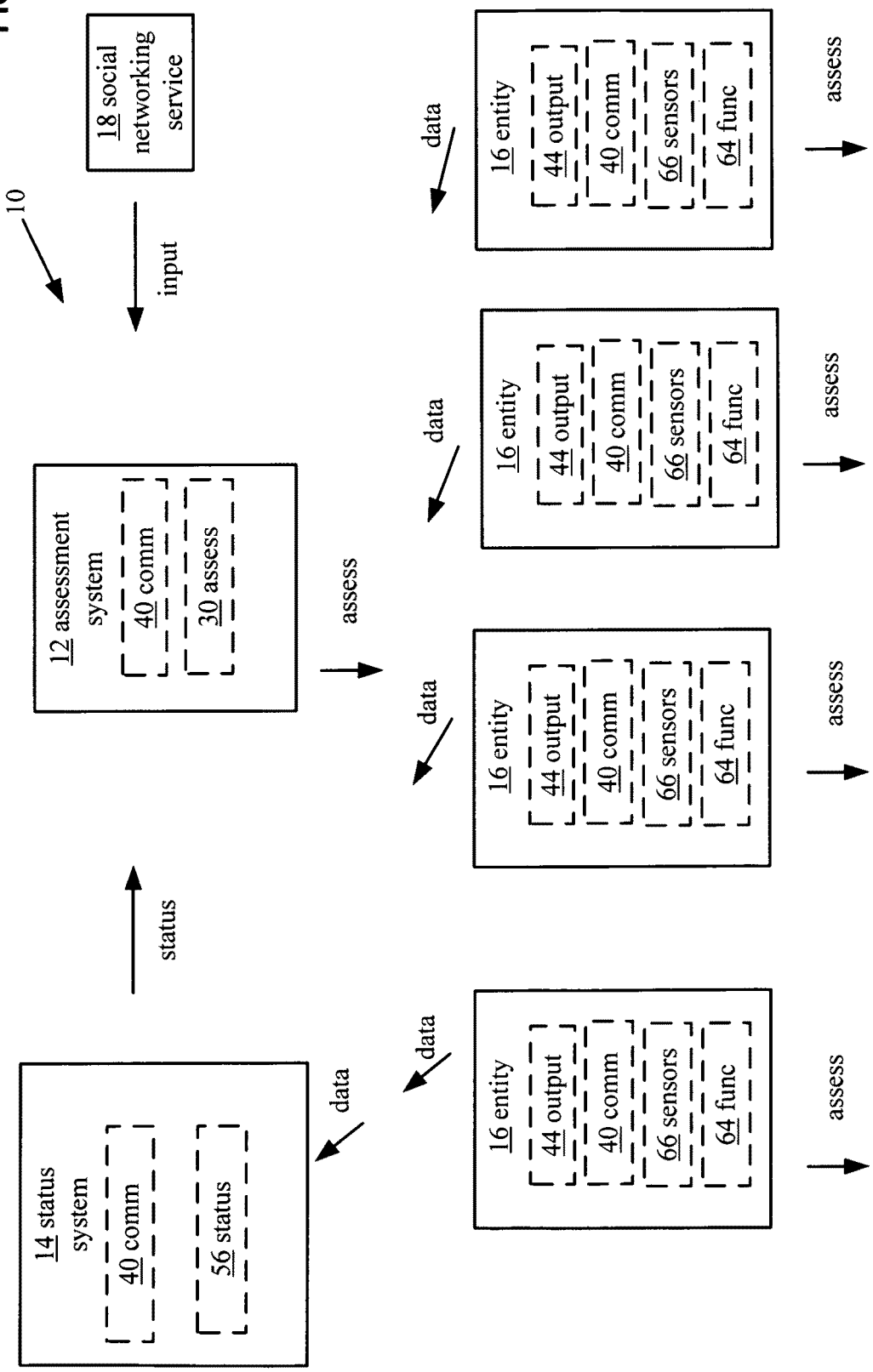
FIG. 12 is a block diagram of an exemplary implementation of the general exemplary implementation of the information system of FIG. 1.

An exemplary configuration of a portion of the system 10 is shown in FIG. 12 to include exemplary versions of the one or more status systems 14, the one or more assessment systems 12, the one or more physical entities 16, and the one or more social networking services 18. The one or more physical entities 16 are depicted as collecting data with the one or more sensors 66 and sending to the one or more status systems 14 to be processed with the one or more status determination units 56 to send status information to the one or more assessment systems 12. The one or more assessment systems 12 then process the status information received from the one or more status systems 14 and the input information received from the one or more social networking services 18 to output the assessment information from the one or more communication units 40 of the one or more assessment systems 12. The one or more outputs 44 of the one or more physical entities 16 then output the assessment information received from the one or more assessment systems 12.

Figure 13:
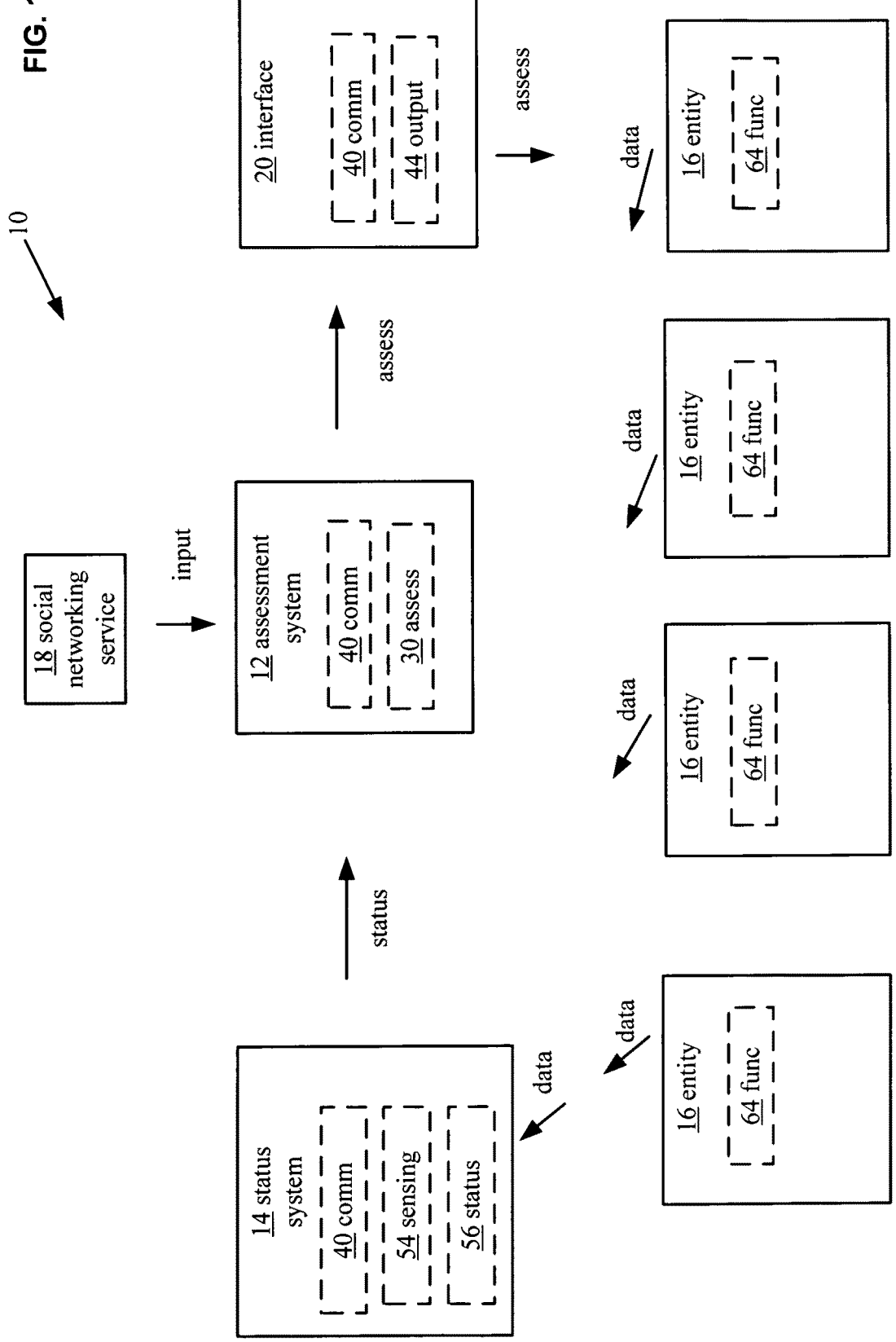
FIG. 13 is a block diagram of an exemplary implementation of the general exemplary implementation of the information system of FIG. 1.

An exemplary configuration of a portion of the system 10 is shown in FIG. 13 to include exemplary versions of the one or more status systems 14, the one or more assessment systems 12, the one or more physical entities 16, the one or more social networking services 18 and the one or more interfaces 20. The ore or more sensing units 54 of the one or more status systems 14 are depicted as obtaining with the one or more sensing units 54 data from the one or more physical entities 16 and then processing with the one or more status determination units 56 to send status information to the one or more assessment systems 12. The one or more assessment systems 12 then process the status information received from the one or more status systems 14 and the input information received from the one or more social networking services 18 to output the assessment information from the one or more communication units 40 of the one or more assessment systems 12. The one or more outputs 44 of the one or more interfaces 20 then output the assessment information received from the one or more assessment systems 12.

Figure 14:
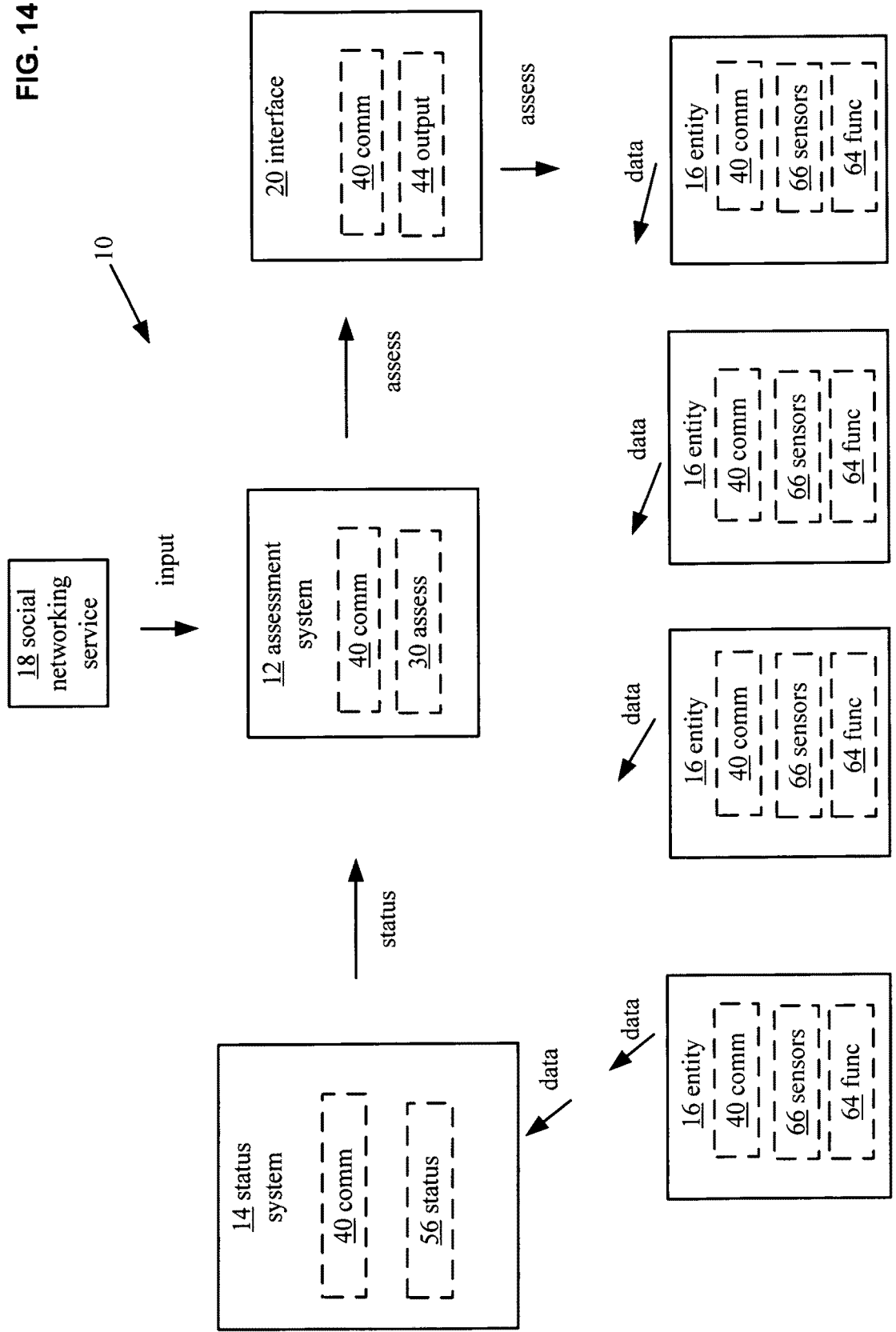
FIG. 14 is a block diagram of an exemplary implementation of the general exemplary implementation of the information system of FIG. 1.

An exemplary configuration of a portion of the system 10 is shown in FIG. 14 to include exemplary versions of the one or more status systems 14, the one or more assessment systems 12, the one or more physical entities 16, the one or more social networking services 18, and the one or more interfaces 20. The one or more physical entities 16 are depicted as collecting data with the one or more sensors 66 and sending to the one or more status systems 14 to be processed with the one or more status determination units 56 to send status information to the one or more assessment systems 12. The one or more assessment systems 12 then process the status information received from the one or more status systems 14 and the input information received from the one or more social networking services 18 to output the assessment information from the one or more communication units 40 of the one or more assessment systems 12. The one or more outputs 44 of the one or more interfaces 20 then output the assessment information received from the one or more assessment systems 12.

Figure 15:
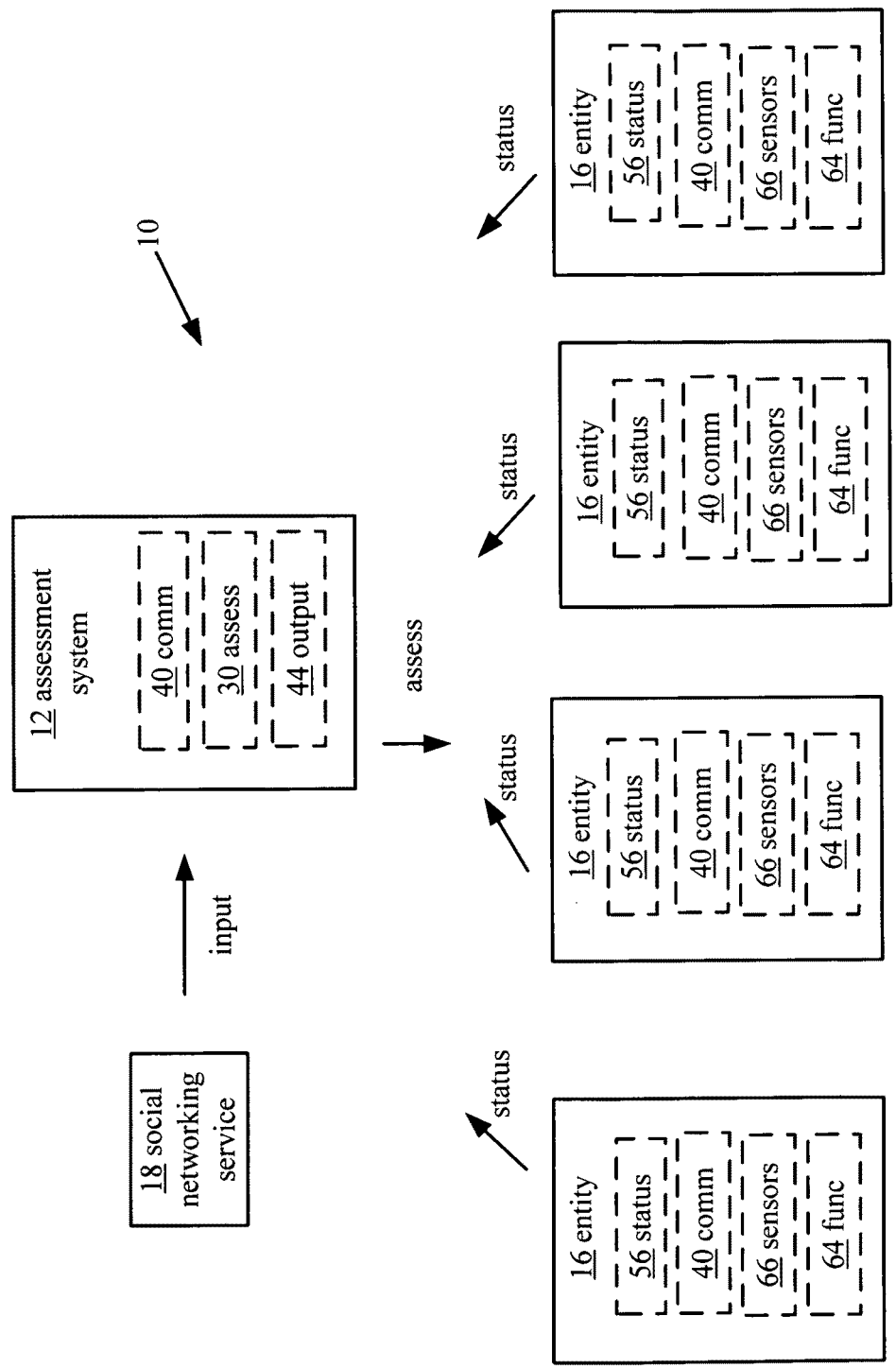
FIG. 15 is a block diagram of an exemplary implementation of the general exemplary implementation of the information system of FIG. 1.

An exemplary configuration of a portion of the system 10 is shown in FIG. 15 to include exemplary versions of the one or more assessment systems 12, the one or more physical entities 16, and the one or more social networking services 18. The one or more physical entities 16 are depicted as collecting data with the one or more sensors 66 and processing with the one or more status determination units 56 to send status information to the one or more assessment systems 12. The one or more assessment systems 12 then process the status information received from the one or more physical entities 16 and the input information received from the one or more social networking services 18 to output the assessment information from the one or more outputs 44 of the one or more assessment systems 12.

Figure 16:
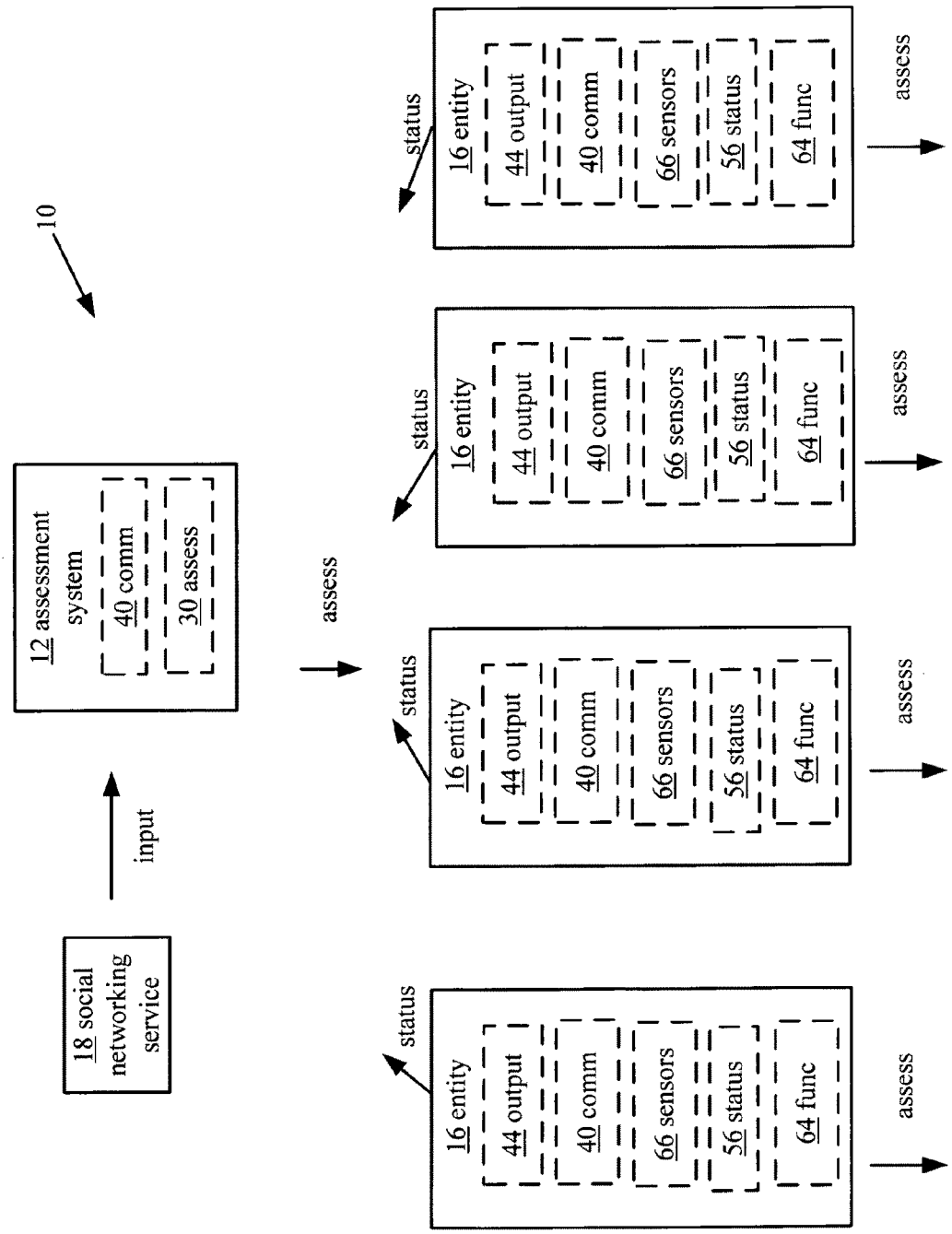
FIG. 16 is a block diagram of an exemplary implementation of the general exemplary implementation of the information system of FIG. 1.

An exemplary configuration of a portion of the system 10 is shown in FIG. 16 to include exemplary versions of the one or more assessment systems 12, the one or more physical entities 16, and the one or more social networking services 18. The one or more physical entities 16 are depicted as collecting data with the one or more sensors 66 and processing with the one or more status determination units 56 to send status information to the one or more assessment systems 12. The one or more assessment systems 12 then process the status information received from the one or more status systems 14 and the input information received from the one or more social networking services 18 to output the assessment information from the one or more communication units 40 of the assessment system 12. The one or more outputs 44 of the one or more physical entities 16 then output the assessment information received from the one or more assessment systems 12.

Figure 17:
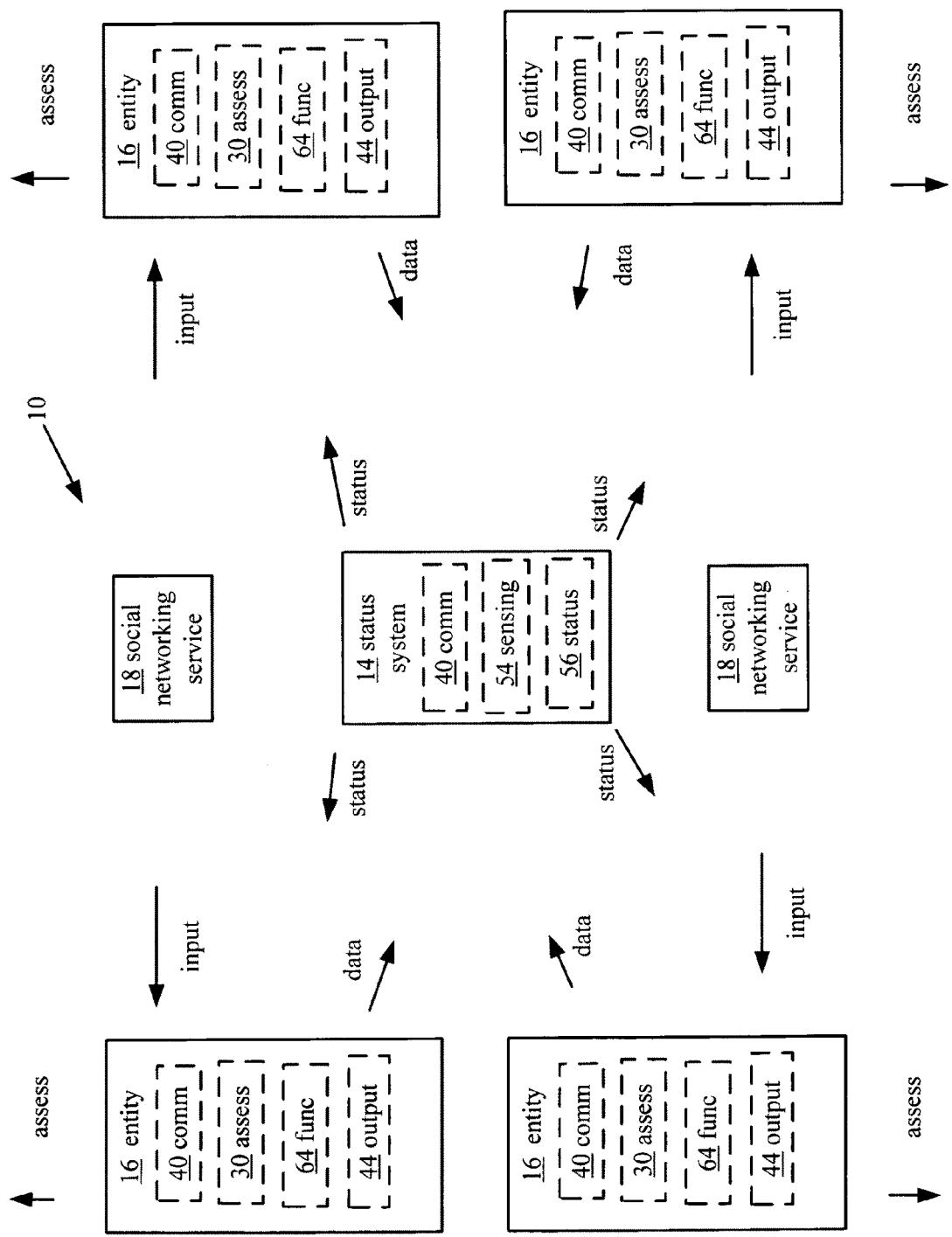
FIG. 17 is a block diagram of an exemplary implementation of the general exemplary implementation of the information system of FIG. 1.

An exemplary configuration of a portion of the system 10 is shown in FIG. 17 to include exemplary versions of the one or more status systems 14, the one or more physical entities 16, and the one or more social networking services 18. The one or more status systems 14 are depicted as collecting data regarding the one or more physical entities 16 with the one or more sensing units 54 and processing with the one or more status determination units 56 to send status information to the one or more physical entities 16. The one or more assessment units 30 of the one or more physical entities 16 then process the status information received from the one or more status systems 14 and the input information received from the one or more social networking services 18 to output the assessment information from the one or more outputs 44 of the one or more physical entities 16.

Figure 18:
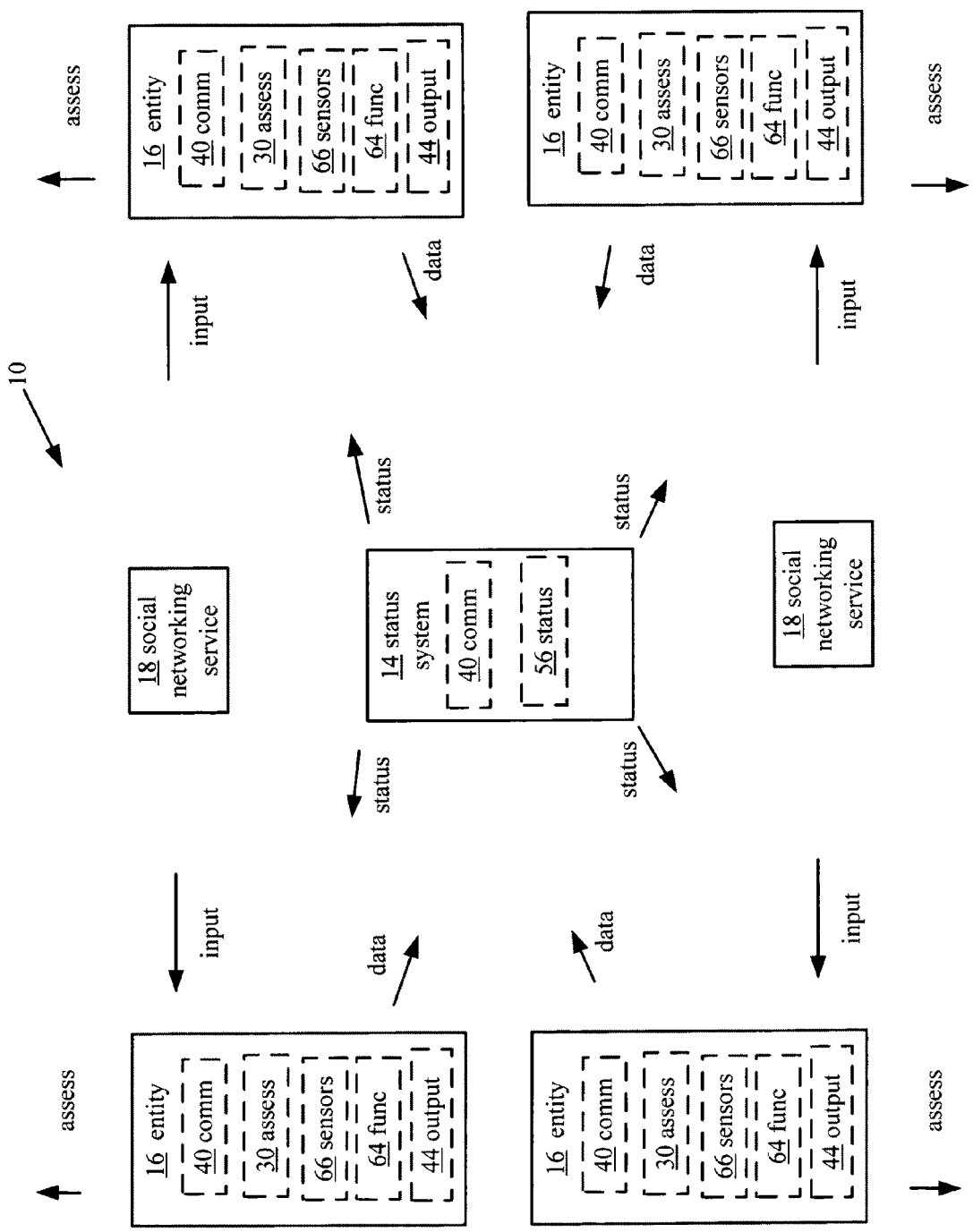
FIG. 18 is a block diagram of an exemplary implementation of the general exemplary implementation of the information system of FIG. 1.

An exemplary configuration of a portion of the system 10 is shown in FIG. 18 to include exemplary versions of the one or more status systems 14, the one or more physical entities 16, and the one or more social networking services 18. The one or more physical entities 16 are depicted as collecting data with the one or more sensors 66 and sending to the one or more status systems 14 for processing with the one or more status determination units 56 to send status information back to the one or more physical entities 16. The one or more assessment units 30 of the one or more physical entities 16 then process the status information received from the one or more status systems 14 and the input information received from the one or more social networking services 18 to output the assessment information from the one or more outputs 44 of the one or more physical entities 12.

Figure 19:
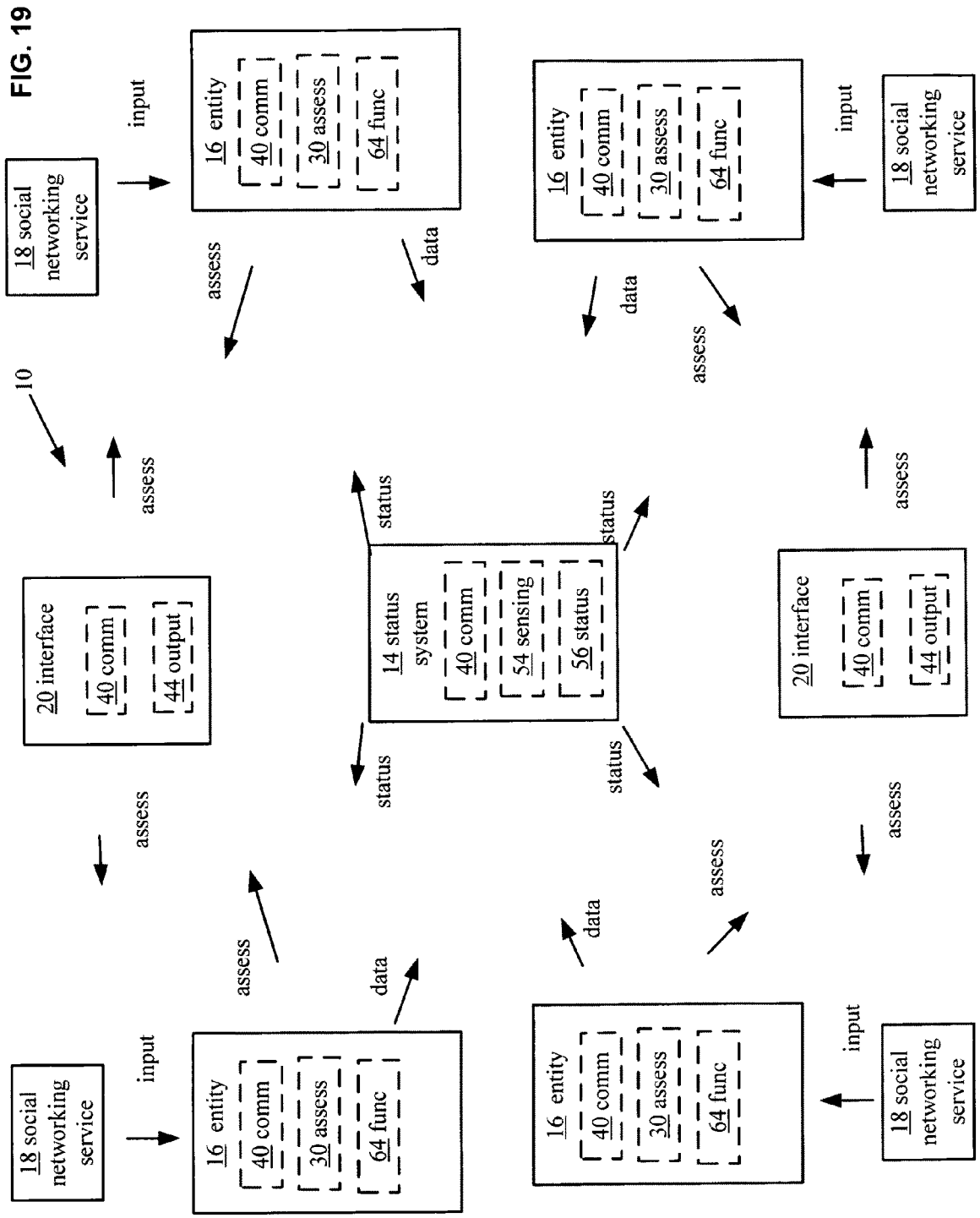
FIG. 19 is a block diagram of an exemplary implementation of the general exemplary implementation of the information system of FIG. 1.

An exemplary configuration of a portion of the system 10 is shown in FIG. 19 to include exemplary versions of the one or more status systems 14, the one or more physical entities 16, and the one or more social networking services 18. The one or more status systems 14 are depicted as collecting data regarding the one or more physical entities 16 with the one or more sensing units 54 and processing with the one or more status determination units 56 to send status information to the one or more physical entities 16. The one or more assessment units 30 of the one or more physical entities 16 then process the status information received from the one or more status systems 14 and the input information received from the one or more social networking services 18 to send the assessment information from the one or more communication units 40 of the one or more physical entities 16 to the one or more interfaces 20. The one or more interfaces 20 then outputs the assessment information from the one or more outputs 44 of the one or more interfaces 20.

Figure 20:
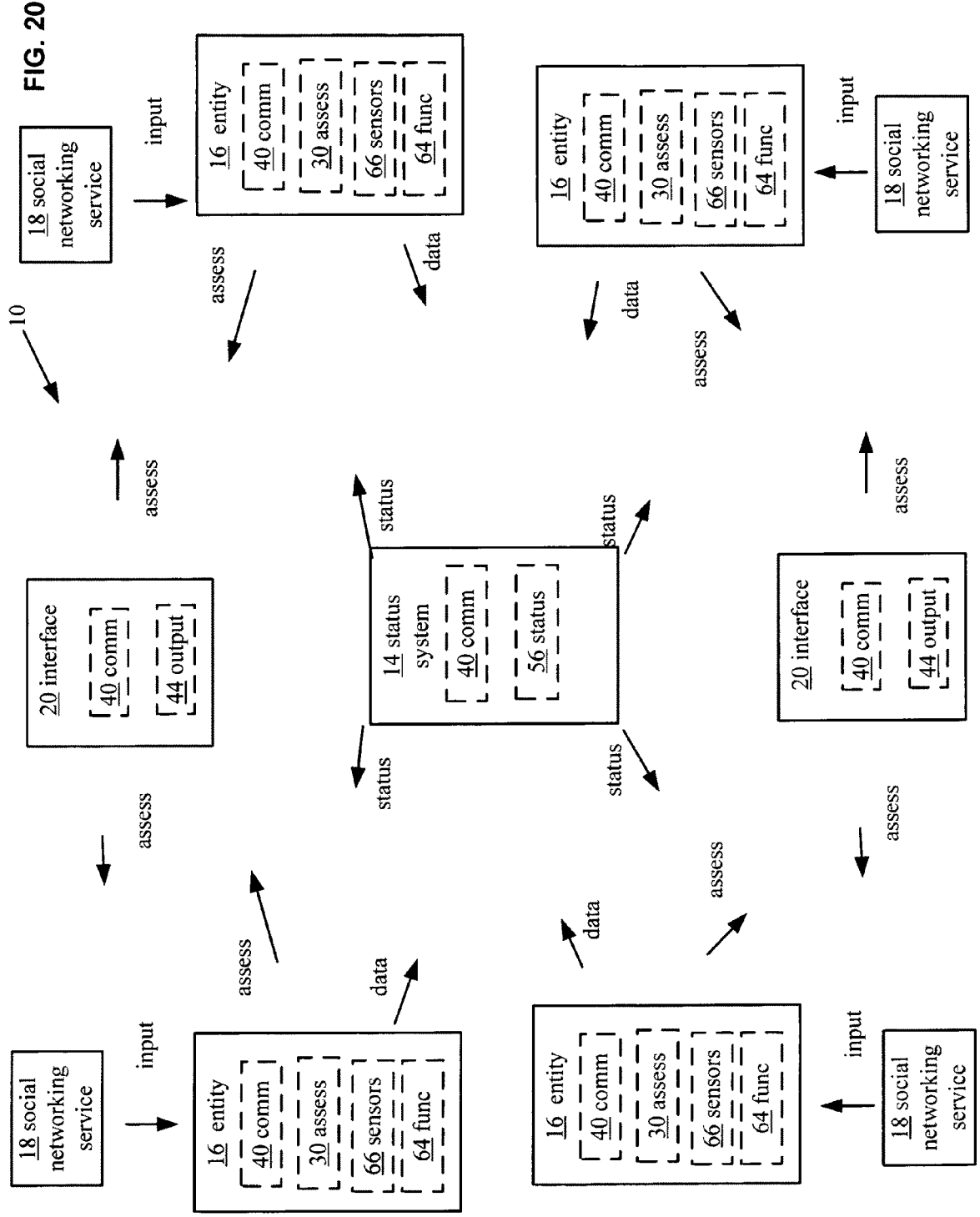
FIG. 20 is a block diagram of an exemplary implementation of the general exemplary implementation of the information system of FIG. 1.

An exemplary configuration of a portion of the system 10 is shown in FIG. 20 to include exemplary versions of the one or more status systems 14, the one or more physical entities 16, and the one or more social networking services 18. The one or more physical entities 16 are depicted as collecting data with the one or more sensors 66 and sending to the one or more status systems 14 for processing with the one or more status determination units 56 to send status information back to the one or more physical entities 16. The one or more assessment units 30 of the one or more physical entities 16 then process the status information received from the one or more status systems 14 and the input information received from the one or more social networking services 18 to send the assessment information from the one or more communication units 40 of the one or more physical entities 16 to the one or more interfaces 20. The one or more interfaces 20 then outputs the assessment information from the one or more outputs 44 of the one or more interfaces 20.

Figure 21:
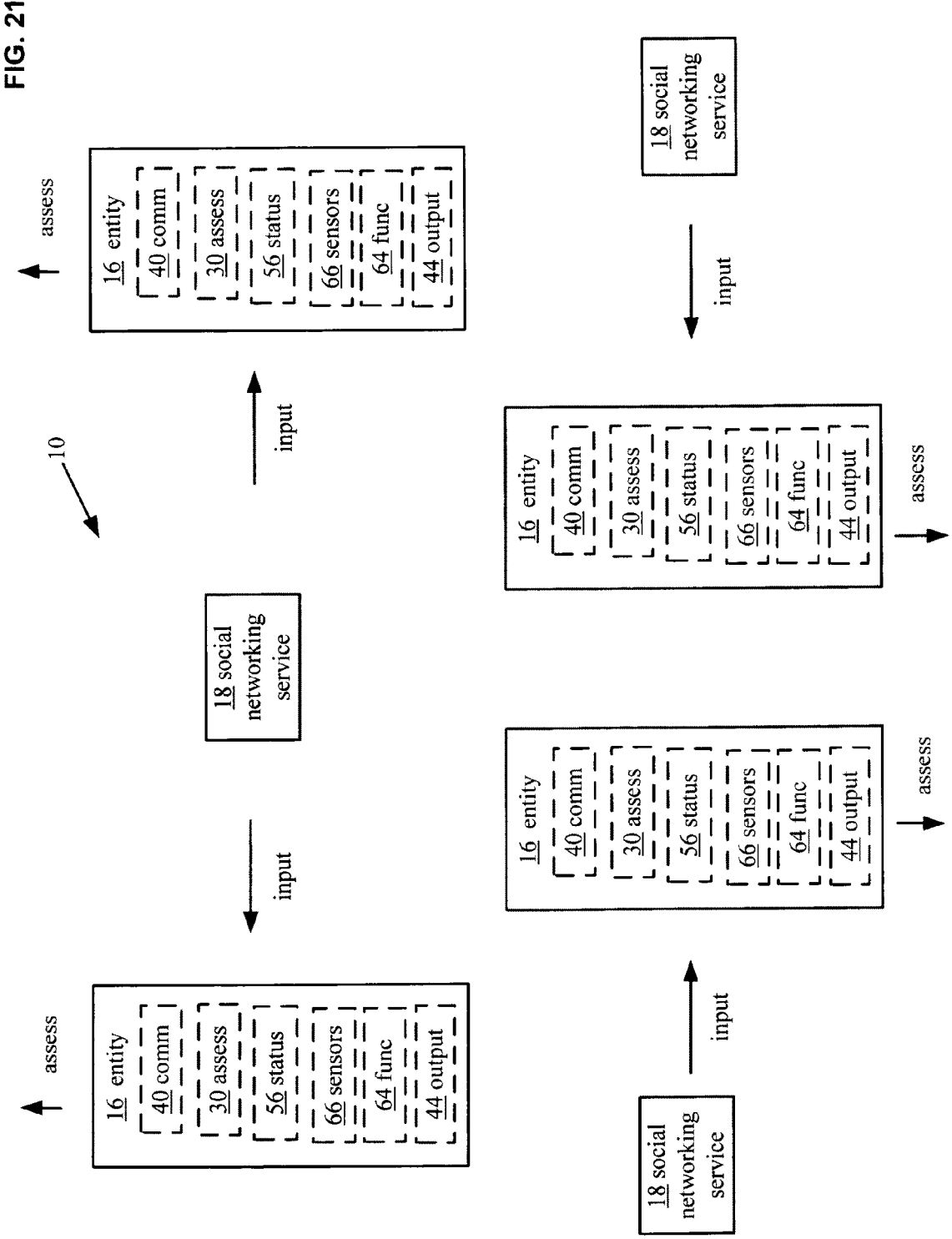
FIG. 21 is a block diagram of an exemplary implementation of the general exemplary implementation of the information system of FIG. 1.

An exemplary configuration of a portion of the system 10 is shown in FIG. 21 to include exemplary versions of the one or more physical entities 16, and the one or more social networking services 18. The one or more physical entities 16 are depicted as collecting data with the one or more sensors 66 and processing with the one or more status determination units 56 of the one or more physical entities to determine status information. The one or more assessment units 30 of the one or more physical entities 16 then process the input information received from the one or more social networking services 18 and the status information to send the assessment information from the one or more outputs 44 of the one or more physical entities 16.

FIG. 22

Figure 22:
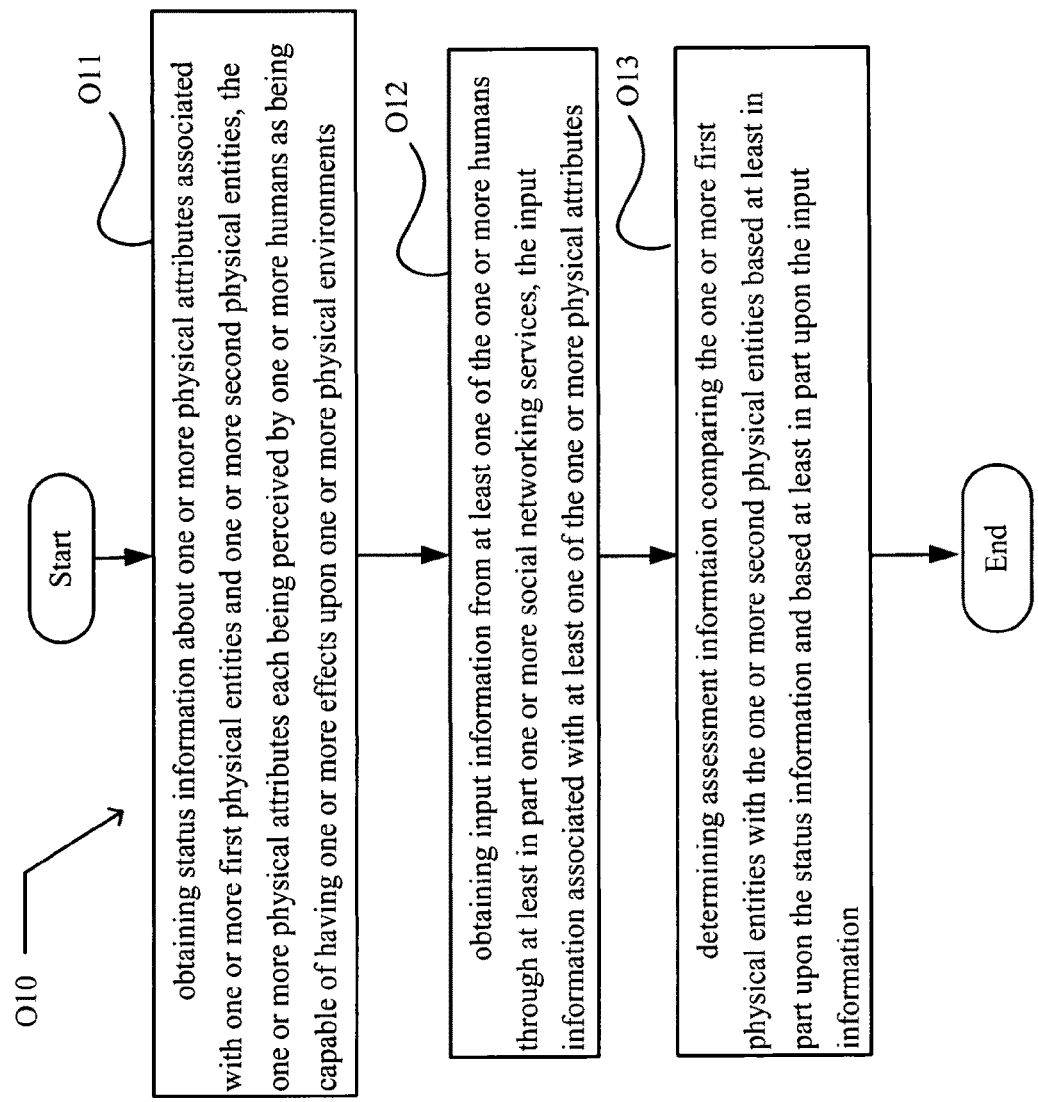
FIG. 22 is a high-level flowchart illustrating an operational flow O10 representing exemplary operations related to obtaining status information about one or more physical attributes associated with one or more first physical entities and one or more second physical entities, the one or more physical attributes each being perceived by one or more humans as being capable of having one or more effects upon one or more physical environments, obtaining input information from at least one of the one or more humans through at least in part one or more social networking services, the input information associated with at least one of the one or more physical attributes, and information at least associated with the depicted exemplary implementations of the information system.

An operational flow O10 as shown in FIG. 22 represents example operations related to obtaining status information, determining subject status information, and determining subject advisory information. In cases where the operational flows involve subjects and devices, as discussed above, in some implementations, the objects 12 can be devices and the subjects 10 can be subjects of the devices. FIG. 22 and those figures that follow may have various examples of operational flows, and explanation may be provided with respect to the above-described examples of FIGS. 1-21 and/or with respect to other examples and contexts. Nonetheless, it should be understood that the operational flows may be executed in a number of other environments and contexts, and/or in modified versions of FIGS. 1-21. Furthermore, although the various operational flows are presented in the sequence(s) illustrated, it should be understood that the various operations may be performed in other orders than those which are illustrated, or may be performed concurrently.

In FIG. 22 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

The operational flow O10 can move to operation O11, where obtaining status information about one or more physical attributes associated with one or more first physical entities and one or more second physical entities, the one or more physical attributes each being perceived by one or more humans as being capable of having one or more effects upon one or more physical environments may be executed by, for example, the one or more obtaining status modules 32a of FIG. 4A configured to direct the one or more assessment units 30 of the one or more assessment systems 12 of FIG. 4. An exemplary implementation may include, obtaining status information (for example, the one or more assessment units 30 can receive the status information from the one or more status determination units 56 of the one or more status systems 14 of FIG. 5 having beforehand determined the status information based upon data collected through the one or more sensing units 54 of the one or more status systems 14 and/or the one or more sensors 66 of the one or more status systems 14 of FIG. 5) about one or more physical attributes associated with one or more first physical entities and one or more second physical entities (for example, the one or more electricity sensors 66r of one or more first physical entities and one or more second physical entities 16 wherein the first physical entities and second physical entities are part of two different groups, such one or more first houses and one or more second houses, may collect data regarding the one or more physical attributes 17 related to electricity usage associated with the one or more first houses and the one or more second houses. The status information thus determined, for instance, could be related to electricity usage in kilowatt-hours per a given period such as a particular yearly quarter, such as the $3^{rd}$ quarter of 2009) the one or more physical attributes each being perceived by one or more humans as being capable of having one or more effects upon one or more physical environments (for example, the electricity usage for the one or more first houses and the electricity usage for the one or more second houses could be perceived by one or more humans as being capable of having a detrimental effect upon one or more atmospheric environments, such as, air quality near an electric power plant, and/or one or more water-based environments, such as rivers or other bodies of water near an electric power plant, due to thermal and/or gaseous emissions produced, such as elevated water temperatures near an electric power plant and/or elevated sulfur gas levels or carbon dioxide gas levels in air near an electric power plant, as consequences of electricity generation by certain fuel-based electric power plants, such as coal-fired electric power plants).

The operational flow O10 can move to operation O12, where obtaining input information from at least one of the one or more humans through at least in part one or more social networking services, the input information associated with at least one of the one or more physical attributes may be executed by, for example, the obtaining input module 32b of FIG. 4A configured to direct the status determining system 14 of FIG. 6. An exemplary implementation may include obtaining input information (for example, input information can be expressed in terms of a subjective scoring, such as −100 points to +100 points where increased negative points indicates a larger aversion to the one or more physical attributes and increased positive points indicates a larger affinity to the one or more physical attributes. The subjective scoring could be, for instance, regarding various kilowatt-hour levels of quarterly electricity usage associated with the one or more houses.) from at least one of the one or more humans (For example, one of the humans could be one of the non-users 26 of FIG. 1 that did not dwell in any of the one or more houses.) through at least in part one or more social networking services (for example, opinions regarding the electricity usage could be posted to a Facebook webpage as part of the one or more social networking services 18 of FIG. 1 that is associated with the one or more houses and/or associated with environmental concerns such as effects of electricity production by coal-fired electric power plants.), the input information associated with at least one of the one or more physical attributes (for example, the input information could be −80 subjective score regarding a usage of 24,325 kilowatt-hour usage for the $3^{rd}$ quarter of 2009 for a 8,200 ft2 house).

The operational flow O10 can move to operation O13 where determining assessment information comparing the one or more first physical entities with the one or more second physical entities based at least in part upon the status information and based at least in part upon the input information may be executed by, for example, the determining assessment module 32c of FIG. 4A configured to direct the assessment system 12 of FIG. 4. An exemplary implementation may include determining (for example, the one or more controls 36 of the one or more assessment units 40 of FIG. 4 can instruct the one or more processors 36a to determine based on algorithms such as an averaging algorithm that generates an average scoring contained in the one or more storage units 34.) assessment information comparing the one or more first physical entities with the one or more second physical entities (for example, the assessment information could compare the one or more first physical entities with the one or more second physical entities as houses using an overall subjective scoring, such as −80, −30, +40, and +75 out of a range of −100 to +100 for the electricity usage of the one or more first houses compared with the electricity usage of the one or more second houses such as houses of celebrities as the first houses and houses of politicians as the second houses for the $3^{rd}$ quarter of 2009) based at least in part upon the status information and based at least in part upon the input information (for example, the status information could contain electricity usage for the one or more first houses and electricity usage for the one or more second houses for the $3^{rd}$ quarter of 2009 and the input information gathered from an energy conservation internet forum could contain subjective scoring thresholds associated with kilowatt-hour usage such as another −10 points subtracted from 100 points for additional 500 kilowatt-hours of usage for the $3^{rd}$ quarter of 2009).

As a representative sampling of some of the possibilities by way of example without intention for limitation, implementations of the one or more assessment systems 12 can determine assessment information to include one or more summaries, incentives, statistics, projections, trends, present versus past values, actual values versus preferences or goals, scores, classifications, appraisals, judgments, measurements, baseline reflections, perspectives with respect to informal or formal standards, individual opinions, polls, group opinions, indicator modifications, avatar modifications, etc. Determining assessment information performed by the one or more assessment systems 12 can include use of computer-based programs, algorithms, databases, etc and/or receiving feedback from one or more the users 24 and/or one or more of the non-users 26 through the one or more social networking services 18.

As a representative sampling of some of the possibilities by way of example without intention for limitation, implementations of the one or more status systems 14 can determine status information to include use of one or more sensors in one or more physical entities, use of one or more sensors external to one or more physical entities, use of one or more remote sensors, receipt of one or more user input, use of one or more power line sensors, use of one or more power plug adapters, use of one or more breaker junction boxes, and/or receipt of one or more human observations. Obtaining status information can also involve use of sample storage found on one or more physical entities and/or centrally located such as on one or more servers. Obtaining status information can also include sampling per location (political geography, coordinate geography, neighborhood), sampling based on business class, based on profession, based on government affiliation, based on educational institution, based on social class. Obtaining status information can also include one or more sampling styles such as sampling on a single instance basis, sampling spanning a period: periodic, sporadic sampling, sampling on demand, sampling initiated by one or more individuals, sampling at will, automatic sampling per use, sampling initiated by an authority, sampling as calibration checking, sampling spanning a period of time such as lifetime, a year, month, week, day, hour, minute, second, per load, per a predefined action or event.

As a representative sampling of some of the possibilities by way of example without intention for limitation, implementations of the one or more physical entities 16 can include vehicles such as land vehicles, for instance, trucks, automobiles, buses, motorcycles, go-peds, all terrain vehicles, ambulances, garbage trucks, construction vehicles, such as air vehicles, for instance, airplanes, helicopters, drones, such as water vehicles, for instance, boats, jet skis, submarines, hydrofoils, can include habitations such as houses, apartments, hotels, schools, factories, offices, hospitals, service centers, shopping centers, stores, warehouses, military structures, entertainment centers, can include appliances such as kitchen appliances, for instance, dishwashers, stoves, ovens, blenders, grills, such as laundry appliances, for instance, washers, dryers, irons, such as landscape care appliances, for instance, lawn mowers, yard blowers, such as building environmental control, for instance, heating furnaces, air conditioning, lighting, sound emitters, thermostats, such as hand-held devices, for instance, cell phones, iPods, laptops, such as clothing, for instance, shoes, pants, shirts, dresses, eyewear, such as containers, for instance, dumpsters, trash cans, such as used items, for instance containers, garbage, paper products, newspapers, cans, bottles, furniture, household items, such as sound emitters, for instance, stereo speakers, audio devices, engines, boom boxes, humans, animals, dogs, vehicle traffic, such as gas emitters, for instance, smokestacks, chimneys, tailpipes, such as liquid emitters, for instance, noxious liquid emitters, fragrant liquid emitters, etc.

As a representative sampling of some of the possibilities by way of example without intention for limitation, implementations of the one or more physical attributes 17 can include use history, can include energy related factors such energy usage such as gas mileage, annual fuel consumption, cumulative fuel use over a specified period of time, miles per gallon, miles per passenger, indoor temperature, average difference between indoor and outdoor temperature, average indoor temperature, can include emissions such as substance emissions, for instance, gas emissions like carbon dioxide emissions, noxious gas emissions, odoriferous gas emissions, for instance liquid emissions like toxic liquid emissions, water emissions, oil emissions, for instance solid emissions like non-biodegradable solid emissions, biodegradable solid emissions, noxious solid emissions, can include sound emissions such as constant sound emissions, intermittent sound emissions, low frequency sound emissions, high frequency sound emissions, can include seismic emissions such as road vibration, explosion based emissions, can include light emissions such as intermittent light emissions, constant light emissions, visible light emissions, ultraviolet emissions, infrared light emissions, can include thermal emissions such as gas based thermal emissions, liquid based thermal emissions, or solid based thermal emissions, etc.

As a representative sampling of some of the possibilities by way of example without intention of limitation, implementations of the one or more social networking services 18 can include one or more online groups or communities of people who typically share something such as one or more interests, activities, goals, uses, ownership, etc. Implementations of the one or more social networking services 18 can include one or more web based services such as Facebook, Twitter, LinkedIn, MySpace, Nexopia, Friendster, Multiply, etc. Implementations of the one or more social networking services 18 can provide facilities for users to create profiles for themselves. Implementations of the one or more social networking services 18 can have various classifications such as for internal social networking or for external social networking. Implementations of the one or more social networking services 18 as internal social networking services can be closed, private groups of people within associations, companies, educational institutions, societies, or organizations such as those formed through invitation only arrangements. Implementations of the one or more social networking services 18 as external social networking services can include those open to the public such as most or all users of the internet and includes an advertising model to help support operations. The one or more social networking services 18 can include members and others with one or more interests such as environmental issues, for instance, climate change, preservation of species, forests, wildernesses, pollution control, waste management, recycling, energy conservation, sustainable energy sources, sustainable agriculture, and/or can specialize in one or more particular interests, etc.

As a representative sampling of some of the possibilities by way of example without intention of limitation, implementations of the one or more interfaces 20 can include one or more display screens, display monitors, personal data assistants (PDAs), laptop computers, desktop computers, cell phones, hand-held devices, keyboards, mice, trackballs, voice recognition systems, handwriting recognition systems, gesture recognition systems, projected displays, etc.

As a representative sampling of some of the possibilities by way of example without intention of limitation, implementations of the one or more communication media 22 can include one or more wired communication networks such as one or more fiber optic network, one or more cable network, one or more twisted pair network, etc, can include one or more wireless communication networks such as RF, cellular, Wi-Fi, Bluetooth, 3G, etc. or other communication media.

As a representative sampling of some of the possibilities by way of example without intention of limitation, associated with can include one or more various ways that two or more concepts, things, constructs, etc. are brought into relationship such as through physical interaction, and/or memory and/or imagination of a perceiver thereof, etc.

As a representative sampling of some of the possibilities by way of example without intention of limitation, input information can include one or more positive and/or negative comments, instructions, descriptions, opinions, selections, demands, preferences, warnings, persuasions, facts, data, etc.

As a representative sampling of some of the possibilities by way of example without intention of limitation, obtaining input information can include receiving wirelessly, and/or receiving through one or more wired connections, etc. such as through the one or more communication media 22 and/or through other means such as direct input into the one or more assessment systems 12, such as through the one or more interfaces 20 being directly connected to the one or more assessment systems 12, for example as a keyboard, touch screen, voice recognition, other input means, etc.

As a representative sampling of some of the possibilities by way of example without intention of limitation, components of natural and/or built environments can include animals, vegetation, microorganisms, rocks, soil, atmosphere, bodies of water, and other natural phenomena that occur with one or more boundaries thereof. Components of built environments can further include man-made items such as architectural, civil, transportation structures, and/or other structures.

As a representative sampling of some of the possibilities by way of example without intention of limitation, effects can include factors that may modify, harm, change, impact, and/or benefit the effected. For instance, one or more effects can include increasing or decreasing such as increasing or decreasing temperature, sound level, level of a chemical constituent, energy use, species population, aesthetic quality, etc.

As a representative sampling of some of the possibilities by way of example without intention of limitation, obtaining status information can include use of one or more sensors in one or more physical entities, use of one or more sensors external to one or more physical entities, use of one or more remote sensors, receipt of one or more user input, use of one or more power line sensors, use of one or more power plug adapters, use of one or more breaker junction boxes, and/or receipt of one or more human observations. Obtaining status information can also involve use of sample storage found on one or more physical entities and/or centrally located such as on one or more servers. Obtaining status information can also include sampling per location (political geography, coordinate geography, neighborhood), sampling based on business class, based on profession, based on government affiliation, based on educational institution, based on social class. Obtaining status information can also include one or more sampling styles such as sampling on a single instance basis, sampling spanning a period: periodic, sporadic sampling, sampling on demand, sampling initiated by one or more individuals, sampling at will, automatic sampling per use, sampling initiated by an authority, sampling as calibration checking, sampling spanning a period of time such as lifetime, a year, month, week, day, hour, minute, second, per load, per a predefined action or event.

As a representative sampling of some of the possibilities by way of example without intention of limitation, perceived by one or more humans can include proper and/or improper understandings by the one or more humans. Perception can be based upon scientific understanding, religious biases, philosophical preferences, and/or any other sort of belief, opinion, thought, etc. whether correctly or incorrectly held.

As a representative sampling of some of the possibilities by way of example without intention of limitation, physical environments can include one or more natural environments having living and/or non-livings things naturally occurring on Earth or one or more regions thereof without significant human intervention such as including land based environments, or water based environments, and/or combinations thereof. Physical environments can include built environments having significant human intervention such as farmland, townships, cities, industrial parks, office parks, military installations, governmental projects, etc.

As a representative sampling of some of the possibilities by way of example without intention of limitation, status information of a subject can include information regarding one or more states of the subject, information that is cumulative over one or more previous periods, information that includes one or more past states of the subject, information that includes one or more present states of the subject, information that includes one or more projected states of the subject, or one or more combinations thereof.

FIG. 23

Figure 23:
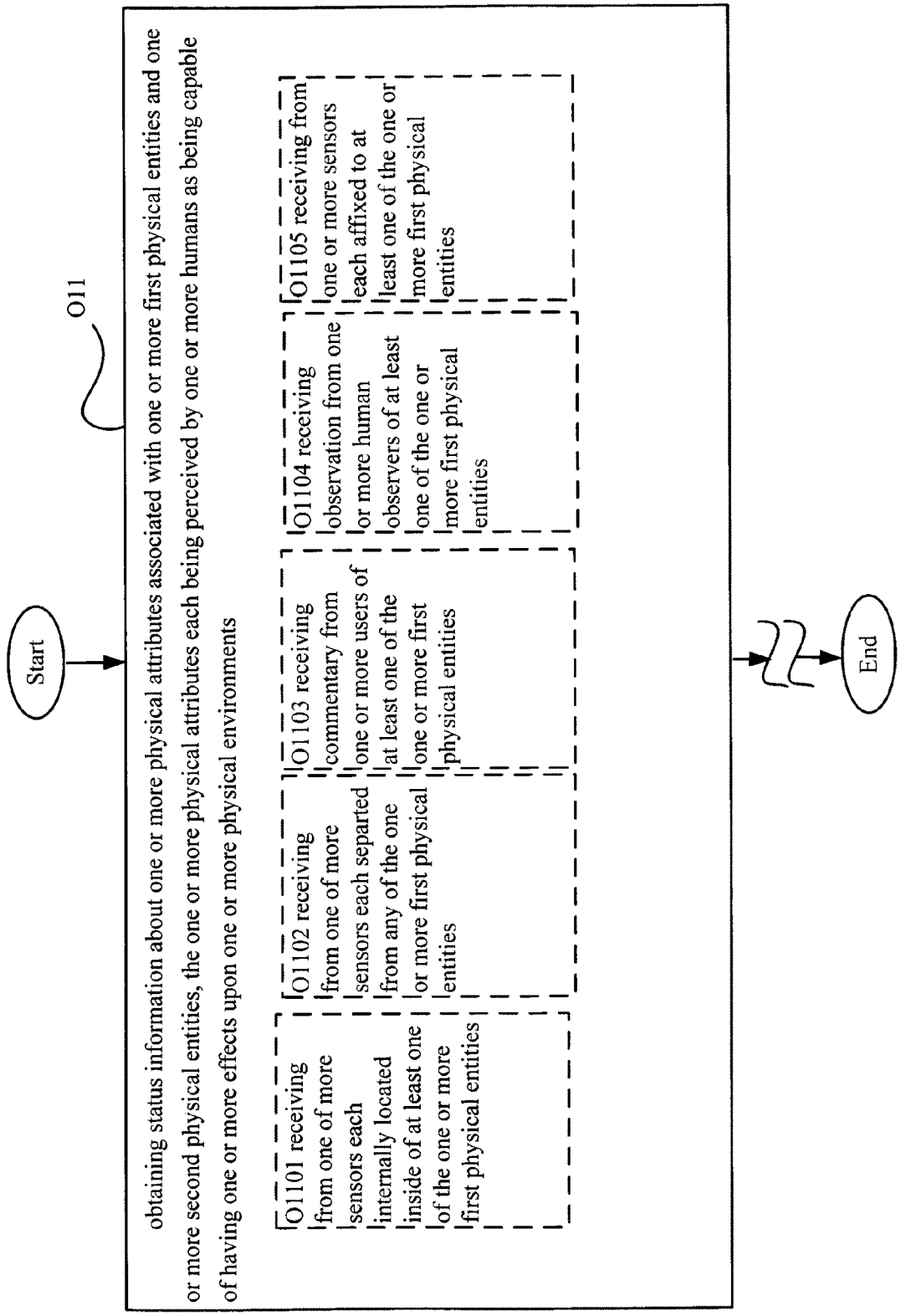
FIG. 23 is a high-level flowchart including exemplary implementations of operation O11 of FIG. 22.

FIG. 23 illustrates various implementations of the exemplary operation O11 of FIG. 22. In particular, FIG. 23 illustrates example implementations where the operation O11 includes one or more additional operations including, for example, operations O1101, O1102, O1103, O1104, and O1105, which may be executed generally by, in some instances, the status determination unit 56 of the status system 14 of FIG. 6.

For instance, in some implementations, the exemplary operation O11 may include the operation of O1101 for receiving from one of more sensors each internally located inside of at least one of the one or more first physical entities. An exemplary implementation may include the sensor receiving module 32*d* of FIG. 4A configured to direct receiving from one of more sensors each internally located inside of at least one of the one or more first physical entities 16 (for example, one or more of the temperature sensors 66*u* of the one or more first physical entities of FIG. 6 could be located inside one or more medical hospital complexes as the one or more first physical entities to collect temperature data wherein the one or more communication units of FIG. 6 send the temperature data to the one or more status determination units 56 of the one or more status systems 14 of FIG. 5 to determine status information, such as one or more temperature related reports of a number of medical hospital complexes to be received by the assessment system 12 of FIG. 4).

For instance, in some implementations, the exemplary operation O11 may include the operation of O1102 for receiving from one of more sensors each separated from any of the one or more first physical entities. An exemplary implementation may include the sensor receiving module 32*e* of FIG. 4A configured to direct receiving from one of more sensors each separated from any of the one or more first physical entities (for example, one or more of the gas sensors 66*o* of the one or more first physical entities 16 of FIG. 6 as coal-fired electric power plants could be positioned in a two mile vicinity of the coal-fired electric power plants to monitor local effects of gas emissions therefrom wherein the one or more communication units 40 of FIG. 6 send gas emission data, such as sulfur emissions, to the one or more status determination units 56 of the one or more status systems 14 of FIG. 5 to determine status information, such as one or more gas emissions reports of a number of electric power plants to be received by the assessment system 12 of FIG. 4).

For instance, in some implementations, the exemplary operation O11 may include the operation of O1103 for receiving commentary from one or more users of at least one of the one or more first physical entities. An exemplary implementation may include the commentary receiving module 32f of FIG. 4A configured to direct receiving commentary from one or more users of at least one of the one or more first physical entities (for example, one or more construction managers can submit through one or more of the interfaces 20 of FIG. 8 usage projections for earth mover equipment for the year 2010 in a southwest region of the state of Washington to be received by the one or more status systems 14 to be used by the one or more status determination units 56 of the status systems to determine status information, such as into one or more reports summarizing earth mover usage projections by a number of managers to be received by the assessment system 12 of FIG. 4).

For instance, in some implementations, the exemplary operation O11 may include the operation of O1104 for receiving observation from one or more human observers of at least one of the one or more first physical entities. An exemplary implementation may include the observation receiving module 32g of FIG. 4A configured to direct receiving observation from one or more human observers of at least one of the one or more first physical entities (for example one or more human observers can submit through the one or more interfaces 20 of FIG. 8 data of all terrain vehicle use in endangered wildlife areas throughout the United States to be received by the one or more status determination units 56 of the one or more status systems 14 of FIG. 5 to determine status information such as one or more reports regarding all terrain vehicle use summarized by geographical regions in the United States to be received be the assessment system 12 of FIG. 4).

For instance, in some implementations, the exemplary operation O11 may include the operation of O1105 for receiving from one or more sensors each affixed to at least one of the one or more first physical entities. An exemplary implementation may include the sensor receiving module 32h of FIG. 4A configured to direct receiving from one or more sensors each affixed to at least one of the one or more first physical entities (for example, the one or more fuel sensors 66t of the one or more first physical entities 16 of FIG. 6 as one or more road vehicles, such as cars and/or trucks, can be affixed to the one or more vehicles as miles per gallon sensors to send miles per gallon data through the one or more communication units 40 of the one or more first physical entities of FIG. 6 to the one or more status determination units 56 of the one or more status systems 14 of FIG. 5 to determine status information, such as one or more miles per gallon reports of a number of vehicles, such as a class of vehicle such as SUVs or hydrids, to be received by the assessment system 12 of FIG. 4).

FIG. 24

Figure 24:
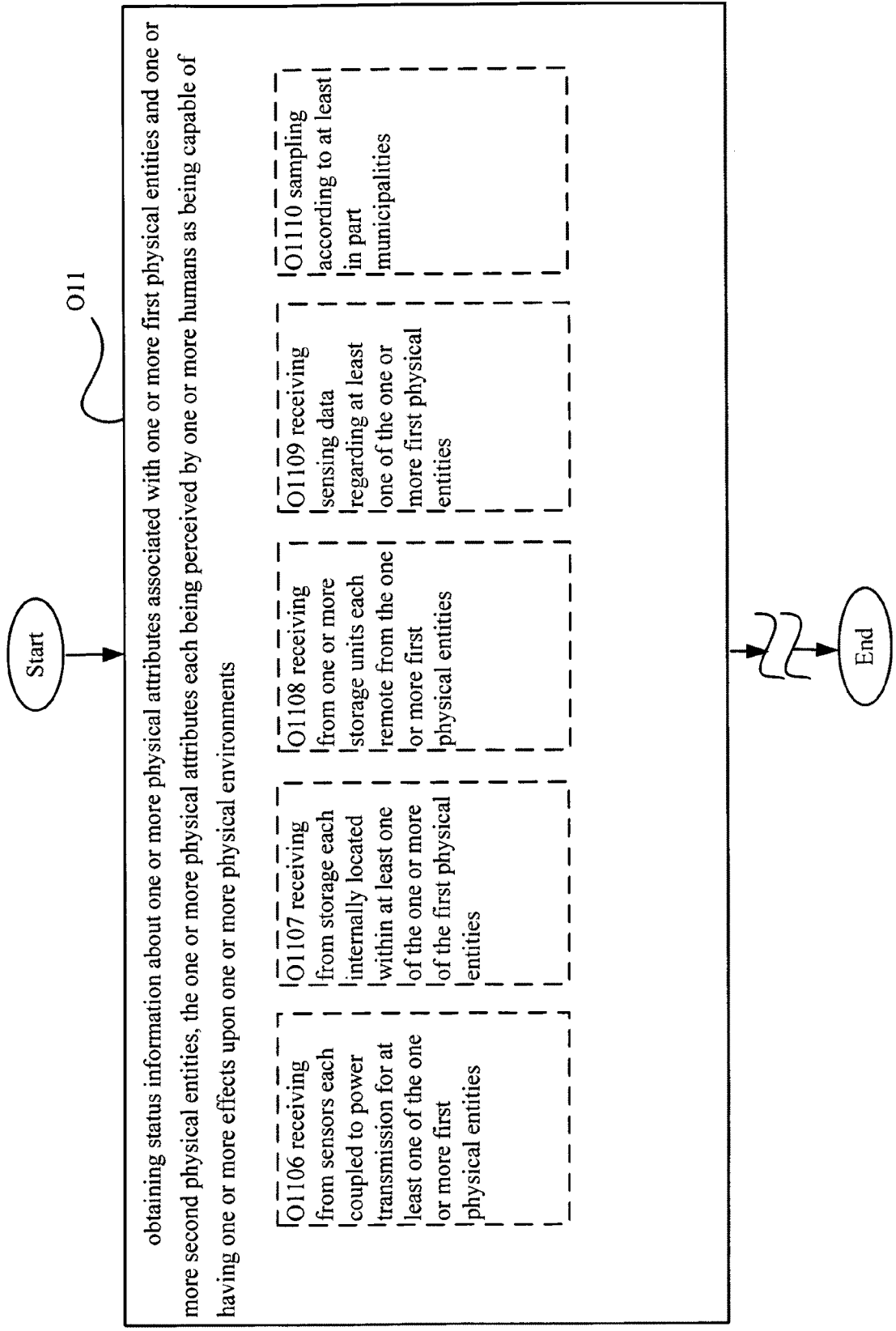
FIG. 24 is a high-level flowchart including exemplary implementations of operation O11 of FIG. 22.

FIG. 24 illustrates various implementations of the exemplary operation O11 of FIG. 22. In particular, FIG. 24 illustrates example implementations where the operation O11 includes one or more additional operations including, for example, operation O1106, O1107, O1108, O1109, and O1110, which may be executed generally by the assessment system 12 of FIG. 3.

For instance, in some implementations, the exemplary operation O11 may include the operation of O1106 for receiving from sensors each coupled to power transmission for at least one of the one or more first physical entities. An exemplary implementation may include the sensor receiving module 32i of FIG. 4A configured to direct receiving from sensors each coupled to power transmission for one of the one or more first physical entities (for example, the one or more electric sensors 66t of the one or more first physical entities 16 of FIG. 6 as one or more electrical appliances, such as clothes washers, can be coupled to the one or more power supplies of the one or more clothes washers to send kilowatt-hours electric usage data for a weekly time span data to the one or more status determination units 56 of the one or more status systems 14 of FIG. 5 to determine status information, such as weekly kilowatt-hour electric usage reports of a number of clothes washers, such as a class of clothes washers, such as Laundromat clothes washers, to be received by the assessment system 12 of FIG. 4).

For instance, in some implementations, the exemplary operation O11 may include the operation of O1107 for receiving from storage each internally located within at least one of the one or more of the first physical entities. An exemplary implementation may include the storage receiving module 32j of FIG. 4A configured to direct receiving from storage each internally located within one of the one or more of the physical entities. (for example, the one or more memories 42c of the one or more communication units 40 of the physical entities 16 of FIG. 6 as one or more laptops, can be configured to send kilowatt-hours electric usage data for a daily time span data by the communication unit 40 to the one or more status determination units 56 of the one or more status systems 14 of FIG. 5 to determine status information, such as weekly kilowatt-hour electric usage reports of a number of laptops, such as a class of laptops, such as laptops associated with a number of colleges and universities located in a geographical region such as the southern United States, to be received by the assessment system 12 of FIG. 4).

For instance, in some implementations, the exemplary operation O11 may include the operation of O1108 for receiving from one or more storage units each remote from the one or more first physical entities. An exemplary implementation may include the storage receiving module 32k of FIG. 4A configured to direct receiving from one or more storage units each remote from the one or more first physical entities (for example, one or more reports of weekly electric usage for entertainment centers in one or more west Seattle neighborhoods contained in the one or more memories 42c of the one or more communication units 40 of the one or more status systems 14 of FIG. 5 located outside of the one or more west Seattle neighborhoods being received by the assessment system 12 of FIG. 4).

For instance, in some implementations, the exemplary operation O11 may include the operation of O1109 for receiving sensing data regarding at least one of the one or more first physical entities. An exemplary implementation may include the sensing receiving module 32l of FIG. 4A configured to direct receiving sensing data regarding at least one of the one or more first physical entities (for example, the one or more seismic based sensing components 54c of the one or more sensing units 54 of the status system 14 of FIG. 5 can collect seismic data regarding a number of construction projects to be summarized into one or more reports by the status determination unit 56 to be received by the assessment system 12 of FIG. 4).

For instance, in some implementations, the exemplary operation O11 may include the operation of O1110 for sampling according to at least in part municipalities. An exemplary implementation may include the municipality receiving module 32m of FIG. 4A configured to direct sampling according to at least in part municipalities (for example, the one or more assessment systems 12 of FIG. 4 can receive status information, such as regarding atmospheric NOx levels from vehicle emissions in the area, from the one or more status systems 14 of FIG. 5 each located in a city or township in the United Status with a population over 50,000 people).

FIG. 25

Figure 25:
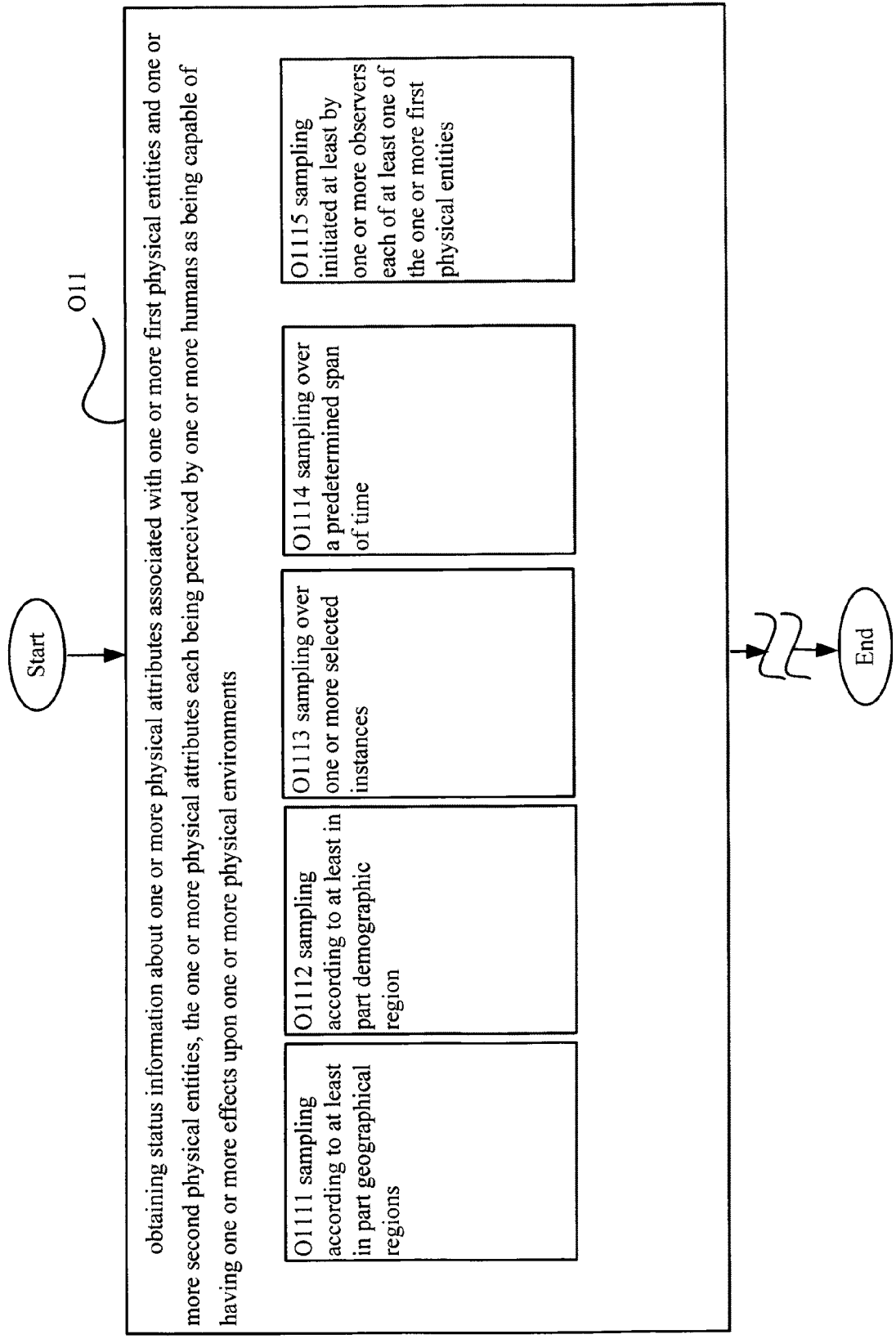
FIG. 25 is a high-level flowchart including exemplary implementations of operation O11 of FIG. 22.

FIG. 25 illustrates various implementations of the exemplary operation O11 of FIG. 22. In particular, FIG. 25 illustrates example implementations where the operation O11 includes one or more additional operations including, for example, operation O1111, O1112, O1113, O1114, and O1115, which may be executed generally by the assessment system 12 of FIG. 3.

For instance, in some implementations, the exemplary operation O11 may include the operation of O1111 for sampling according to at least in part geographical regions. An exemplary implementation may include the geographic receiving module 32n of FIG. 4A configured to direct sampling according to at least in part geographical regions (for example, the one or more assessment systems 12 of FIG. 4 can receive status information, such as regarding petroleum levels in bodies of water due to discharge from watercraft, from the one or more status systems 14 of FIG. 5 each located in various geographical regions of the world, such as including various mountainous regions, plains regions, and/or desert regions).

For instance, in some implementations, the exemplary operation O11 may include the operation of O1112 for sampling according to at least in part demographic region. An exemplary implementation may include the demographic sampling module 32o of FIG. 4A configured to direct sampling according to at least in part a demographic regions (for example, the one or more assessment systems 12 of FIG. 4 can receive status information, such as regarding overall energy usage per household, from the one or more status systems 14 of FIG. 5 each household located in various demographic regions of the world, such as including various urban, rural, and/or suburban neighborhoods).

For instance, in some implementations, the exemplary operation O11 may include the operation of O1113 for sampling over one or more selected instances. An exemplary implementation may include the selected sampling module 32p of FIG. 4A configured to direct sampling over one or more selected instances (for example, the one or more assessment systems 12 of FIG. 4 can receive status information, such as regarding number of tons of refuse collected from various neighborhoods in a metropolitan area such as Dallas, Tex., USA for a monthly periods, such as January, April, June, September, and November for years ending in odd numbers and February, May, July, and October for years ending in even numbers).

For instance, in some implementations, the exemplary operation O11 may include the operation of O1114 for sampling over a predetermined span of time. An exemplary implementation may include the span sampling module 32q of FIG. 4A configured to direct sampling over a predetermined span of time (for example, the one or more assessment systems 12 of FIG. 4 can receive status information, such as regarding number of miles driven by state and particular vehicle from Mar. 1, 2009 through November $30^{th}$).

For instance, in some implementations, the exemplary operation O11 may include the operation of O1115 for sampling initiated at least by one or more observers each of at least one of the one or more first physical entities. An exemplary implementation may include the observer sampling module 32r of FIG. 4A configured to direct sampling initiated at least by one or more observers each of at least one of the one or more first physical entities. (For example, the one or more assessment systems 12 of FIG. 4 can receive status information, such as regarding number of miles driven by state and particular vehicle from Mar. 1, 2009 through Nov. 30, 2010).

FIG. 26

Figure 26:
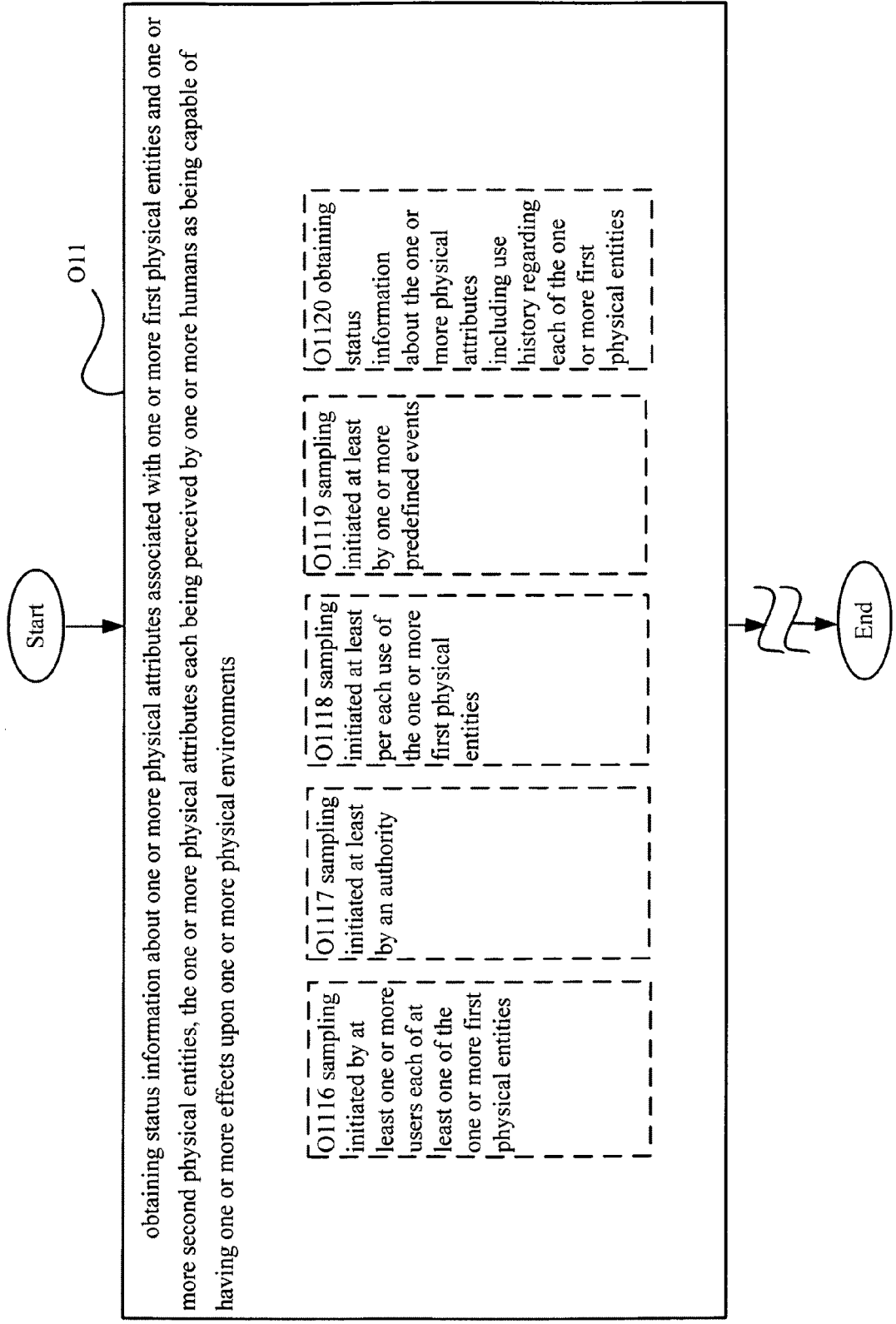
FIG. 26 is a high-level flowchart including exemplary implementations of operation O11 of FIG. 22.

FIG. 26 illustrates various implementations of the exemplary operation O11 of FIG. 22. In particular, FIG. 26 illustrates example implementations where the operation O11 includes one or more additional operations including, for example, operation O1116, O1117, O1118, O1119, and O1120, which may be executed generally by the assessment system 12 of FIG. 3.

For instance, in some implementations, the exemplary operation O11 may include the operation of O1116 for sampling initiated by at least one or more users each of at least one of the one or more first physical entities. An exemplary implementation may include the user sampling module 32s of FIG. 4A configured to direct sampling initiated by at least one or more users each of one of the one or more first physical entities (for example, the one or more assessment systems 12 of FIG. 4 can receive status information, such as regarding one or more reports on miles per gallon for a number of vehicles as the one or more first physical entities 16 with collection of miles per gallon data being initiated by the drivers of each of the vehicles).

For instance, in some implementations, the exemplary operation O11 may include the operation of O1117 or sampling initiated at least by an authority. An exemplary implementation may include the authority sampling module 32t of FIG. 4A configured to direct sampling initiated at least by an authority (for example, the one or more assessment systems 12 of FIG. 4 can receive status information, such as regarding household water usage in gallons for a number of households as the one or more first physical entities 16 with collection of water usage being initiated by a local public works office of a local municipality during, for instance, a dry season of diminished municipal water supply).

For instance, in some implementations, the exemplary operation O11 may include the operation of O1118 for sampling initiated at least per each use of the one or more first physical entities. An exemplary implementation may include the use sampling module 32u of FIG. 4A configured to direct sampling initiated at least per each use of the one or more first physical entities. (For example, the one or more assessment systems 12 of FIG. 4 can receive status information, such as regarding firearm use location correlated with rounds per session for a number of firearms as the one or more first physical entities 16 with collection of firearm use being initiated by an initial firing demarking a beginning of a session).

For instance, in some implementations, the exemplary operation O11 may include the operation of O1119 for sampling initiated at least by one or more predefined events. An exemplary implementation may include the event sampling module 32v of FIG. 4A configured to direct sampling initiated at least by one or more predefined events. (For example, the one or more assessment systems 12 of FIG. 4 can receive status information, such as regarding the one or more physical attributes 17 of FIG. 1 related to tailpipe emissions for a number of vehicles, the tailpipe emissions being collected for each vehicle when each vehicle is experiencing an acceleration event).

For instance, in some implementations, the exemplary operation O11 may include the operation of O1120 for obtaining status information about the one or more physical attributes including use history regarding each of the one or more first physical entities. An exemplary implementation may include the use history obtaining module 32w of FIG. 4A configured to direct obtaining status information about the one or more physical attributes including use history regarding each of the one or more first physical entities (for example, the one or more assessment systems 12 of FIG. 4 can receive status information, such as regarding the one or more physical attributes 17 of FIG. 1 related to number of highway miles driven versus number of city miles driven for a number of vehicles as the one or more first physical entities 16 wherein highway miles and city miles are distinguished by the vehicles traveling at least 50 miles per hour and traveling under 50 miles per hour, respectively).

FIG. 27

Figure 27:
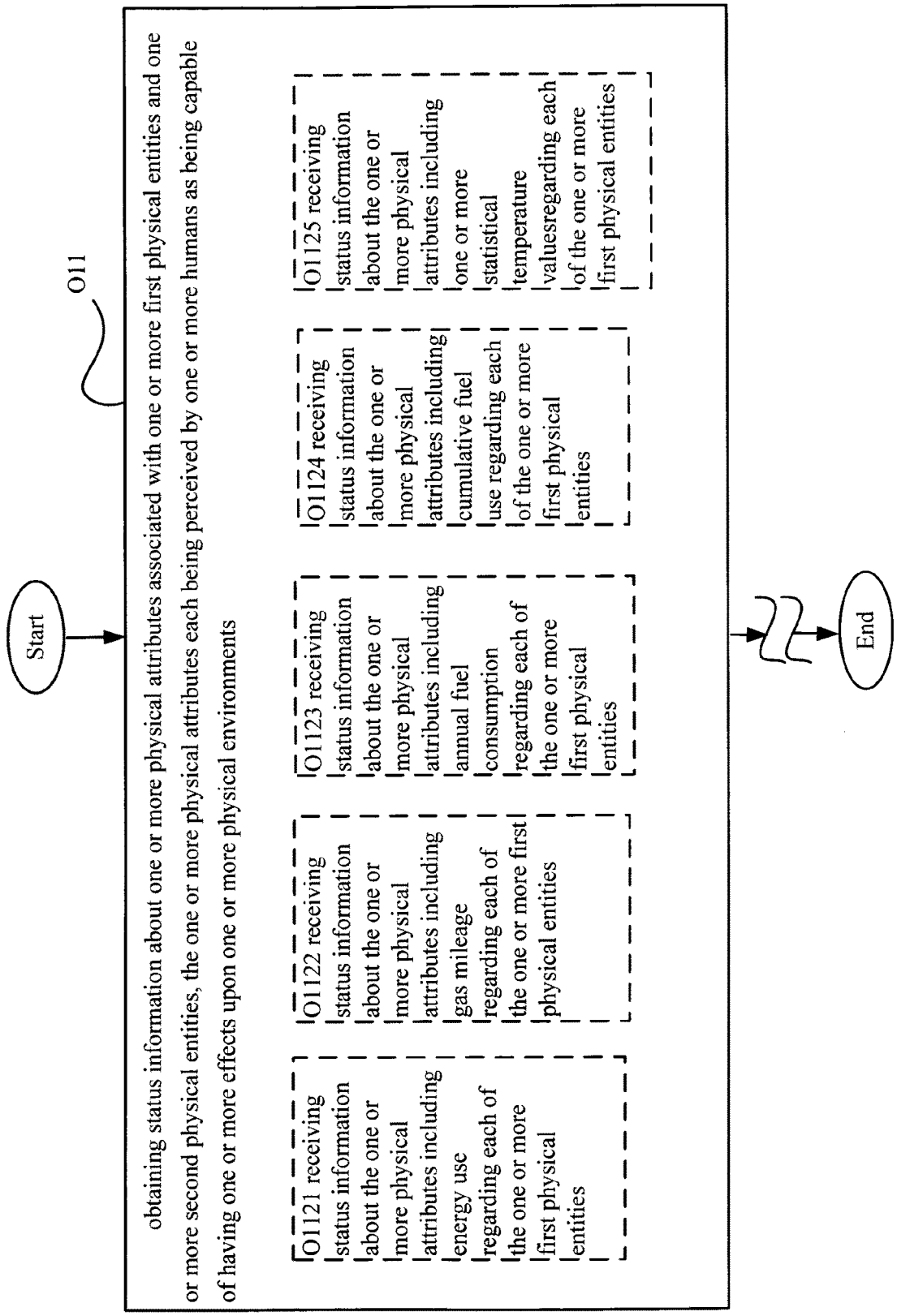
FIG. 27 is a high-level flowchart including exemplary implementations of operation O11 of FIG. 22.

FIG. 27 illustrates various implementations of the exemplary operation O11 of FIG. 22. In particular, FIG. 27 illustrates example implementations where the operation O11 includes one or more additional operations including, for example, operation O1121, O1122, O1123, O1124, and O1125, which may be executed generally by the assessment system 12 of FIG. 3.

For instance, in some implementations, the exemplary operation O11 may include the operation of O1121 for receiving status information about the one or more physical attributes including energy use regarding each of the one or more first physical entities. An exemplary implementation may include the energy use receiving module 32x of FIG. 4A configured to direct receiving status information about the one or more physical attributes including energy use regarding each of the one or more first physical entities (for example, the one or more assessment systems 12 of FIG. 4 can receive status information, such as regarding the one or more physical attributes 17 of FIG. 1 related to number of BTU-hours consumed by a number of commercial heating systems for office complexes as the one or more first physical entities 16 of FIG. 6).

For instance, in some implementations, the exemplary operation O11 may include the operation of O1122 for receiving status information about the one or more physical attributes including gas mileage regarding each of the one or more first physical entities. An exemplary implementation may include the gas mileage receiving module 32y of FIG. 4A configured to direct receiving status information about the one or more physical attributes including gas mileage regarding each of the one or more first physical entities (for example, the one or more assessment systems 12 of FIG. 4 can receive status information, such as regarding the one or more physical attributes 17 of FIG. 1 related to gas mileage for a first number of hybrid cars versus gas mileage a second number of diesel cars as the one or more first physical entities 16).

For instance, in some implementations, the exemplary operation O11 may include the operation of O1123 for receiving status information about the one or more physical attributes including annual fuel consumption regarding each of the one or more first physical entities. An exemplary implementation may include the fuel consumption receiving module 32z of FIG. 4A configured to direct receiving status information about the one or more physical attributes including annual fuel consumption regarding each of the one or more first physical entities (for example, the one or more assessment systems 12 of FIG. 4 can receive status information, such as regarding the one or more physical attributes 17 of FIG. 1 related to annual fuel consumption in barrels of heating oil for a number of homes in a particular neighborhood as the one or more first physical entities 16).

For instance, in some implementations, the exemplary operation O11 may include the operation of O1124 for receiving status information about the one or more physical attributes including cumulative fuel use regarding each of the one or more first physical entities. An exemplary implementation may include the fuel use receiving module 32aa of FIG. 4A configured to direct receiving status information about the one or more physical attributes including cumulative fuel use regarding each of the one or more first physical entities (for example, the one or more assessment systems 12 of FIG. 4 can receive status information, such as regarding the one or more physical attributes 17 of FIG. 1 related to metric tons of coal cumulatively used over a fourth quarter of 2009 by a number of coal-fired boilers for industrial steam and electric power generation as the one or more first physical entities 16).

For instance, in some implementations, the exemplary operation O11 may include the operation of O1125 for receiving status information about the one or more physical attributes including one or more statistical temperature values regarding each of the one or more first physical entities. An exemplary implementation may include the statistical temperature receiving module 32ab of FIG. 4A configured to direct receiving status information about the one or more physical attributes including one or more statistical temperature values regarding each of the one or more first physical entities (for example, the one or more assessment systems 12 of FIG. 4 can receive status information, such as regarding the one or more physical attributes 17 of FIG. 1 related to mean high temperatures and mean low temperatures for meeting facilities including concert halls and convention centers as the one or more first physical entities 16).

FIG. 28

Figure 28:
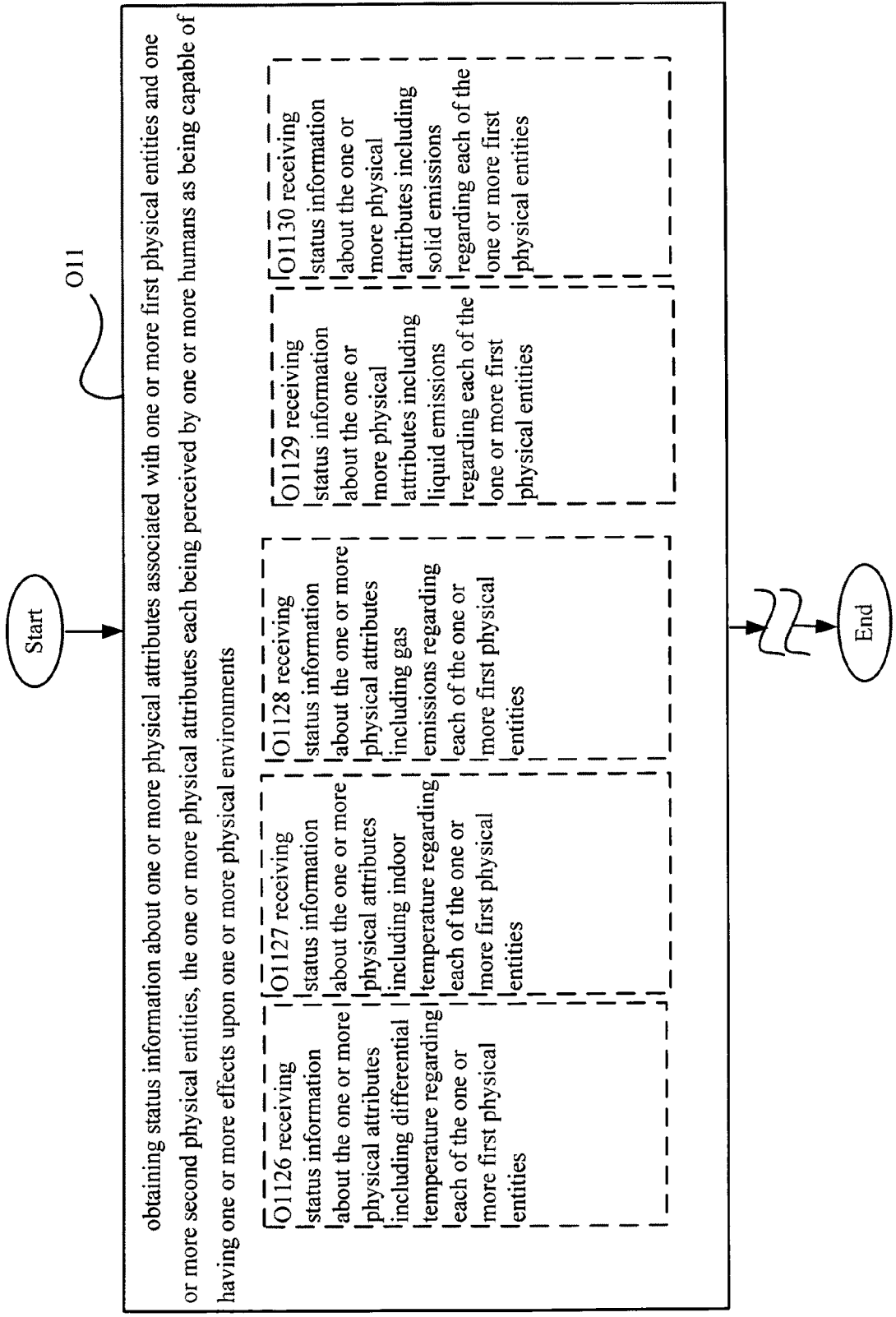
FIG. 28 is a high-level flowchart including exemplary implementations of operation O11 of FIG. 22.

FIG. 28 illustrates various implementations of the exemplary operation O11 of FIG. 22. In particular, FIG. 28 illustrates example implementations where the operation O11 includes one or more additional operations including, for example, operation O1126, O1127, O1128, O1129, and O1130, which may be executed generally by the assessment system 12 of FIG. 3.

For instance, in some implementations, the exemplary operation O11 may include the operation of O1126 for receiving status information about the one or more physical attributes including differential temperature regarding each of the one or more first physical entities. An exemplary implementation may include the differential temperature receiving module 32ac of FIG. 4A configured to direct receiving status information about the one or more physical attributes including differential temperature regarding each of the one or more first physical entities (for example, the one or more assessment systems 12 of FIG. 4 can receive status information, such as regarding the one or more physical attributes 17 of FIG. 1 related to temperature differences between indoor temperatures of educational facilities, such as schools, and temperatures of outdoor air adjacent the educational facilities as the one or more first physical entities 16).

For instance, in some implementations, the exemplary operation O11 may include the operation of O1127 for receiving status information about the one or more physical attributes including indoor temperature regarding each of the one or more first physical entities. An exemplary implementation may include the indoor temperature receiving module 32ad of FIG. 4A configured to direct receiving status information about the one or more physical attributes including indoor temperature regarding each of the one or more first physical entities (for example, the one or more assessment systems 12 of FIG. 4 can receive status information, such as regarding the one or more physical attributes 17 of FIG. 1 related to indoor temperature profiles over one or more 24 hour periods of a number of office facilities and other work facilities including factory floors and retail shops as the one or more first physical entities 16).

For instance, in some implementations, the exemplary operation O11 may include the operation of O1128 for receiving status information about the one or more physical attributes including gas emissions regarding each of the one or more first physical entities. An exemplary implementation may include the gas emissions receiving module 32ae of FIG. 4A configured to direct receiving status information about the one or more physical attributes including gas emissions regarding each of the one or more first physical entities (for example, the one or more assessment systems 12 of FIG. 4 can receive status information, such as regarding the one or more physical attributes 17 of FIG. 1 related to carbon dioxide gas emissions of a number of fossil fuel, such as coal, oil, or wood fired furnaces as the one or more first physical entities 16).

For instance, in some implementations, the exemplary operation O11 may include the operation of O1129 for receiving status information about the one or more physical attributes including liquid emissions regarding each of the one or more first physical entities. An exemplary implementation may include the liquid emissions receiving module 32af of FIG. 4A configured to direct receiving status information about the one or more physical attributes including liquid emissions regarding each of the one or more first physical entities (for example, the one or more assessment systems 12 of FIG. 4 can receive status information, such as regarding the one or more physical attributes 17 of FIG. 1 related to petro-chemical liquid emissions of a number of container ships entering into sea ports of the United States as the one or more first physical entities 16).

For instance, in some implementations, the exemplary operation O11 may include the operation of O1130 for receiving status information about the one or more physical attributes including solid emissions regarding each of the one or more first physical entities. An exemplary implementation may include the solid emissions receiving module 32ag of FIG. 4A configured to direct receiving status information about the one or more physical attributes including solid emissions regarding each of the one or more first physical entities (for example, the one or more assessment systems 12 of FIG. 4 can receive status information, such as regarding the one or more physical attributes 17 of FIG. 1 related to the number of tons of garbage dumped over a week period of time from barges as the one or more first physical entities 16 into a body of water such as an off-shore area of the Atlantic Ocean).

FIG. 29

Figure 29:
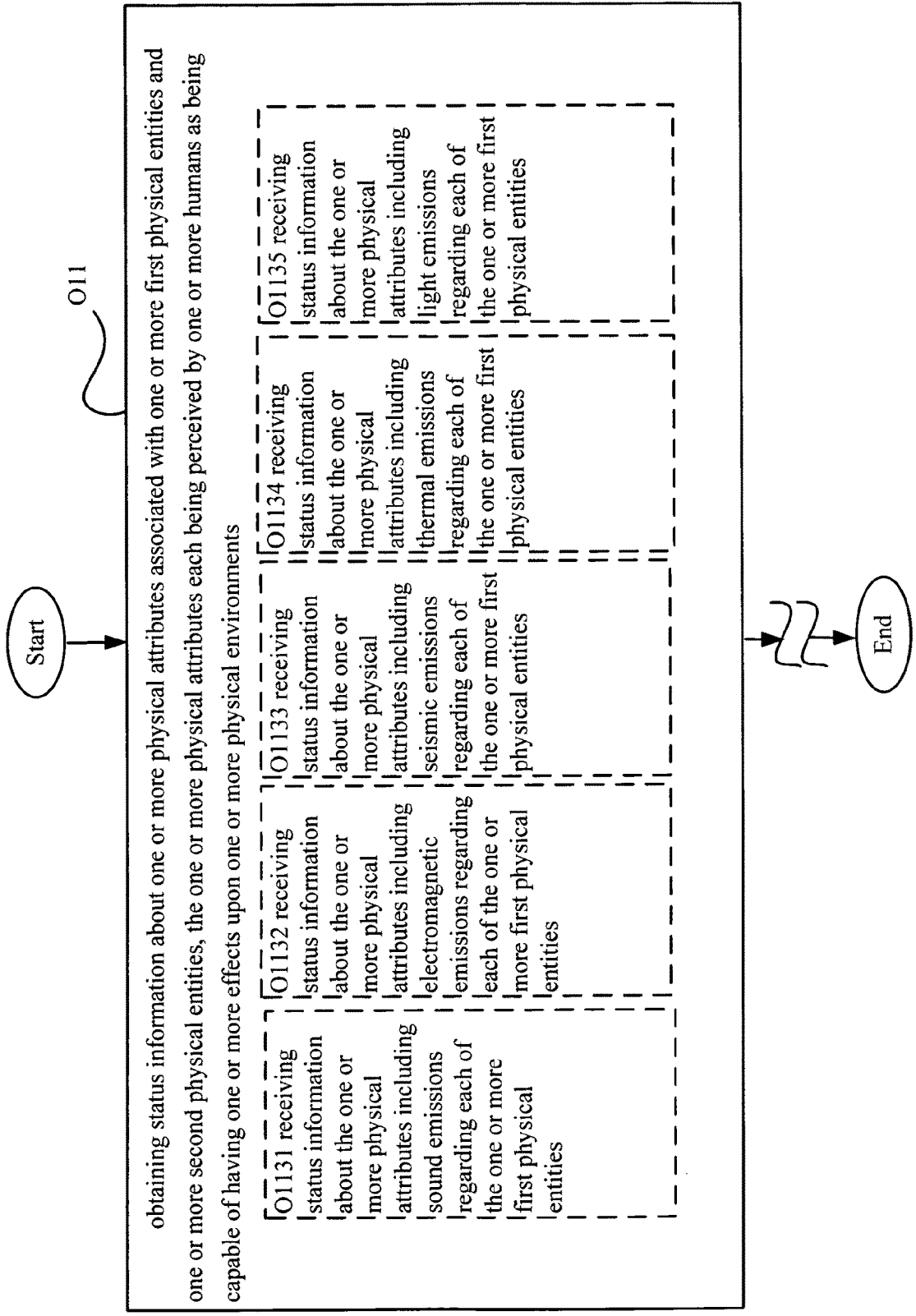
FIG. 29 is a high-level flowchart including exemplary implementations of operation O11 of FIG. 22.

FIG. 29 illustrates various implementations of the exemplary operation O11 of FIG. 22. In particular, FIG. 29 illustrates example implementations where the operation O11 includes one or more additional operations including, for example, operation O1131, O1132, O1133, O1134, and O1135, which may be executed generally by the assessment system 12 of FIG. 3.

For instance, in some implementations, the exemplary operation O11 may include the operation of O1131 for receiving status information about the one or more physical attributes including sound emissions regarding each of the one or more first physical entities. An exemplary implementation may include the sound emissions receiving module 32ah of FIG. 4A configured to direct receiving status information about the one or more physical attributes including sound emissions regarding each of the one or more first physical entities (for example, the one or more assessment systems 12 of FIG. 4 can receive status information, such as regarding the one or more physical attributes 17 of FIG. 1 related to a 24 hour time history of decibel levels of sound produced by yard equipment for each of a number of homes restricted by covenants or other provisions limiting generation of noise between specified hours during a day by yard equipment such as lawn mowers, blowers, and trimmers as the one or more first physical entities 16).

For instance, in some implementations, the exemplary operation O11 may include the operation of O1132 for receiving status information about the one or more physical attributes including electromagnetic emissions regarding each of the one or more first physical entities. An exemplary implementation may include the EM emissions module 32ba of FIG. 4B configured to direct receiving status information about the one or more physical attributes including electromagnetic emissions regarding each of the one or more first physical entities (for example, the one or more assessment systems 12 of FIG. 4 can receive status information, such as regarding the one or more physical attributes 17 of FIG. 1 related to electromagnetic emissions within work centers from communication equipment, such as wireless networking equipment and/or cellular transmission equipment and/or in selected neighborhoods from overhead electric power transmission lines as the one or more first physical entities 16).

For instance, in some implementations, the exemplary operation O11 may include the operation of O1133 for receiving status information about the one or more physical attributes including seismic emissions regarding each of the one or more first physical entities. An exemplary implementation may include the seismic emissions module 32bb of FIG. 4B configured to direct receiving status information about the one or more physical attributes including seismic emissions such as regarding each of the one or more first physical entities (for example, the one or more assessment systems 12 of FIG. 4 can receive status information, such as regarding the one or more physical attributes 17 of FIG. 1 related to seismic emissions from construction equipment, such as bulldozers, jack hammers, pile drivers, etc being operated in proximity to vibration sensitive activities such as office buildings or other facilities where mental concentration could be disrupted by such seismic emissions of the construction equipment, as the one or more first physical entities 16).

For instance, in some implementations, the exemplary operation O11 may include the operation of O1134 for receiving status information about the one or more physical attributes including thermal emissions regarding each of the one or more first physical entities. An exemplary implementation may include the thermal emissions module 32bc of FIG. 4B configured to direct receiving status information about the one or more physical attributes including thermal emissions regarding each of the one or more first physical entities (for example, the one or more assessment systems 12 of FIG. 4 can receive status information, such as regarding the one or more physical attributes 17 of FIG. 1 related to thermal emissions from homes and office buildings as the one or more first physical entities 16 such as in the form of infrared captured thermal profiles of each building to characterize thermal insulation efficiencies of the buildings).

For instance, in some implementations, the exemplary operation O11 may include the operation of O1135 for receiving status information about the one or more physical attributes including light emissions regarding each of the one or more first physical entities. An exemplary implementation may include the light emissions module 32bd of FIG. 4B configured to direct receiving status information about the one or more physical attributes including light emissions regarding each of the one or more first physical entities (for example, the one or more assessment systems 12 of FIG. 4 can receive status information, such as regarding the one or more physical attributes 17 of FIG. 1 related to amount of lumens being emitted from office buildings during grave-shift hours thereby indicating a degree of energy wastefulness as associated with the office buildings as the one or more first physical entities 16).

FIG. 30

Figure 30:
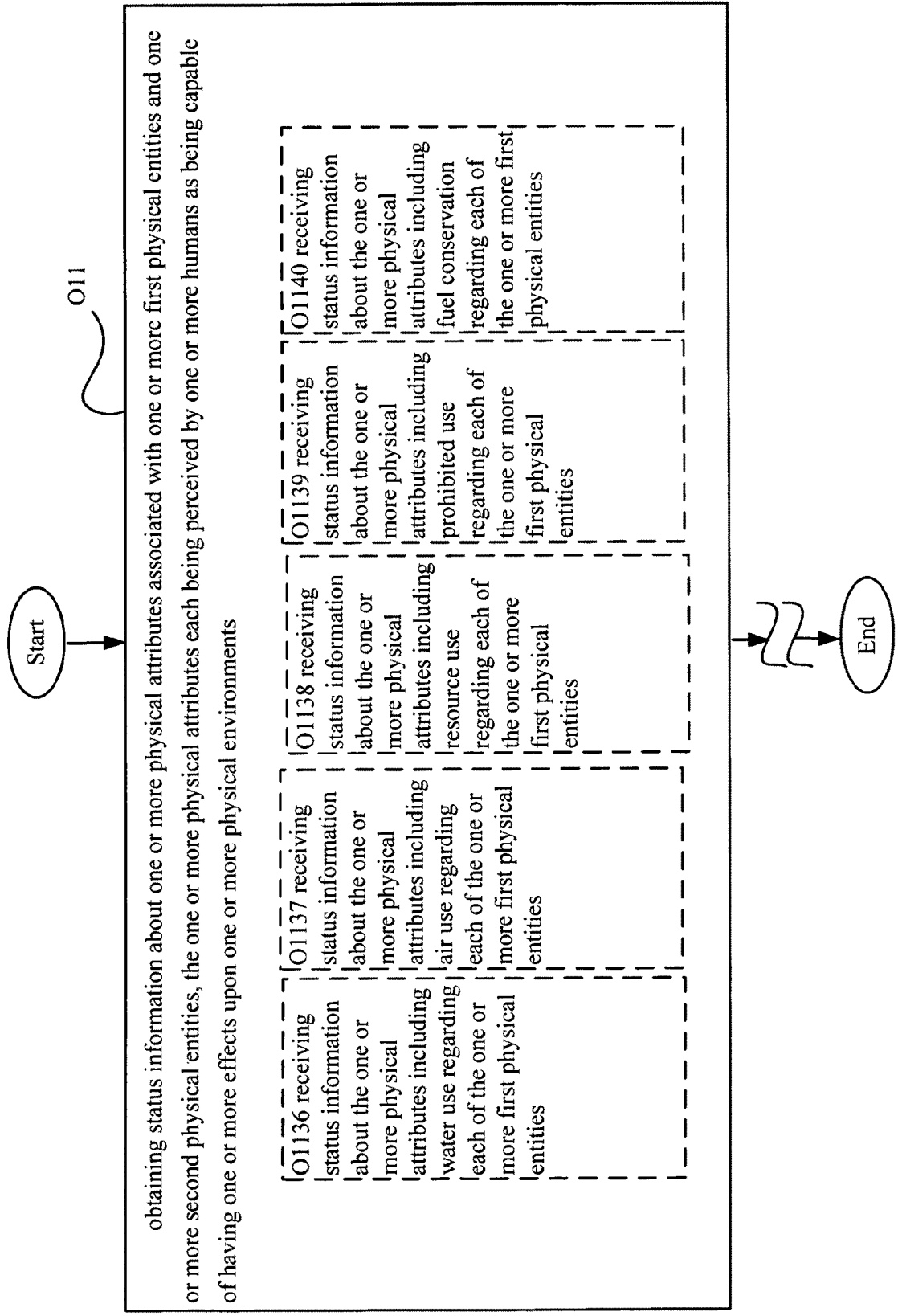
FIG. 30 is a high-level flowchart including exemplary implementations of operation O11 of FIG. 22.

FIG. 30 illustrates various implementations of the exemplary operation O11 of FIG. 22. In particular, FIG. 30 illustrates example implementations where the operation O11 includes one or more additional operations including, for example, operation O1136, O1137, O1138, O1139, and O1140, which may be executed generally by the assessment system 12 of FIG. 3.

For instance, in some implementations, the exemplary operation O11 may include the operation of O1136 for receiving status information about the one or more physical attributes including water use regarding each of the one or more first physical entities. An exemplary implementation may include the water use module 32$be$ of FIG. 4B configured to direct receiving status information about the one or more physical attributes including water use regarding each of the one or more first physical entities (for example, the one or more assessment systems 12 of FIG. 4 can receive status information, such as regarding the one or more physical attributes 17 of FIG. 1 related to number of gallons of water used over a summer time period by car wash facilities located across a desert region thereby indicating level of water use by the car wash facilities as the one or more first physical entities 16).

For instance, in some implementations, the exemplary operation O11 may include the operation of O1137 for receiving status information about the one or more physical attributes including air use regarding each of the one or more first physical entities. An exemplary implementation may include the air use module 32$bf$ of FIG. 4B configured to direct receiving status information about the one or more physical attributes including air use regarding each of the one or more first physical entities (for example, the one or more assessment systems 12 of FIG. 4 can receive status information, such as regarding the one or more physical attributes 17 of FIG. 1 related to carbon dioxide levels of interior air and exhaust air from a number of office buildings and centers thereby indicating level of air quality of the office building and centers as the one or more first physical entities 16).

For instance, in some implementations, the exemplary operation O11 may include the operation of O1138 for receiving status information about the one or more physical attributes including resource use regarding each of the one or more first physical entities. An exemplary implementation may include the resource use module 32$bg$ of FIG. 4B configured to direct receiving status information about the one or more physical attributes including resource use regarding each of the one or more first physical entities (for example, the one or more assessment systems 12 of FIG. 4 can receive status information, such as regarding the one or more physical attributes 17 of FIG. 1 related to number of tons of recyclable material disposed of in land fills by garbage trucks as the one or more first physical entities 16 servicing a number of various neighborhoods to indicate the various resource use efficiencies associated with the various neighborhoods, such as a highly efficient resource use neighborhood would have a low level of recyclable material and a less efficient resource use neighborhood would have a higher level of recyclable material in the garage trucks being disposed of as garbage rather than recyclable material).

For instance, in some implementations, the exemplary operation O11 may include the operation of O1139 for receiving status information about the one or more physical attributes including prohibited use regarding each of the one or more first physical entities. An exemplary implementation may include the prohibited use module 32$bh$ of FIG. 4B configured to direct receiving status information about the one or more physical attributes including prohibited use regarding each of the one or more first physical entities (for example, the one or more assessment systems 12 of FIG. 4 can receive status information, such as regarding the one or more physical attributes 17 of FIG. 1 related to numbers of elephants as the one or more first physical entities 16 being poached in various regions of the world for ivory, which has been prohibited in many areas of the world but has continued on due to small legalized markets serving as laundering opportunities for the illegal ivory).

For instance, in some implementations, the exemplary operation O11 may include the operation of O1140 for receiving status information about the one or more physical attributes including fuel conservation regarding each of the one or more first physical entities. An exemplary implementation may include the fuel conservation module 32$bi$ of FIG. 4B configured to direct receiving status information about the one or more physical attributes including fuel conservation regarding each of the one or more first physical entities (for example, the one or more assessment systems 12 of FIG. 4 can receive status information, such as regarding the one or more physical attributes 17 of FIG. 1 related to number of miles walked for each of a number of individuals having monitored walking shoes as the one or more first physical entities 16 as compared to number of miles that the individuals drive their respective vehicles as other of the one or more first physical entities as an indication of degree of fuel conservation being practiced by each of the individuals).

FIG. 31

Figure 31:
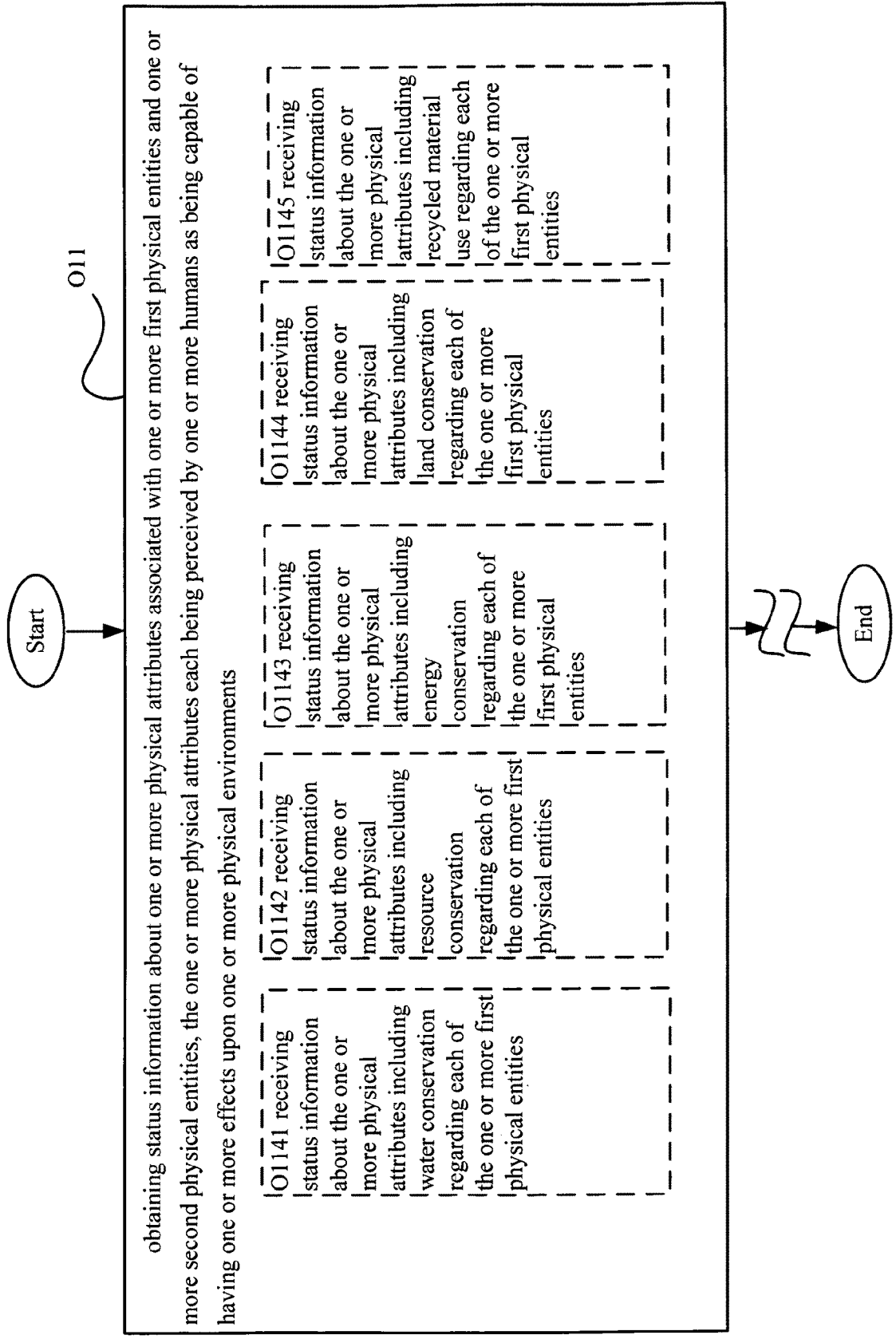
FIG. 31 is a high-level flowchart including exemplary implementations of operation O11 of FIG. 22.

FIG. 31 illustrates various implementations of the exemplary operation O11 of FIG. 22. In particular, FIG. 31 illustrates example implementations where the operation O11 includes one or more additional operations including, for example, operation O1141, O1142, O1143, O1144, and O1145, which may be executed generally by the assessment system 12 of FIG. 3.

For instance, in some implementations, the exemplary operation O11 may include the operation of O1141 for receiving status information about the one or more physical attributes including water conservation regarding each of the one or more first physical entities. An exemplary implementation may include the water conservation module 32$bj$ of FIG. 4B configured to direct receiving status information about the one or more physical attributes including water conservation regarding each of the one or more first physical entities (for example, the one or more assessment systems 12 of FIG. 4 can receive status information, such as regarding the one or more physical attributes 17 of FIG. 1 related to number of gallons of water annually used in servicing each customer by restaurants and other food preparation facilities as the one or more first physical entities 16 thereby indicating associated levels of water conservation).

For instance, in some implementations, the exemplary operation O11 may include the operation of O1142 for receiving status information about the one or more physical attributes including resource conservation regarding each of the one or more first physical entities. An exemplary implementation may include the resource conservation module 32$bk$ of FIG. 4B configured to direct receiving status information about the one or more physical attributes including resource conservation regarding each of the one or more first physical entities (for example, the one or more assessment systems 12 of FIG. 4 can receive status information, such as regarding the one or more physical attributes 17 of FIG. 1 related to number of trees planted in various designated acreage as the one or more first physical entities 16 of FIG. 6 thereby indicating level of soil conservation).

For instance, in some implementations, the exemplary operation O11 may include the operation of O1143 for receiving status information about the one or more physical attributes including energy conservation regarding each of the one or more first physical entities. An exemplary implementation may include the energy conservation module 32*bl* of FIG. 4B configured to direct receiving status information about the one or more physical attributes including energy conservation regarding each of the one or more first physical entities (for example, the one or more assessment systems 12 of FIG. 4 can receive status information, such as regarding the one or more physical attributes 17 of FIG. 1 related to R-ratings of building walls as the one or more first physical entities 16 as determined from infrared scans of the building walls).

For instance, in some implementations, the exemplary operation O11 may include the operation of O1144 for receiving status information about the one or more physical attributes including land conservation regarding each of the one or more first physical entities. An exemplary implementation may include the land conservation module 32*bm* of FIG. 4B configured to direct receiving status information about the one or more physical attributes including land conservation regarding each of the one or more first physical entities (for example, the one or more assessment systems 12 of FIG. 4 can receive status information, such as regarding the one or more physical attributes 17 of FIG. 1 related to use of petrochemical fertilizers, herbicides, and pesticides as the one or more first physical entities 16 on crop acreage as an indicator of land conservation).

For instance, in some implementations, the exemplary operation O11 may include the operation of O1145 for receiving status information about the one or more physical attributes including recycled material use regarding each of the one or more first physical entities. An exemplary implementation may include the material use module 32*bn* of FIG. 4B configured to direct receiving status information about the one or more physical attributes including recycled material use regarding each of the one or more first physical entities (for example, the one or more assessment systems 12 of FIG. 4 can receive status information, such as regarding the one or more physical attributes 17 of FIG. 1 related to number of pounds of recycled material per household as the one or more first physical entities 16 in a number of neighborhoods taken to one or more recycle facilities).

FIG. 32

Figure 32:
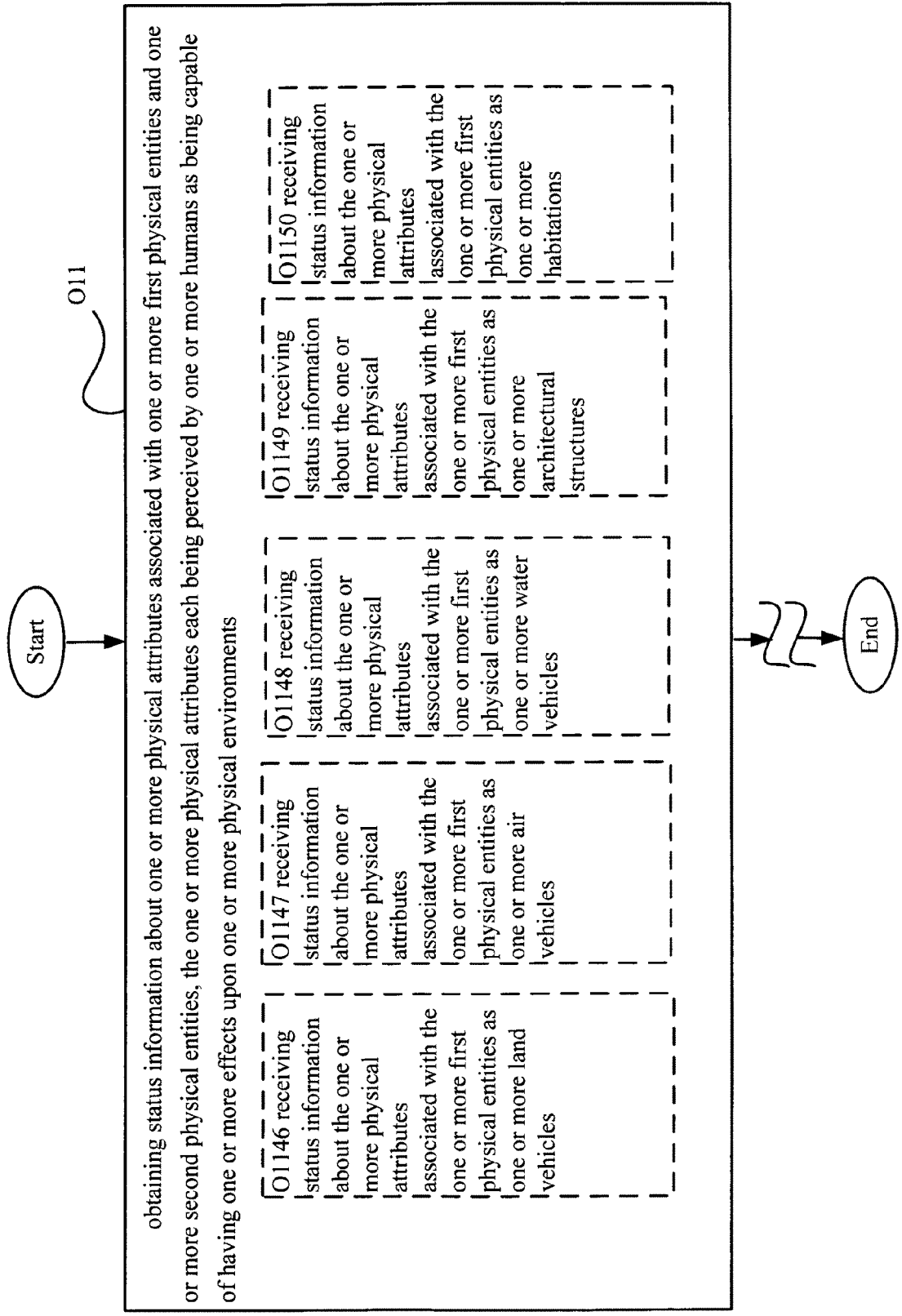
FIG. 32 is a high-level flowchart including exemplary implementations of operation O11 of FIG. 22.

FIG. 32 illustrates various implementations of the exemplary operation O11 of FIG. 22. In particular, FIG. 32 illustrates example implementations where the operation O11 includes one or more additional operations including, for example, operation O1146, O1147, O1148, O1149, and O1150, which may be executed generally by the assessment system 12 of FIG. 3.

For instance, in some implementations, the exemplary operation O11 may include the operation of O1146 for receiving status information about the one or more physical attributes associated with the one or more first physical entities as one or more land vehicles. An exemplary implementation may include the land vehicle module 32*bo* of FIG. 4B configured to direct receiving status information about the one or more physical attributes associated with one or more first physical entities as one or more land vehicles (for example, the one or more assessment systems 12 of FIG. 4 can receive status information, such as regarding the one or more physical attributes 17 of FIG. 1 related to noxious gas emission levels on a monthly basis from over the road semi-tractor trailers as the one or more first physical entities 16).

For instance, in some implementations, the exemplary operation O11 may include the operation of O1147 for receiving status information about the one or more physical attributes associated with the one or more first physical entities as one or more air vehicles. An exemplary implementation may include the air vehicle module 32*bp* of FIG. 4B configured to direct receiving status information about the one or more physical attributes associated with one or more first physical entities as one or more air vehicles (for example, the one or more assessment systems 12 of FIG. 4 can receive status information, such as regarding the one or more physical attributes 17 of FIG. 1 related to noxious gas emission levels on a quarterly basis from commercial jet aircraft as the one or more first physical entities 16).

For instance, in some implementations, the exemplary operation O11 may include the operation of O1148 for receiving status information about the one or more physical attributes associated with the one or more first physical entities as one or more water vehicles. An exemplary implementation may include the water vehicle module 32*bq* of FIG. 4B configured to direct receiving status information about the one or more physical attributes associated with one or more first physical entities as one or more water vehicles (for example, the one or more assessment systems 12 of FIG. 4 can receive status information, such as regarding the one or more physical attributes 17 of FIG. 1 related to noxious liquid emission levels on a daily basis from a number of cruise ships as the one or more first physical entities 16).

For instance, in some implementations, the exemplary operation O11 may include the operation of O1149 for receiving status information about the one or more physical attributes associated with the one or more first physical entities as one or more architectural structures. An exemplary implementation may include the architectural module 32*br* of FIG. 4B configured to direct receiving status information about the one or more physical attributes associated with one or more first physical entities as one or more architectural structures vehicles (for example, the one or more assessment systems 12 of FIG. 4 can receive status information, such as regarding the one or more physical attributes 17 of FIG. 1 related to peak electric power consumption on a monthly basis for medical centers as architectural structures as the one or more first physical entities 16).

For instance, in some implementations, the exemplary operation O11 may include the operation of O1150 for receiving status information about the one or more physical attributes associated with the one or more first physical entities as one or more habitations. An exemplary implementation may include the habitation module 32*bs* of FIG. 4B configured to direct receiving status information about the one or more physical attributes associated with one or more first physical entities as one or more habitations (for example, the one or more assessment systems 12 of FIG. 4 can receive status information, such as regarding the one or more physical attributes 17 of FIG. 1 related to air conditioner usage for the months of June, July, and August for a number of single residential homes as one or more habitations as the one or more first physical entities 16 of FIG. 16 in a southwest region such as the greater Phoenix Ariz. area).

FIG. 33

Figure 33:
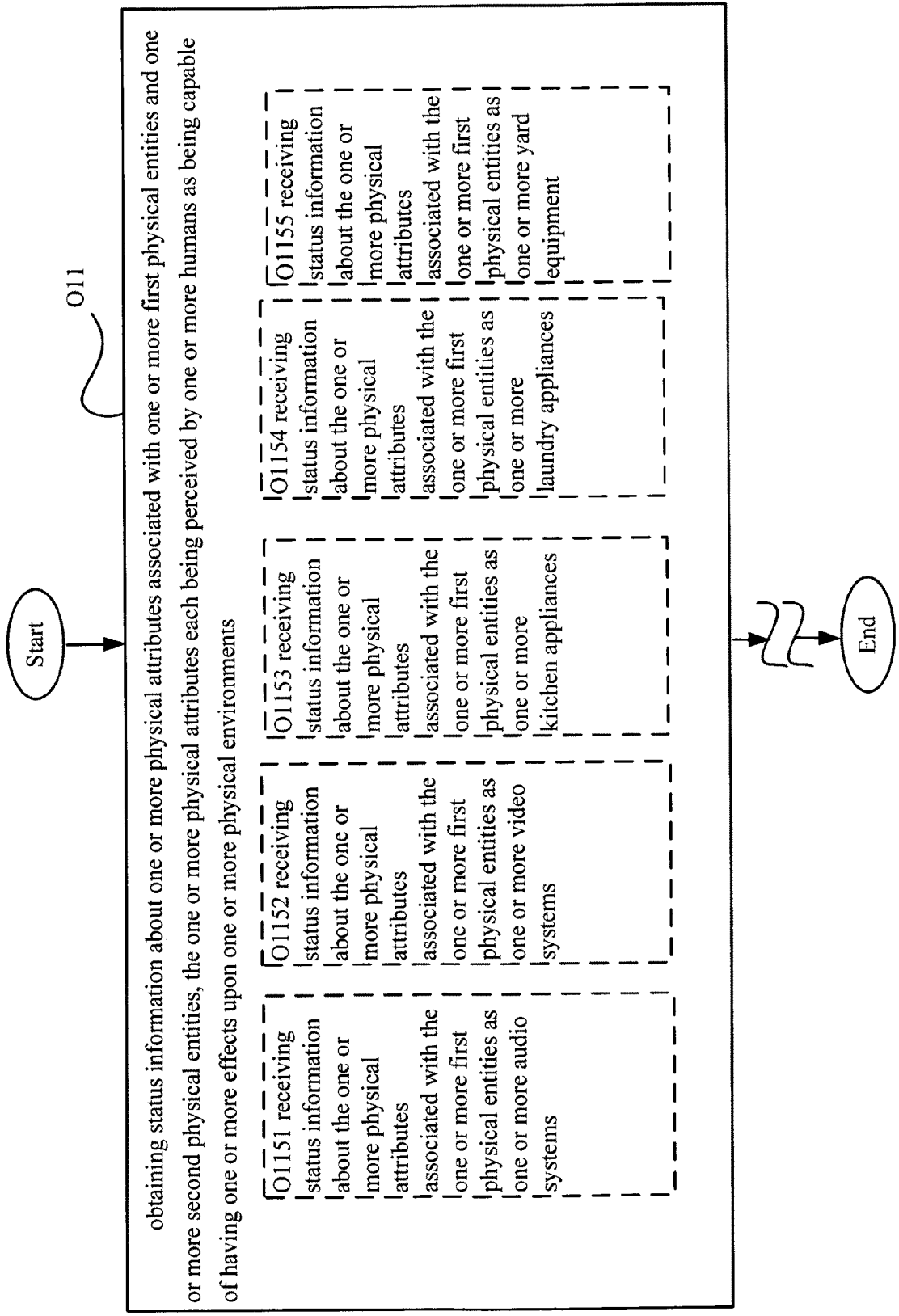
FIG. 33 is a high-level flowchart including exemplary implementations of operation O11 of FIG. 22.

FIG. 33 illustrates various implementations of the exemplary operation O11 of FIG. 22. In particular, FIG. 33 illustrates example implementations where the operation O11 includes one or more additional operations including, for example, operation O1151, O1152, O1153, O1154, and O1155, which may be executed generally by the assessment system 12 of FIG. 3.

For instance, in some implementations, the exemplary operation O11 may include the operation of O1151 for receiving status information about the one or more physical attributes associated with the one or more first physical entities as one or more audio systems. An exemplary implementation may include the audio module 32*bt* of FIG. 4B configured to direct receiving status information about the one or more physical attributes associated with one or more first physical entities as one or more audio systems (for example, the one or more assessment systems 12 of FIG. 4 can receive status information, such as regarding the one or more physical attributes 17 of FIG. 1 related to current or average decibel levels of sound as the one or more physical attribute 17 being outputted by a number of audio systems as the one or more first physical entities 16 of FIG. 16, such as personal multimedia entertainment centers, boom boxes, audio systems of computers, etc located within individual apartment units, condominium units, and/or townhomes).

For instance, in some implementations, the exemplary operation O11 may include the operation of O1152 for receiving status information about the one or more physical attributes associated with the one or more first physical entities as one or more video systems. An exemplary implementation may include the video module 32*bu* of FIG. 4B configured to direct receiving status information about the one or more physical attributes associated with one or more first physical entities as one or more video systems (for example, the one or more assessment systems 12 of FIG. 4 can receive status information, such as regarding the one or more physical attributes 17 of FIG. 1 related to current video content being displayed by a number of video display devices as the one or more first physical entities 16 of FIG. 6 such as television displays, computer displays, projection displays, etc, such as regarding a rating system using rating characteristics of a standard rating system such as the Motion Picture Association of America's film-rating system).

For instance, in some implementations, the exemplary operation O11 may include the operation of O1153 for receiving status information about the one or more physical attributes associated with the one or more first physical entities as one or more kitchen appliances. An exemplary implementation may include the kitchen appliance module 32*bv* of FIG. 4B configured to direct receiving status information about the one or more physical attributes associated with one or more first physical entities as one or more kitchen appliances (for example, the one or more assessment systems 12 of FIG. 4 can receive status information, such as regarding the one or more physical attributes 17 of FIG. 1 related to air conditioner usage for the months of June, July, and August for a number of single residential homes as one or more habitations as the one or more first physical entities 16 of FIG. 6 in a southwest region such as the greater Phoenix Ariz. area).

For instance, in some implementations, the exemplary operation O11 may include the operation of O1154 for receiving status information about the one or more physical attributes associated with the one or more first physical entities as one or more laundry appliances. An exemplary implementation may include the laundry appliance module 32*bw* of FIG. 4B configured to direct receiving status information about the one or more physical attributes associated with one or more first physical entities as one or more laundry appliances (for example, the one or more assessment systems 12 of FIG. 4 can receive status information, such as regarding the one or more physical attributes 17 of FIG. 1 related to number of laundry loads and gallons of water consumed over a month period for a number of household clothes washing machines as the one or more laundry machines as the one or more first physical entities 16 of FIG. 6).

For instance, in some implementations, the exemplary operation O11 may include the operation of O1155 for receiving status information about the one or more physical attributes associated with the one or more first physical entities as one or more yard equipment. An exemplary implementation may include the yard equipment module 32*bx* of FIG. 4B configured to direct receiving status information about the one or more physical attributes associated with one or more first physical entities as one or more yard equipment (for example, the one or more assessment systems 12 of FIG. 4 can receive status information, such as regarding the one or more physical attributes 17 of FIG. 1 related to dB levels and clock time of operation for a number of household lawn mowers as the one or more yard equipment as the one or more first physical entities 16 of FIG. 6).

FIG. 34

Figure 34:
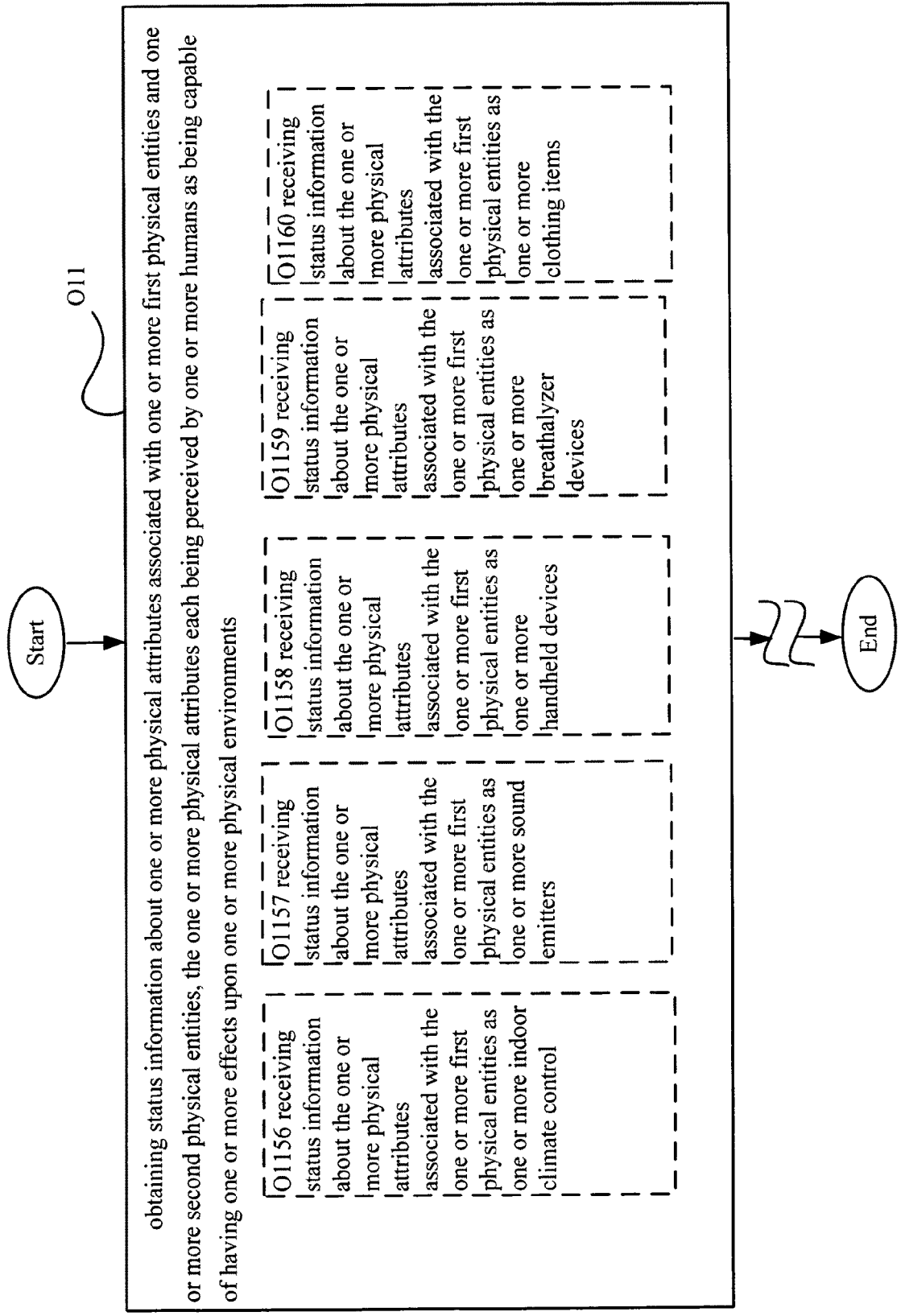
FIG. 34 is a high-level flowchart including exemplary implementations of operation O11 of FIG. 22.

FIG. 34 illustrates various implementations of the exemplary operation O11 of FIG. 22. In particular, FIG. 34 illustrates example implementations where the operation O11 includes one or more additional operations including, for example, operation O1156, O1157, O1158, O1159, and O1160, which may be executed generally by the assessment system 12 of FIG. 3.

For instance, in some implementations, the exemplary operation O11 may include the operation of O1156 for receiving status information about the one or more physical attributes associated with the one or more first physical entities as one or more indoor climate control. An exemplary implementation may include the indoor climate module 32*by* of FIG. 4B configured to direct receiving status information about the one or more physical attributes associated with one or more first physical entities as one or more indoor climate control (for example, the one or more assessment systems 12 of FIG. 4 can receive status information, such as regarding the one or more physical attributes 17 of FIG. 1 related to carbon dioxide levels indicating use and effectiveness of air circulation equipment in office complexes as the one or more first physical entities 16 of FIG. 6).

For instance, in some implementations, the exemplary operation O11 may include the operation of O1157 for receiving status information about the one or more physical attributes associated with the one or more first physical entities as one or more sound emitters. An exemplary implementation may include the sound emitter module 32*bz* of FIG. 4B configured to direct receiving status information about the one or more physical attributes associated with one or more first physical entities as one or more sound emitters (for example, the one or more assessment systems 12 of FIG. 4 can receive status information, such as regarding the one or more physical attributes 17 of FIG. 1 related to dB and clock time of operation of outside barking for a number of residential household pet canines as the one or more first physical entities 16 of FIG. 6).

For instance, in some implementations, the exemplary operation O11 may include the operation of O1158 for receiving status information about the one or more physical attributes associated with the one or more first physical entities as one or more handheld devices. An exemplary implementation may include the handheld device module 32*baa* of FIG. 4B configured to direct receiving status information about the one or more physical attributes associated with one or more first physical entities as one or more handheld devices (for example, the one or more assessment systems 12 of FIG.

4 can receive status information, such as regarding the one or more physical attributes 17 of FIG. 1 related to usage in limited use restricted areas for cell phones, PDAs, hand held computers or other hand held audio capable devices capable of receiving human speech as the one or more first physical entities 16 of FIG. 6).

For instance, in some implementations, the exemplary operation O11 may include the operation of O1159 for receiving status information about the one or more physical attributes associated with the one or more first physical entities as one or more breathalyzer devices. An exemplary implementation may include the breathalyzer device module 32*bab* of FIG. 4B configured to direct receiving status information about the one or more physical attributes associated with one or more first physical entities as one or more handheld devices (for example, the one or more assessment systems 12 of FIG. 4 can receive status information, such as regarding the one or more physical attributes 17 of FIG. 1 related to breath alcohol level, breath illicit drug level, or other breath content of a number of vehicle operators as the one or more first physical entities 16 of FIG. 6).

For instance, in some implementations, the exemplary operation O11 may include the operation of O1160 for receiving status information about the one or more physical attributes associated with the one or more first physical entities as one or more clothing items. An exemplary implementation may include the clothing module 32*bac* of FIG. 4B configured to direct receiving status information about the one or more physical attributes associated with one or more first physical entities as one or more clothing items (for example, the one or more assessment systems 12 of FIG. 4 can receive status information, such as regarding the one or more physical attributes 17 of FIG. 1 related to usage, such as number of miles used and/or location of use, of a number of pairs of walking sneakers as the one or more first physical entities 16 of FIG. 6).

FIG. 35

Figure 35:
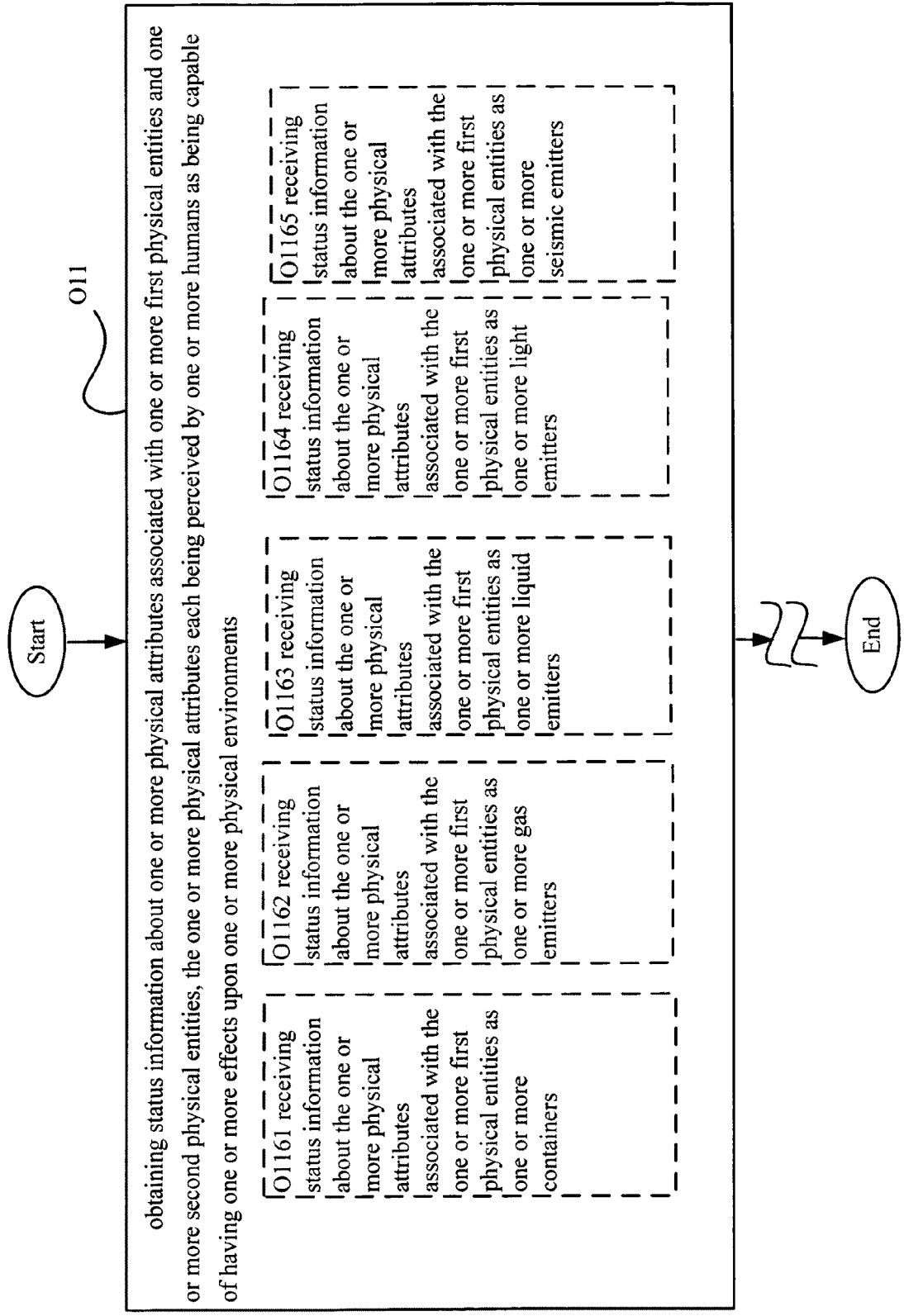
FIG. 35 is a high-level flowchart including exemplary implementations of operation O11 of FIG. 22.

FIG. 35 illustrates various implementations of the exemplary operation O11 of FIG. 22. In particular, FIG. 35 illustrates example implementations where the operation O11 includes one or more additional operations including, for example, operation O1161, O1162, O1163, O1164, and O1165, which may be executed generally by the assessment system 12 of FIG. 3.

For instance, in some implementations, the exemplary operation O11 may include the operation of O1161 for receiving status information about the one or more physical attributes associated with the one or more first physical entities as one or more containers. An exemplary implementation may include the container module 32*bad* of FIG. 4B configured to direct receiving status information about the one or more physical attributes associated with one or more first physical entities as one or more containers (for example, the one or more assessment systems 12 of FIG. 4 can receive status information, such as regarding the one or more physical attributes 17 of FIG. 1 related to usage of recycle bins in households, such as number or weight of recycled items contained in the recycle bin as the one or more first physical entities 16 of FIG. 6).

For instance, in some implementations, the exemplary operation O11 may include the operation of O1162 for receiving status information about the one or more physical attributes associated with the one or more first physical entities as one or more gas emitters. An exemplary implementation may include the gas emitter module 32*bae* of FIG. 4B configured to direct receiving status information about the one or more physical attributes associated with one or more first physical entities as one or more gas emitters (for example, the one or more assessment systems 12 of FIG. 4 can receive status information, such as regarding the one or more physical attributes 17 of FIG. 1 related to amount of soot, ash, carbon dioxide and other gases being emitted by a number of smokestacks of industrial parks as the one or more first physical entities 16 of FIG. 6).

For instance, in some implementations, the exemplary operation O11 may include the operation of O1163 for receiving status information about the one or more physical attributes associated with the one or more first physical entities as one or more liquid emitters. An exemplary implementation may include the liquid emitter module 32*baf* of FIG. 4B configured to direct receiving status information about the one or more physical attributes associated with one or more first physical entities as one or more liquid emitters (for example, the one or more assessment systems 12 of FIG. 4 can receive status information, such as regarding the one or more physical attributes 17 of FIG. 1 related to amount of effluent and other noxious liquids being emitted by a number of drainpipes of industrial parks as the one or more first physical entities 16 of FIG. 6).

For instance, in some implementations, the exemplary operation O11 may include the operation of O1164 for receiving status information about the one or more physical attributes associated with the one or more first physical entities as one or more light emitters. An exemplary implementation may include the light emitter module 32*bag* of FIG. 4B configured to direct receiving status information about the one or more physical attributes associated with one or more first physical entities as one or more light emitters (for example, the one or more assessment systems 12 of FIG. 4 can receive status information, such as regarding the one or more physical attributes 17 of FIG. 1 related to amount of lumens separately emitted by incandescent, fluorescent, and light emitting diodes for a number of houses as the one or more first physical entities 16 of FIG. 6).

For instance, in some implementations, the exemplary operation O11 may include the operation of O1165 for receiving status information about the one or more physical attributes associated with the one or more first physical entities as one or more seismic emitters. An exemplary implementation may include the seismic emitter module 32*bah* of FIG. 4B configured to direct receiving status information about the one or more physical attributes associated with one or more first physical entities as one or more seismic emitters (for example, the one or more assessment systems 12 of FIG. 4 can receive status information, such as regarding the one or more physical attributes 17 of FIG. 1 related to vibration emitted during predetermined times of the day such as during rush hours from freeway traffic of cars, trucks, and busses as the one or more first physical entities 16 of FIG. 6).

FIG. 36

Figure 36:
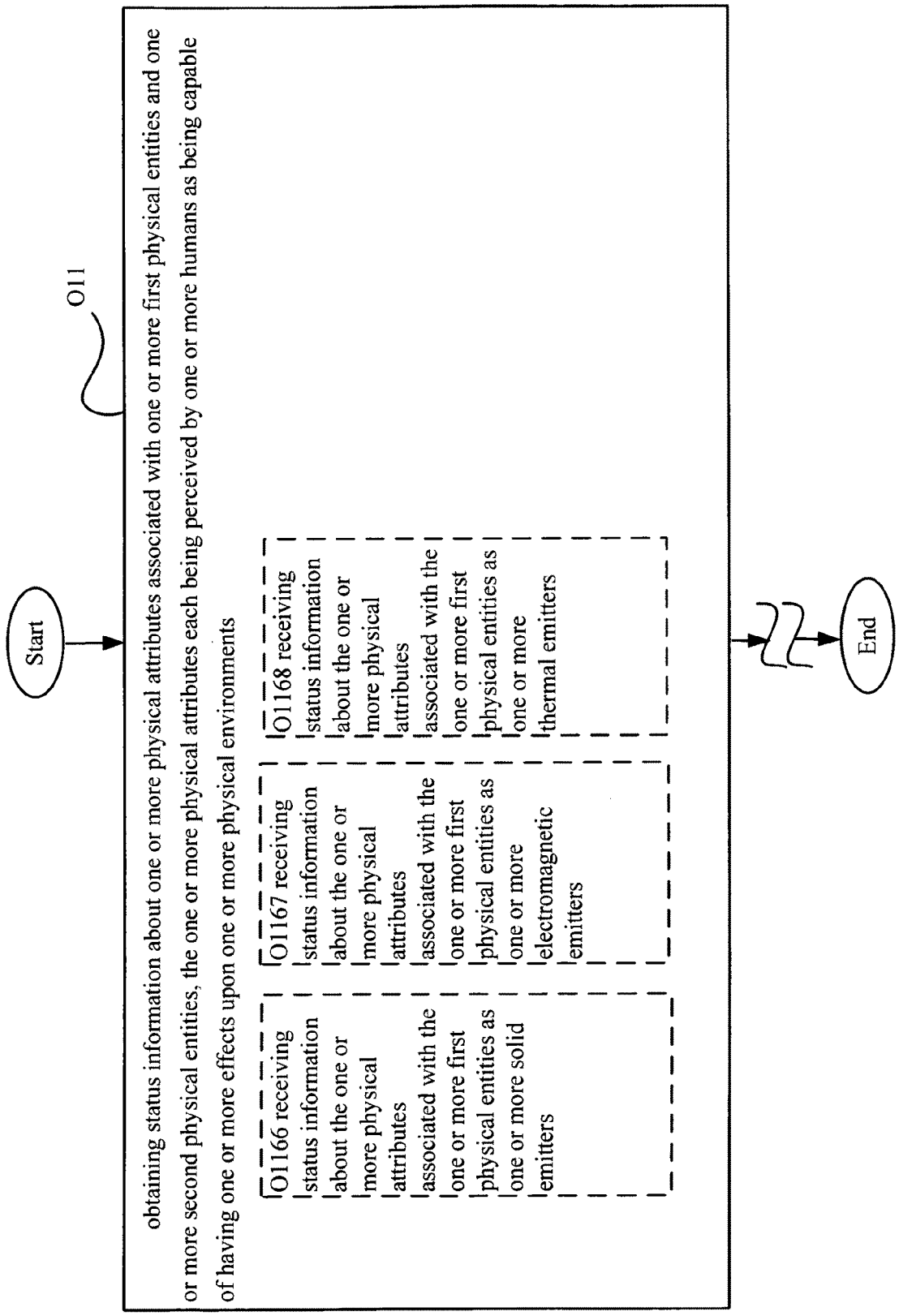
FIG. 36 is a high-level flowchart including exemplary implementations of operation O11 of FIG. 22.

FIG. 36 illustrates various implementations of the exemplary operation O11 of FIG. 22. In particular, FIG. 36 illustrates example implementations where the operation O11 includes one or more additional operations including, for example, operation O1166, O1167, and O1168, which may be executed generally by the assessment system 12 of FIG. 3.

For instance, in some implementations, the exemplary operation O11 may include the operation of O1166 for receiving status information about the one or more physical attributes associated with the one or more first physical entities as one or more solid emitters. An exemplary implementation may include the solid emitter module 32*ca* of FIG. 4C configured to direct receiving status information about the one or more physical attributes associated with one or more first physical entities as one or more solid emitters (for example, the one or more assessment systems 12 of FIG. 4 can receive status information, such as regarding the one or more physical attributes 17 of FIG. 1 related to number of occurrences of liter being emitted in designated monitored areas of national parks by a number of litterbugs as the one or more first physical entities 16 of FIG. 6).

For instance, in some implementations, the exemplary operation O11 may include the operation of O1167 for receiving status information about the one or more physical attributes associated with the one or more first physical entities as one or more electromagnetic emitters. An exemplary implementation may include the EM emitter module 32cb of FIG. 4C configured to direct receiving status information about the one or more physical attributes associated with one or more first physical entities as one or more electromagnetic emitters (for example, the one or more assessment systems 12 of FIG. 4 can receive status information, such as regarding the one or more physical attributes 17 of FIG. 1 related to location of radar waves being emitted by traffic detectors as the one or more first physical entities 16 of FIG. 6).

For instance, in some implementations, the exemplary operation O11 may include the operation of O1168 for receiving status information about the one or more physical attributes associated with the one or more first physical entities as one or more thermal emitters. An exemplary implementation may include the thermal emitter module 32cc of FIG. 4C configured to direct receiving status information about the one or more physical attributes associated with one or more first physical entities as one or more thermal emitters (for example, the one or more assessment systems 12 of FIG. 4 can receive status information, such as regarding the one or more physical attributes 17 of FIG. 1 related to amount of heat in BTUs into outside air by commercial office buildings as the one or more first physical entities 16 of FIG. 6).

FIG. 37

FIG. 37 illustrates various implementations of the exemplary operation O12 of FIG. 22. In particular, FIG. 37 illustrates example implementations where the operation O12 includes one or more additional operations including, for example, operations O1201, O1202, O1203, O1204, and/or O1205, which may be executed generally by, in some instances, one or more of the sensors 66 of the physical entities 16 of FIG. 10 or one or more sensing components of the sensing unit 54 of the status system 14 of FIG. 6.

For instance, in some implementations, the exemplary operation O12 may include the operation of O1201 for receiving the input information including one or more comments. An exemplary implementation may include the comments receiving module 32cd of FIG. 4C configured to direct receiving the input information including one or more comments (for example, the one or more assessment systems 12 of FIG. 4 can receive input information containing comments about the one or more physical attributes 17 of the one or more first physical entities and the one or more second physical entities 16 such as regarding one or more cars in a first group and one or more cars in a second group that do not have at least a 35 miles per gallon rating should be penalized or otherwise discouraged from being operated).

For instance, in some implementations, the exemplary operation O12 may include the operation of O1202 for receiving the input information including wirelessly receiving. An exemplary implementation may include the wireless receiving module 32ce of FIG. 4C configured to direct receiving the input information including wirelessly receiving (for example, the one or more assessment systems 12 of FIG. 4 can receive input information such as opinions as to why office buildings should be kept no more than 62 degrees Fahrenheit during winter months through the one or more communication media 22 as one or more wireless cellular communication networks).

For instance, in some implementations, the exemplary operation O12 may include the operation of O1203 for receiving the input information including through one or more wired networks. An exemplary implementation may include the wired receiving module 32cf of FIG. 4C configured to direct receiving the input information including through one or more wired networks (for example, the one or more assessment systems 12 of FIG. 4 can receive input information, such as preferences expressed about monetary rewards for carpooling during rush hour traffic, through the one or more communication media 22 as one or more wired fiber optic and/or Ethernet communication networks).

For instance, in some implementations, the exemplary operation O12 may include the operation of O1204 for receiving the input information through at least in part the one or more social networking services including an external service. An exemplary implementation may include the external social networking module 32cg of FIG. 4C configured to direct receiving the input information through at least in part the one or more social networking services including an external service (for example, the one or more assessment systems 12 of FIG. 4 can receive input information, such as air conditioner use should be only for medically needy persons during high peak electric demand during the summer, through the one or more social networking services 18 of FIG. 1, such as Friendster, which is an external social networking service accessible to a general public internet audience).

For instance, in some implementations, the exemplary operation O12 may include the operation of O1205 for receiving the input information through at least in part the one or more social networking services including an internal service. An exemplary implementation may include the internal social networking module 32cg of FIG. 4C configured to direct receiving the input information through at least in part the one or more social networking services including an internal service (for example, the one or more assessment systems 12 of FIG. 4 can receive input information, such as dogs should not be allowed to bark outside in the city for more than 30 seconds a session, through the one or more social networking services 18 of FIG. 1, such as an internal web-based forum service hosted on an internal local area network of Global Services, Inc as an internal networking service accessible only to employees and immediate family members of employees of Global Services, Inc).

FIG. 38

FIG. 38 illustrates various implementations of the exemplary operation O12 of FIG. 22. In particular, FIG. 38 illustrates example implementations where the operation O12 includes one or more additional operations including, for example, operations O1206, O1207, O1208, O1209, and/or O1210, which may be executed generally by, in some instances, one or more of the sensors 66 of the physical entities 16 of FIG. 10 or one or more sensing components of the sensing unit 54 of the status system 14 of FIG. 6.

For instance, in some implementations, the exemplary operation O12 may include the operation of O1206 for receiving the input information including one or more selections. An exemplary implementation may include the receiving selections module 32ci of FIG. 4C configured to direct receiving the input information including one or more selections (for example, the one or more assessment systems 12 of FIG. 4 can receive input information, such as including a number of selection indications choosing gas mileage gains for cars rather than comfort factors such as larger sized cars or higher level of driving performance for individual drivers).

For instance, in some implementations, the exemplary operation O12 may include the operation of O1207 for receiving the input information including one or more preferences. An exemplary implementation may include the receiving preferences module 32*cj* of FIG. 4C configured to direct receiving the input information including one or more preferences (for example, the one or more assessment systems 12 of FIG. 4 can receive input information, such as including the preference statement that diesel cars running biodiesel are preferable to hybrid cars running gas for scoring various cars regarding gas mileage).

For instance, in some implementations, the exemplary operation O12 may include the operation of O1208 for receiving the input information including one or more warnings. An exemplary implementation may include the receiving warnings module 32*ck* of FIG. 4C configured to direct receiving the input information including one or more warnings (for example, the one or more assessment systems 12 of FIG. 4 can receive input information, such as the high levels of carbon dioxide found in many sampled office buildings can result in poor performance by the office workers).

For instance, in some implementations, the exemplary operation O12 may include the operation of O1209 for receiving the input information including one or more persuasive statements. An exemplary implementation may include the receiving persuasive module 32*cl* of FIG. 4C configured to direct receiving the input information including one or more persuasive statements (for example, the one or more assessment systems 12 of FIG. 4 can receive input information, such as carbon dioxide levels in the upper atmosphere are detrimentally influencing climates around the world such that carbon dioxide production should be monitored and regulated at the local level including use of fuel for heating systems).

For instance, in some implementations, the exemplary operation O12 may include the operation of O1210 for receiving the input information including one or more facts. An exemplary implementation may include the receiving facts module 32*cm* of FIG. 4C configured to direct receiving the input information including one or more facts (for example, the one or more assessment systems 12 of FIG. 4 can receive input information, such as there were 38 days in the 1$^{st}$ quarter of 2009 in which maximum decibel levels were exceeded in noise sensitive neighborhoods in a vicinity of a hospital complex).

FIG. 39

FIG. 39 illustrates various implementations of the exemplary operation O13 of FIG. 22. In particular, FIG. 39 illustrates example implementations where the operation O13 includes one or more additional operations including, for example, operations O1301, O1302, O1303, O1304, and O1305, which may be executed generally by, in some instances, the status determination unit 56 of the status system 14 of FIG. 6.

For instance, in some implementations, the exemplary operation O11 may include the operation of O1301 for determining assessment information including one or more summaries comparing the one or more first entities with the one or more second entities. An exemplary implementation may include the summaries module 32*cn* of FIG. 4C configured to direct determining assessment information including one or more summaries (for example, the assessment unit 30 of the assessment system 12 of FIG. 4 may determine one or more summaries comparing carbon dioxide emissions of vehicle use for a first group of hybrid vehicles compared with a second group of conventional gasoline fueled vehicles in twenty major cities of the United States for March 2009 to include emissions by vehicle age, weight, and engine category based upon emissions facts about the cities found in the status information received from the status system 14 of FIG. 5 and ratings of the emissions summaries according to preferences stated regarding vehicles according to vehicle comfort and concern regarding climate change expressed on the one or more social networking systems 18 of FIG. 7 and sent to the assessment system as the input information).

For instance, in some implementations, the exemplary operation O11 may include the operation of O1302 for determining assessment information including one or more incentives associated with the one or more first entities compared with one or more incentives associated with the one or more second entities. An exemplary implementation may include the incentives module 32*co* of FIG. 4C configured to direct determining assessment information including one or more incentives (for example, the assessment unit 30 of the assessment system 12 of FIG. 4 may compare the effectiveness of cash incentives for a first group of vehicles with gift card incentives for a second group of vehicles, for each land vehicle from the first group and second group achieving for a three month period at least 10% greater overall gas mileage efficiency than Environmental Protection Agency fuel consumption estimates based upon based upon gas mileage facts found regarding the vehicles in the status information received from the status system 14 of FIG. 5 and incentive suggestions stated regarding gas mileage efficiencies expressed on the one or more clean auto forum social networking systems 18 of FIG. 7 and sent to the assessment system as the input information).

For instance, in some implementations, the exemplary operation O11 may include the operation of O1303 for determining assessment information including one or more statistics associated with the one or more first entities compared with one or more incentives associated with the one or more second entities. An exemplary implementation may include the statistics module 32*cp* of FIG. 4C configured to direct determining assessment information including one or more statistics (for example, the assessment unit 30 of the assessment system 12 of FIG. 4 may compared a first group of electric power plant candidates worthy of receiving cash awards with a second group of electric power plant candidates not worthy of cash awards based upon statistics, such as a Gaussian distribution, of reductions of carbon dioxide emissions due to carbon dioxide reclamation efforts in growing companion algae farms as evidenced by carbon dioxide emissions facts and status contained in the status information sent to the assessment unit by the status system 14 of FIG. 5 and based upon award suggestions posted to one or more global climate change forums as the one or more social networking services 18 of FIG. 7 sent to the assessment unit).

For instance, in some implementations, the exemplary operation O11 may include the operation of O1304 for determining assessment information including one or more projections associated with the one or more first entities compared with one or more incentives associated with the one or more second entities. An exemplary implementation may include the projections module 32*cq* of FIG. 4C configured to direct determining assessment information including one or more projections (for example, the assessment unit 30 of the assessment system 12 of FIG. 4 may compare projections for future energy use in kilo-watt hours of one or more first residential neighborhoods with one or more second residential neighborhoods based upon current energy use in kilo-watt hours received as the status information and based upon affirmations and goals expressed by residents of the one or more first residential neighborhoods and the one or more second residential neighborhoods received as input information).

For instance, in some implementations, the exemplary operation O11 may include the operation of O1305 for determining assessment information including one or more scores associated with the one or more first entities compared with one or more incentives associated with the one or more second entities. An exemplary implementation may include the scores module 32cr of FIG. 4C configured to direct determining assessment information including one or more scores (for example, the assessment unit 30 of the assessment system 12 of FIG. 4 may compare scores for one or more first neighborhoods with one or more second neighborhoods regarding compliance with noise ordinance objectives associated with quiet hours received as status information containing number of times noise thresholds were breached in a fiscal year and received as subjective scoring criteria such as poor, fair, good, excellent being assigned to progressively less times the noise thresholds were breached as submitted to one or more social networking services 18 of FIG. 7 such as an internal forum set up for residences of the one or more neighborhoods involved).

FIG. 40

FIG. 40 illustrates various implementations of the exemplary operation O13 of FIG. 22. In particular, FIG. 40 illustrates example implementations where the operation O13 includes one or more additional operations including, for example, operation O1306, and 1307, which may be executed generally by the assessment system 12 of FIG. 3.

For instance, in some implementations, the exemplary operation O11 may include the operation of O1306 for determining assessment information including one or more classifications associated with the one or more first entities compared with one or more incentives associated with the one or more second entities. An exemplary implementation may include the classifications module 32cs of FIG. 4C configured to direct determining assessment information including one or more classifications (for example, the assessment unit 30 of the assessment system 12 of FIG. 4 may compare diesel fuel use for one or more first diesel generators with one or more second diesel generators in gallons of fuel per year for diesel generator engine operation, as received as status information, to a number of classifications, as received as input information, such as guzzler, moderate, and economizer for excessive quantities of fuel used, average quantities of fuel used, and minimal quantities of fuel used, respectively).

For instance, in some implementations, the exemplary operation O11 may include the operation of O1307 for determining assessment information including status of progress towards one or more goals associated with the one or more first entities compared with one or more incentives associated with the one or more second entities. An exemplary implementation may include the progress module 32ct of FIG. 4C configured to direct determining assessment information including status of progress towards one or more goals (for example, the assessment unit 30 of the assessment system 12 of FIG. 4 may compare a total current year electric energy usage in kilo-watt hours for one or more first office parks of buildings with one or more first office parks of buildings, as received as status information, to a goal of a percentage reduction in annual electric energy usage as received as input information, such as a 34% reduction in total annual electric energy usage to determine status of progress toward the 34% reduction goal such as to date there has been a 38% reduction in total electric energy usage so that if current usage trends continue the annual goal will be met.

FIG. 43

A partial view of a system S100 is shown in FIG. 43 that includes a computer program S104 for executing a computer process on a computing postural influencer. An implementation of the system S100 is provided using a signal-bearing medium S102 bearing one or more instructions obtaining status information about one or more physical attributes associated with one or more first physical entities and one or more second physical entities, the one or more physical attributes each being perceived by one or more humans as being capable of having one or more effects upon one or more physical environments may be executed by, for example, the one or more assessment units 30 of the one or more assessment systems 12 of FIG. 4. An exemplary implementation may include, obtaining status information (for example, the one or more assessment units 30 can receive the status information from the one or more status determination units 56 of the one or more status systems 14 of FIG. 5 having beforehand determined the status information based upon data collected through the one or more sensing units 54 of the one or more status systems 14 and/or the one or more sensors 66 of the one or more status systems 14 of FIG. 5) about one or more physical attributes associated with one or more physical entities (for example, the one or more electricity sensors 66r of one or more physical entities 16, such as one or more houses, may collect data regarding the one or more physical attributes 17 related to electricity usage associated with the one or more houses. The status information thus determined, for instance, could be related to electricity usage in kilowatt-hours per a given period such as a particular yearly quarter, such as the $3^{rd}$ quarter of 2009) the one or more physical attributes each being perceived by one or more humans as being capable of having one or more effects upon one or more physical environments (for example, the electricity usage for the one or more houses could be perceived by one or more humans as being capable of having a detrimental effect upon one or more atmospheric environments, such as, air quality near an electric power plant, and/or one or more water-based environments, such as rivers or other bodies of water near an electric power plant, due to thermal and/or gaseous emissions produced, such as elevated water temperatures near an electric power plant and/or elevated sulfur gas levels or carbon dioxide gas levels in air near an electric power plant, as consequences of electricity generation by certain fuel-based electric power plants, such as coal-fired electric power plants).

The implementation of the system S100 is also provided using a signal-bearing medium S102 bearing one or more instructions for obtaining input information from at least one of the one or more humans through at least in part one or more social networking services, the input information associated with at least one of the one or more physical attributes. An exemplary implementation may be executed by, for example, the status determining system 14 of FIG. 6. An exemplary implementation may include obtaining input information (for example, input information can be expressed in terms of a subjective scoring, such as −100 points to +100 points where increased negative points indicates a larger aversion to the one or more physical attributes and increased positive points indicates a larger affinity to the one or more physical attributes. The subjective scoring could be, for instance, regarding various kilowatt-hour levels of quarterly electricity usage associated with the one or more houses.) from at least one of the one or more humans (For example, one of the humans could be one of the non-users 26 of FIG. 1 that did not dwell in any of the one or more houses.) through at least in part one or more social networking services (for example, opinions regarding the electricity usage could be posted to a Facebook webpage as part of the one or more social networking services 18 of FIG. 1 that is associated with the one or more houses and/or associated with environmental concerns such as effects of electricity production by coal-fired electric power plants.), the input information associated with at least one of the one or more physical attributes (for example, the input information could be −80 subjective score regarding a usage of 24,325 kilowatt-hour usage for the $3^{rd}$ quarter of 2009 for a 8,200 ft2 house).

The implementation of the system S100 is also provided using a signal-bearing medium S102 bearing one or more instructions for where determining assessment information comparing the one or more first physical entities with the one or more second physical entities based at least in part upon the status information and based at least in part upon the input information may be executed by, for example, the status determining system 14 of FIG. 6. An exemplary implementation may include determining (for example, the one or more controls 36 of the one or more assessment units 40 of FIG. 4 can instruct the one or more processors 36a to determine based on algorithms such as an averaging algorithm that generates an average scoring contained in the one or more storage units 34.) assessment information for at least one of the one or more physical entities (for example, the assessment information could contain a overall subjective scoring, such as −80, −30, +40, and +75 out of a range of −100 to +100 for the electricity usage of each of a group of selected houses such as houses of celebrities such as movie stars for the $3^{rd}$ quarter of 2009) based at least in part upon the status information and based at least in part upon the input information (for example, the status information could contain electricity usage for each house of the selected group for the $3^{rd}$ quarter of 2009 and the input information could contain subjective scoring thresholds associated with kilowatt-hour usage such as another −10 points subtracted from 100 points for additional 500 kilowatt-hours of usage for the $3^{rd}$ quarter of 2009).

The one or more instructions may be, for example, computer executable and/or logic-implemented instructions. In some implementations, the signal-bearing medium S102 may include a computer-readable medium S56. In some implementations, the signal-bearing medium S102 may include a recordable medium S108. In some implementations, the signal-bearing medium S102 may include a communication medium S54.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those of ordinary skill in the art will recognize that it is common within the art to describe devices and/or processes in the fashion set forth herein, and thereafter use engineering practices to integrate such described devices and/or processes into information processing systems. That is, at least a portion of the devices and/or processes described herein can be integrated into an information processing system via a reasonable amount of experimentation. Those having skill in the art will recognize that a typical information processing system generally includes one or more of a system unit housing, a video display device, a memory such as volatile and non-volatile memory, processors such as microprocessors and digital signal processors, computational entities such as operating systems, drivers, graphical subject interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical information processing system may be implemented utilizing any suitable commercially available components, such as those typically found in information computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably coupleable", to each other to achieve the desired functionality. Specific examples of operably coupleable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All of the above U.S. patents, U.S. patent application publications, U.S. patent applications, foreign patents, foreign patent applications and non-patent publications referred to in this specification and/or listed in any Application Information Sheet are incorporated herein by reference, to the extent not inconsistent herewith.

What is claimed is:

1. A method at least partly implemented using one or more processors, the method comprising:
   obtaining electricity or fuel consumption information associated with a vehicle that is associated with at least one social networking service group;
   determining at least one assessment of the vehicle by at least comparing electricity or fuel consumption over at least one specified period of time or distance for the vehicle with electricity or fuel consumption over the at least one specified period of time or distance for at least one other vehicle that is associated with the at least one social networking service group; and
   outputting the at least one assessment via at least one interface of the vehicle.

2. A system comprising:
- means for obtaining electricity or fuel consumption information associated with a vehicle that is associated with at least one social networking service group;
- means for determining at least one assessment of the vehicle by at least comparing electricity or fuel consumption over at least one specified period of time or distance for the vehicle with electricity or fuel consumption over the at least one specified period of time or distance for at least one other vehicle that is associated with the at least one social networking service group; and
- means for outputting the at least one assessment via at least one interface of the vehicle.

3. A computer program product comprising:
- one or more non-transitory media including at least:
- one or more instructions for obtaining electricity or fuel consumption information associated with a vehicle that is associated with at least one social networking service group;
- one or more instructions for determining at least one assessment of the vehicle by at least comparing electricity or fuel consumption over at least one specified period of time or distance for the vehicle with electricity or fuel consumption over the at least one specified period of time or distance for at least one other vehicle that is associated with the at least one social networking service group; and
- one or more instructions for outputting the at least one assessment via at least one interface of the vehicle.

4. A system comprising:
- circuitry configured for obtaining electricity or fuel consumption information associated with a vehicle that is associated with at least one social networking service group;
- circuitry configured for determining at least one assessment of the vehicle by at least comparing electricity or fuel consumption over at least one specified period of time or distance for the vehicle with electricity or fuel consumption over the at least one specified period of time or distance for at least one other vehicle that is associated with the at least one social networking service group; and
- circuitry configured for outputting the at least one assessment via at least one interface of the vehicle.

5. The system of claim 4, wherein the circuitry configured for obtaining electricity or fuel consumption information associated with a vehicle that is associated with at least one social networking service group comprises:
- circuitry configured for obtaining from user input electricity or fuel consumption information associated with a vehicle that is associated with at least one social networking service group.

6. The system of claim 4, wherein the circuitry configured for obtaining electricity or fuel consumption information associated with a vehicle that is associated with at least one social networking service group comprises:
- circuitry configured for obtaining from storage electricity or fuel consumption information associated with a vehicle that is associated with at least one social networking service group.

7. The system of claim 4, wherein the circuitry configured for obtaining electricity or fuel consumption information associated with a vehicle that is associated with at least one social networking service group comprises:
- circuitry configured for obtaining over one or more selected instances or over at least one predetermined span of time electricity or fuel consumption information associated with a vehicle that is associated with at least one social networking service group.

8. The system of claim 4, wherein the circuitry configured for obtaining electricity or fuel consumption information associated with a vehicle that is associated with at least one social networking service group comprises:
- circuitry configured for obtaining in response to user initiation electricity or fuel consumption information associated with a vehicle that is associated with at least one social networking service group.

9. The system of claim 4, wherein the circuitry configured for obtaining electricity or fuel consumption information associated with a vehicle that is associated with at least one social networking service group comprises:
- circuitry configured for obtaining in response to one or more specified events electricity or fuel consumption information associated with a vehicle that is associated with at least one social networking service group.

10. The system of claim 4, wherein the circuitry configured for obtaining electricity or fuel consumption information associated with a vehicle that is associated with at least one social networking service group comprises:
- circuitry configured for wirelessly obtaining electricity or fuel consumption information associated with a vehicle that is associated with at least one social networking service group.

11. The system of claim 4 wherein the circuitry configured for obtaining electricity or fuel consumption information associated with a vehicle that is associated with at least one social networking service group comprises:
- circuitry configured for obtaining from one or more sensors electricity or fuel consumption information associated with a vehicle that is associated with at least one social networking service group.

12. The system of claim 4, wherein the circuitry configured for obtaining electricity or fuel consumption information associated with a vehicle that is associated with at least one social networking service group comprises:
- circuitry configured for obtaining electricity or fuel consumption information associated with a vehicle that is associated with at least one internal or external social networking service group.

13. The system of claim 4, wherein the circuitry configured for obtaining electricity or fuel consumption information associated with a vehicle that is associated with at least one social networking service group comprises:
- circuitry configured for obtaining electricity or fuel consumption information associated with one or more of the following types of vehicles: land, air, or water.

14. The system of claim 4, wherein the circuitry configured for determining at least one assessment of the vehicle by at least comparing electricity or fuel consumption over at least one specified period of time or distance for the vehicle with electricity or fuel consumption over the at least one specified period of time or distance for at least one other vehicle that is associated with the at least one social networking service group comprises:
- circuitry configured for determining at least one score, statistic, projection, classification, or summary by at least comparing electricity or fuel consumption over at least one specified period of time or distance for the vehicle with electricity or fuel consumption over the at least one specified period of time or distance for at least one other vehicle that is associated with the at least one social networking service group.

15. The system of claim 4, wherein the circuitry configured for outputting the at least one assessment via at least one interface of the vehicle comprises:
    circuitry configured for outputting the at least one assessment via at least one interface of the vehicle in association with one or more incentives.

16. The system of claim 4, wherein the circuitry configured for outputting the at least one assessment via at least one interface of the vehicle comprises:
    circuitry configured for outputting the at least one assessment via at least one interface of the vehicle in association with one or more projections.

17. The system of claim 4, wherein the circuitry configured for outputting the at least one assessment via at least one interface of the vehicle comprises:
    circuitry configured for outputting the at least one assessment via at least one interface of the vehicle in association with one or more classifications.

18. The system of claim 4, wherein the circuitry configured for outputting the at least one assessment via at least one interface of the vehicle comprises:
    circuitry configured for outputting the at least one assessment via at least one interface of the vehicle in association with at least one indication of progress toward one or more goals.

19. The system of claim 4, wherein the circuitry configured for outputting the at least one assessment via at least one interface of the vehicle comprises:
    circuitry configured for transmitting to the vehicle the at least one assessment for output via at least one interface of the vehicle.

20. The system of claim 4, wherein the circuitry configured for outputting the at least one assessment via at least one interface of the vehicle comprises:
    circuitry configured for visually or audibly outputting the at least one assessment via at least one interface of the vehicle.

* * * * *

UNITED STATES PATENT AND TRADEMARK OFFICE
CERTIFICATE OF CORRECTION

| | |
|---|---|
| PATENT NO. | : 8,856,228 B2 |
| APPLICATION NO. | : 12/592718 |
| DATED | : October 7, 2014 |
| INVENTOR(S) | : Rob Bernard et al. |

It is certified that error appears in the above-identified patent and that said Letters Patent is hereby corrected as shown below:

In the Claims

At Column 54, Line 11, Claim 19 please replace "circuitry configured for transmitting to the vehicle at least one..." with --...circuitry configured for transmitting the at least one...--

Signed and Sealed this
Fifteenth Day of September, 2015

Michelle K. Lee
*Director of the United States Patent and Trademark Office*